United States Patent
Nakashima et al.

(10) Patent No.: US 7,785,436 B2
(45) Date of Patent: Aug. 31, 2010

(54) LAMINATING METHOD FOR FORMING A LAMINATE LAYER ON A RECORDING SURFACE OF A RECORDING MEDIUM

(75) Inventors: Yoshihiko Nakashima, Wakayama (JP); Junichi Yamamoto, Wakayama (JP); Yasuto Kimura, Wakayama (JP); Hironori Masutani, Wakayama (JP); Nobuaki Nakaoka, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 828 days.

(21) Appl. No.: 10/594,726

(22) PCT Filed: Mar. 30, 2005

(86) PCT No.: PCT/JP2005/006137
§ 371 (c)(1),
(2), (4) Date: Sep. 29, 2006

(87) PCT Pub. No.: WO2005/095088
PCT Pub. Date: Oct. 13, 2005

(65) Prior Publication Data
US 2007/0204961 A1    Sep. 6, 2007

(30) Foreign Application Priority Data

| Mar. 30, 2004 | (JP) | 2004-098690 |
| Mar. 30, 2004 | (JP) | 2004-098857 |
| Mar. 30, 2004 | (JP) | 2004-098858 |
| Mar. 30, 2004 | (JP) | 2004-098859 |
| Mar. 30, 2004 | (JP) | 2004-098861 |
| Mar. 30, 2004 | (JP) | 2004-098862 |
| Mar. 30, 2004 | (JP) | 2004-100767 |
| Mar. 30, 2004 | (JP) | 2004-100771 |
| Mar. 30, 2004 | (JP) | 2004-100774 |
| Mar. 30, 2004 | (JP) | 2004-100775 |
| Mar. 31, 2004 | (JP) | 2004-105705 |
| Mar. 31, 2004 | (JP) | 2004-105706 |
| Mar. 31, 2004 | (JP) | 2004-105708 |
| Apr. 13, 2004 | (JP) | 2004-117943 |
| Apr. 23, 2004 | (JP) | 2004-128775 |
| Apr. 23, 2004 | (JP) | 2004-128810 |
| Apr. 23, 2004 | (JP) | 2004-128839 |
| May 26, 2004 | (JP) | 2004-155530 |
| Jun. 2, 2004 | (JP) | 2004-164416 |
| Jun. 9, 2004 | (JP) | 2004-171488 |
| Jun. 28, 2004 | (JP) | 2004-189102 |

(51) Int. Cl.
*B32B 37/10* (2006.01)

(52) U.S. Cl. ............ 156/248; 156/247; 156/250; 156/267; 156/583.1; 156/258

(58) Field of Classification Search ........ 156/267, 156/250, 247, 248, 254, 258; 264/145, 163, 264/175, 1.33, 248; 425/302.1, 371
See application file for complete search history.

(56) References Cited

U.S. PATENT DOCUMENTS 6,136,142 A * 10/2000 Kitagawa et al. .......... 156/555

(Continued)

FOREIGN PATENT DOCUMENTS

JP          56-156620        11/1981

(Continued)

*Primary Examiner*—Khanh Nguyen
*Assistant Examiner*—Keith T Aziz
(74) *Attorney, Agent, or Firm*—Clark & Brody

(57) ABSTRACT

A laminating apparatus and a laminating method for finely finishing laminate processing without performing edge processing after the laminate processing is performed to a recording medium. A laminate material having a size larger than that of the recording medium is placed to cover the recording medium, bonded with heat and pressure, and a laminate layer protruding from the recording medium is transferred to a means to be transferred to, which is arranged on an opposite plane side to a recording plane of the recording medium. When the means to be transferred to is arranged apart on the opposite plane side to the recording medium, the laminate layer is pulled into the opposite plane side to the recording medium. As a result, an edge of the laminate layer formed on the recording plane of the recording medium becomes fine, matching with an edge of the recording medium.

16 Claims, 55 Drawing Sheets

U.S. PATENT DOCUMENTS

| | | | |
|---|---|---|---|
| 6,176,286 B1 * | 1/2001 | Kitagawa et al. | 156/555 |
| 6,427,744 B2 | 8/2002 | Seki et al. | |
| 2001/0004001 A1 * | 6/2001 | Kano | 156/234 |
| 2002/0170939 A1 * | 11/2002 | Onodera et al. | 228/58 |
| 2004/0194893 A1 * | 10/2004 | Shirakura et al. | 156/510 |
| 2004/0202871 A1 * | 10/2004 | Iwata et al. | 428/447 |

FOREIGN PATENT DOCUMENTS

| | | |
|---|---|---|
| JP | 58-171320 | 11/1983 |
| JP | 58-224779 | 12/1983 |
| JP | 4-125145 | 4/1992 |
| JP | 4-115646 | 10/1992 |
| JP | 6-3628 | 1/1994 |
| JP | 6-86921 | 12/1994 |
| JP | 7-232395 | 9/1995 |
| JP | 09-171278 | 6/1997 |
| JP | 10-202744 | 8/1998 |
| JP | 10-211651 | 8/1998 |
| JP | 2000-085010 | 3/2000 |
| JP | 2001-105492 | 4/2001 |
| JP | 2002123158 A * | 4/2002 |
| JP | 2002-137294 | 5/2002 |
| JP | 2002361743 | 12/2002 |
| JP | 2003-312085 | 11/2003 |
| JP | 2004-74418 | 3/2004 |
| JP | 2004-098863 | 3/2004 |

* cited by examiner

FIG. 11
(A)
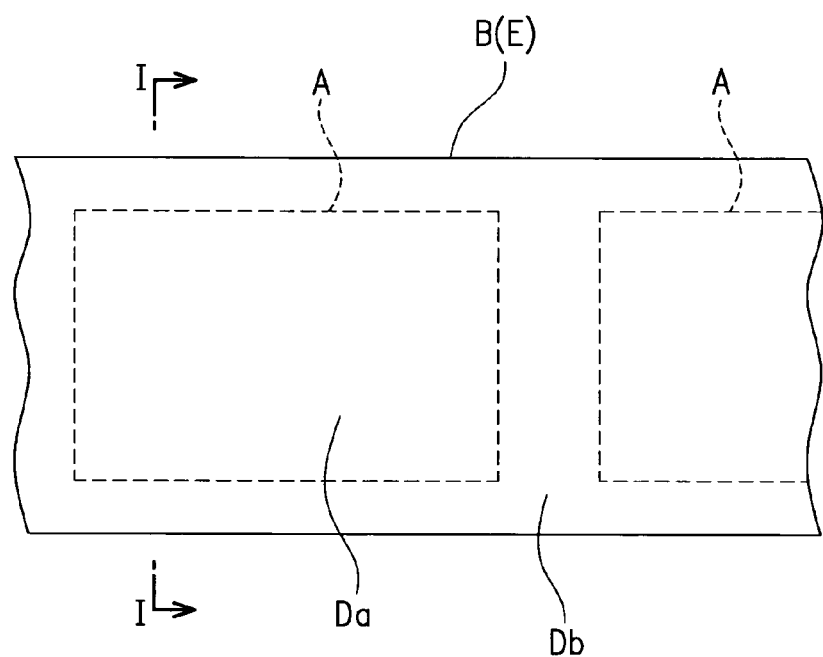
(B)
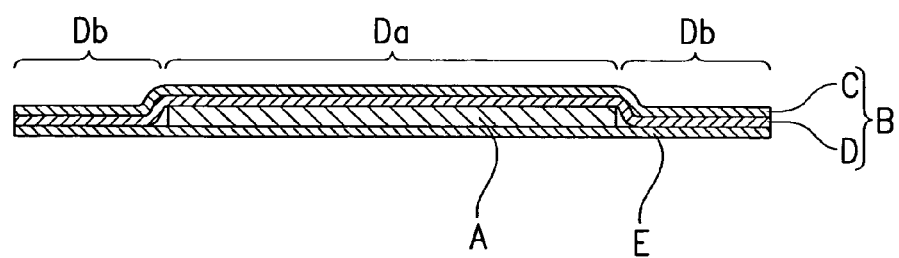

FIG.13
(A)
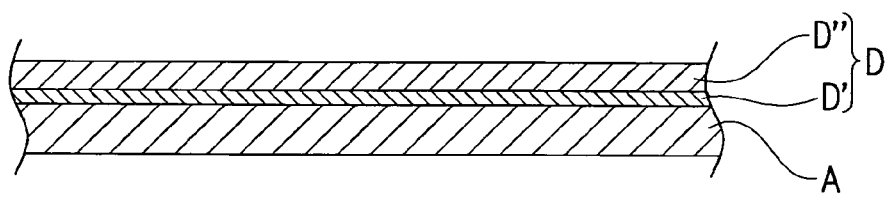
(B)
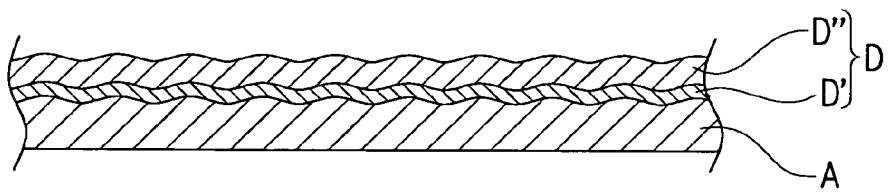
(C)
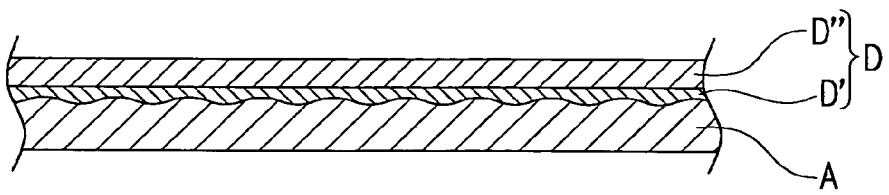

FIG.14
(A)
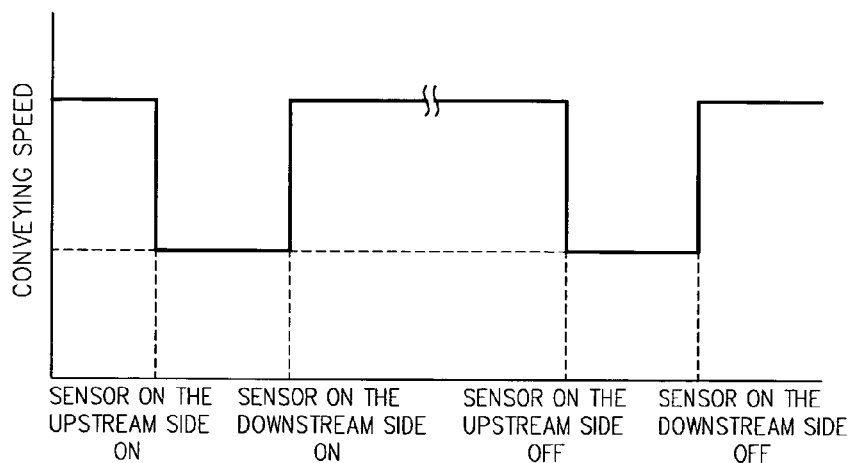
(B)
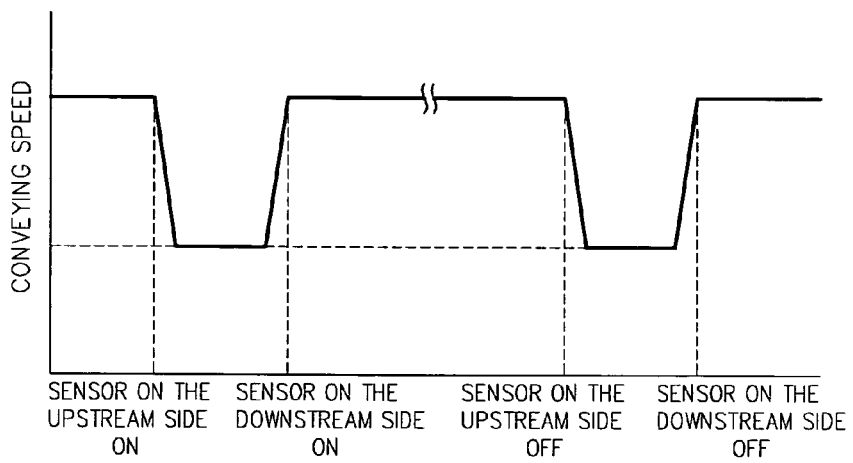
(C)
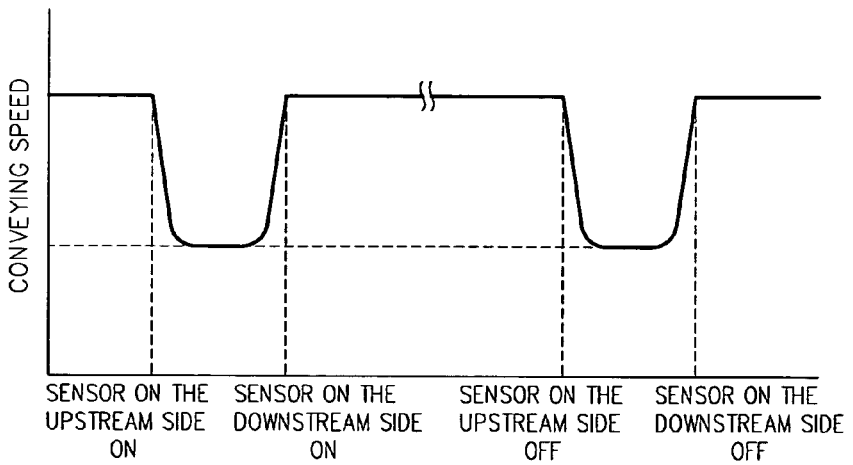

FIG. 26
(A)
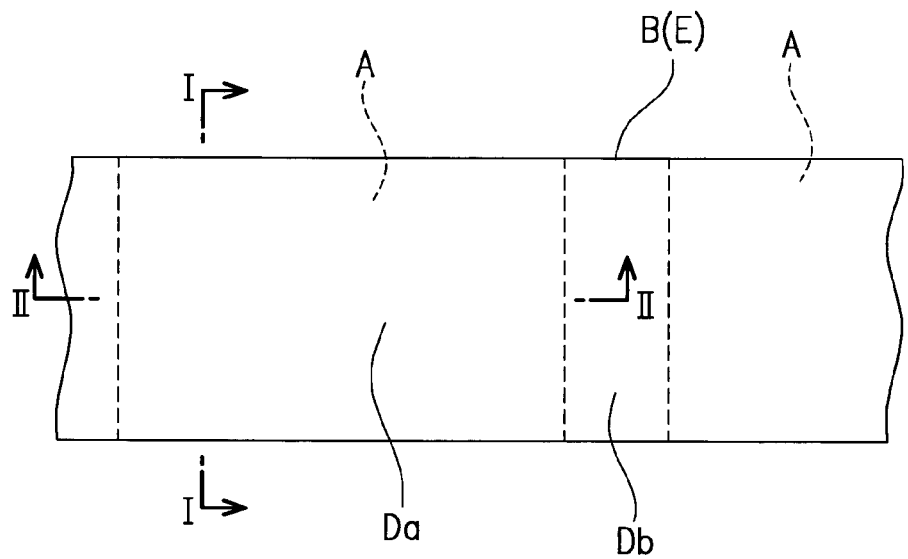
(B)
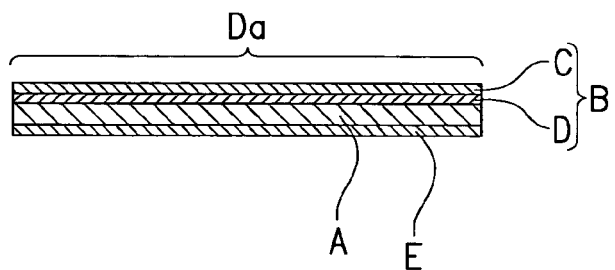
(C)
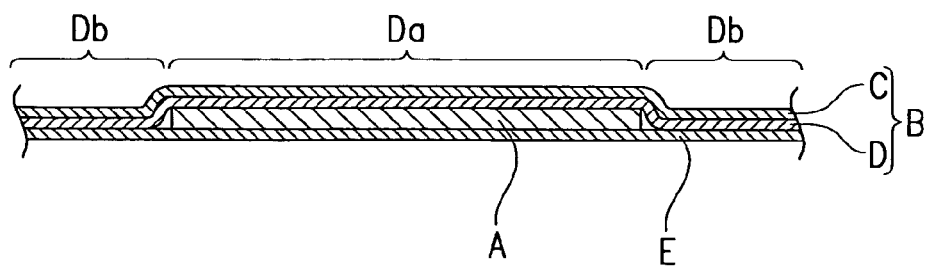

F I G . 29
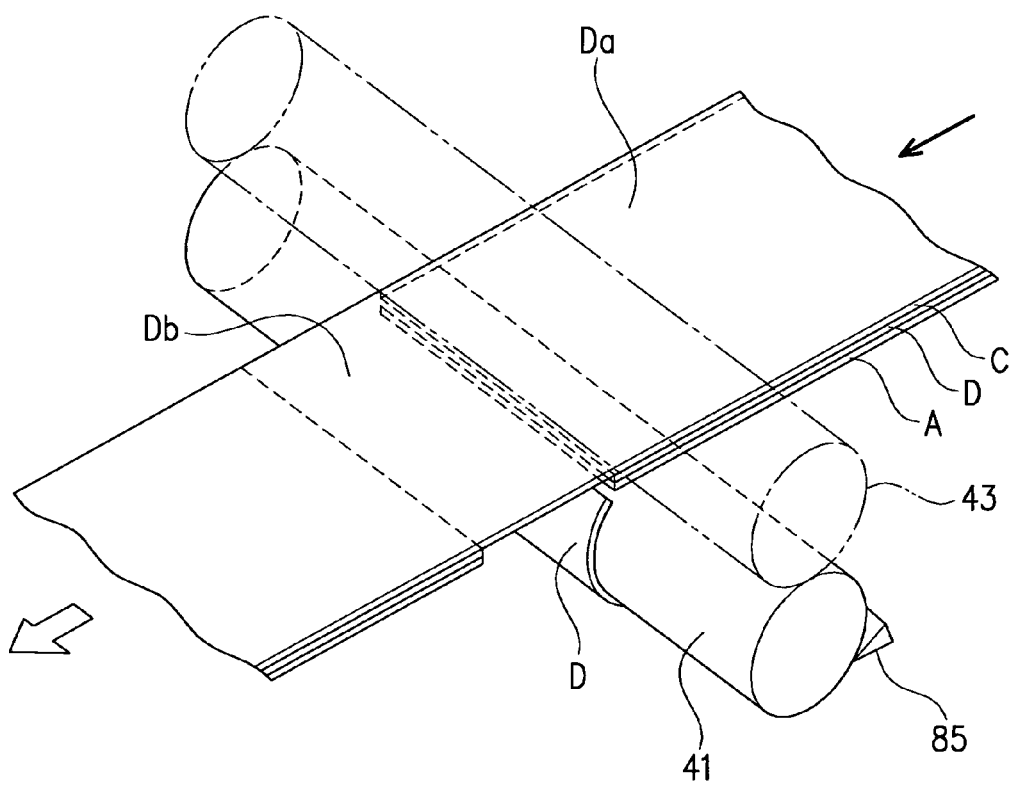

FIG. 33
(A)
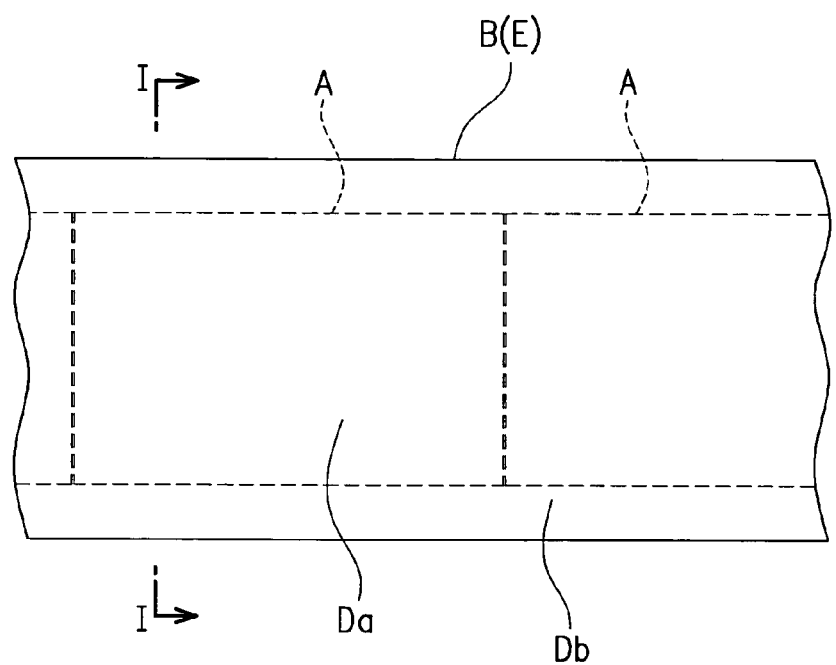
(B)
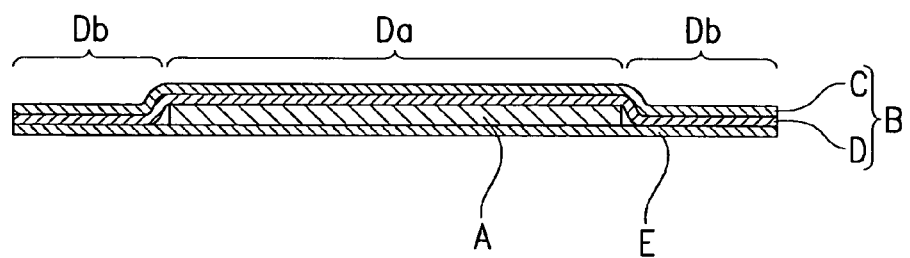

FIG.38
(A)
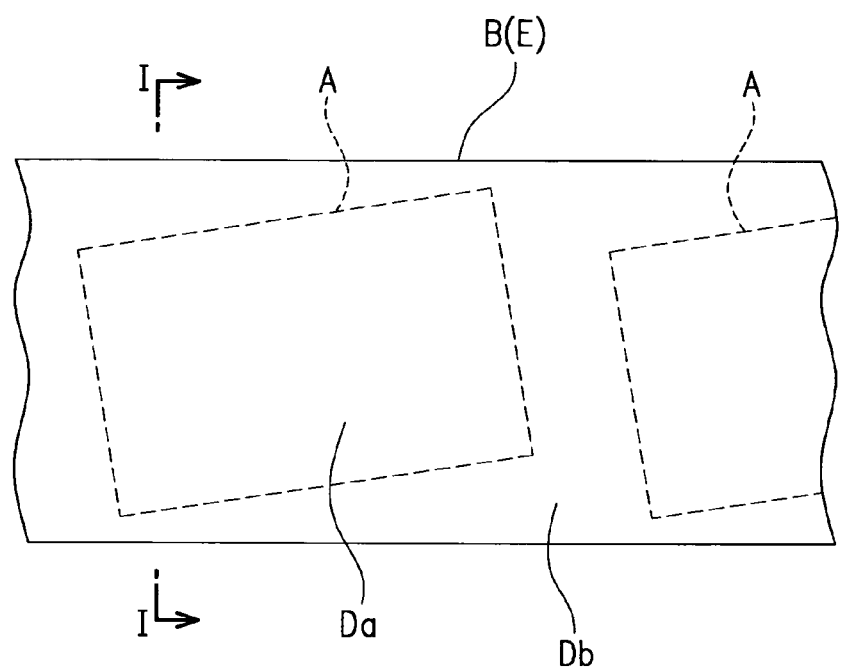
(B)
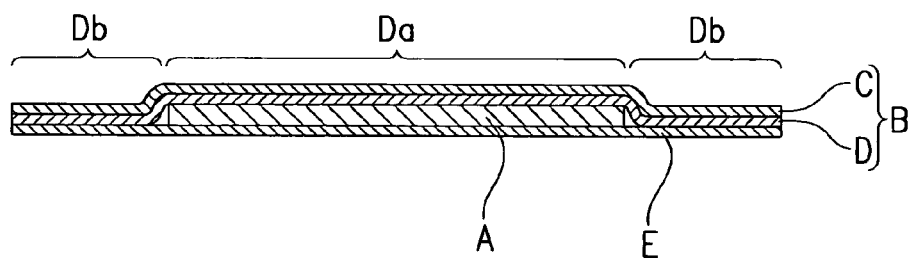

F I G . 41
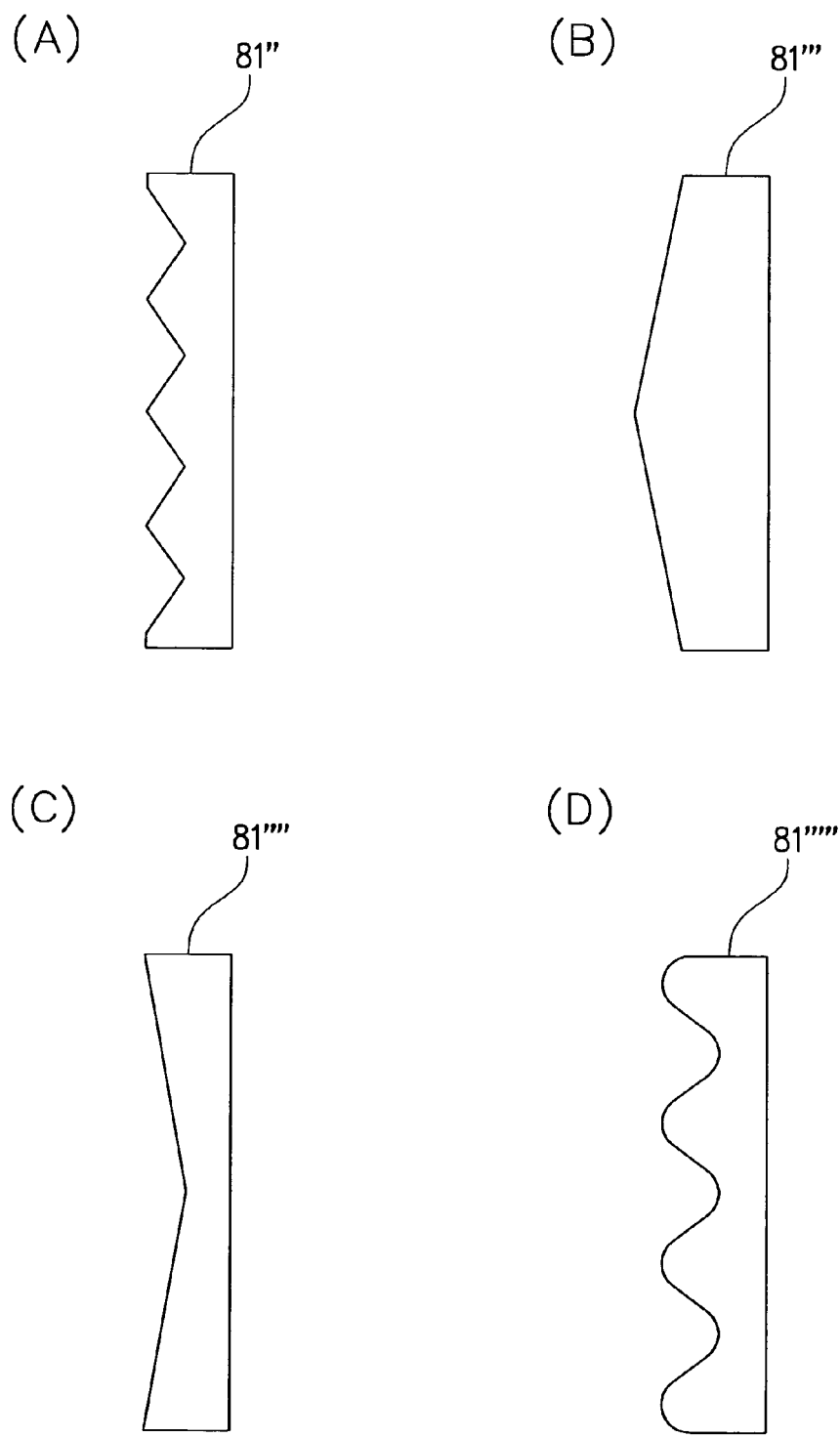

43(41,51,53)

F I G . 51
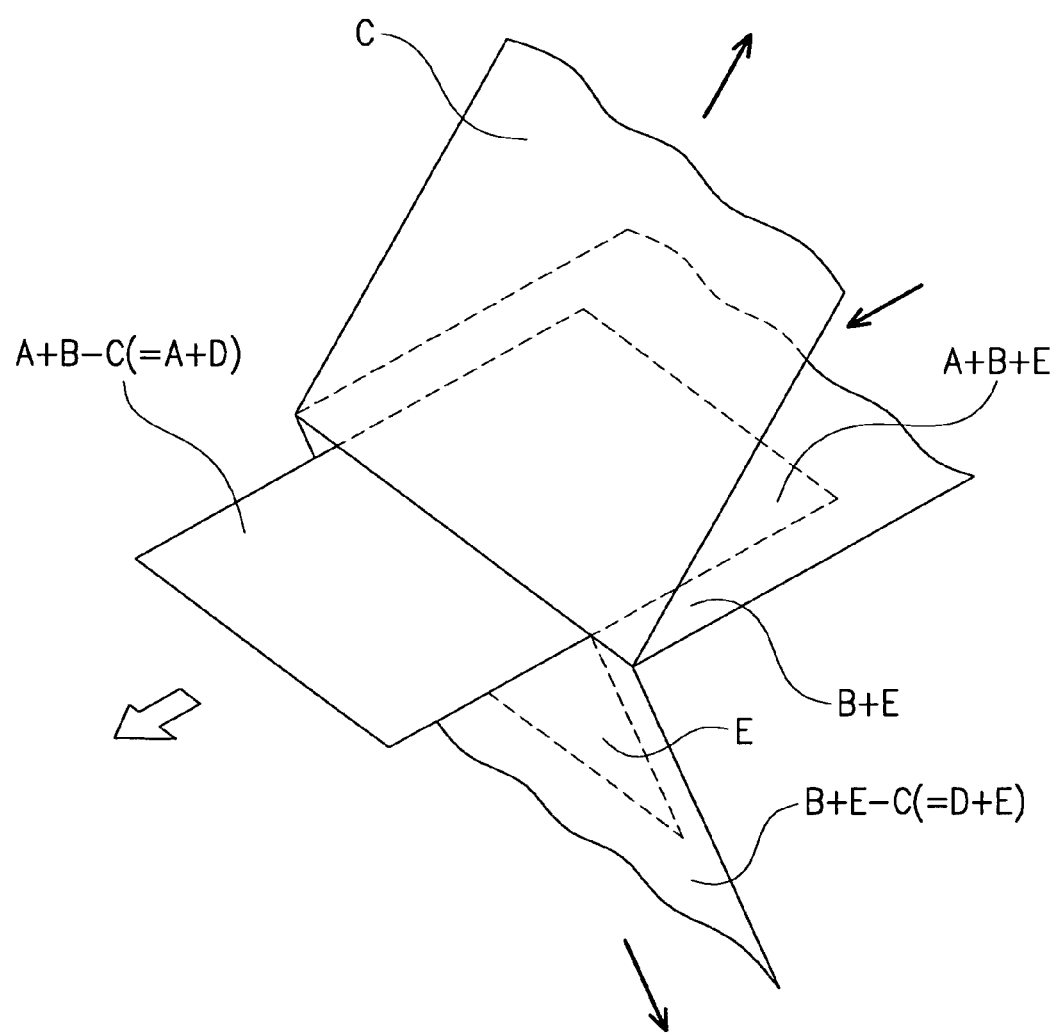

LAMINATING METHOD FOR FORMING A LAMINATE LAYER ON A RECORDING SURFACE OF A RECORDING MEDIUM

FIELD OF THE INVENTION

The present invention relates to a laminating apparatus and a laminating method that form a laminate layer on a record surface of a record medium with an image recorded thereon.

BACKGROUND OF THE INVENTION

As a result of various modifications applied to a recording apparatus (printer) or a record medium, of an inkjet recording system, a thermal transfer recording system or other recording system, they can produce images with quality comparable to that of silver salt color photographs and in these days frequently used as a technique to produce a hard copy of image information captured by a digital camera, a digital video camera, a scanner or the like, or electronic image information in a computer on paper.

In addition, in these recording systems, there is broadly known a technique to laminate with a laminate layer a recording surface of a recording medium having an image recorded thereon, for the purpose of providing lasting durability by protecting the recording surface of the recording medium, and improving the image quality by increasing glossiness or smoothness of the recording surface.

There exists, as an apparatus for use in laminating a recording surface, a laminating apparatus that supplies a laminate material made up of a substrate and a laminate layer peelably formed on the substrate onto the recording surface of each recording medium, thermally press bonding a laminate of the recording medium and the laminate material, thereby transferring the laminate layer onto the recording surface of the recording medium, and peeling off the substrate from the laminate layer (Patent Document 1).

However, in the laminating apparatus disclosed in the Patent Document 1, it is necessary to replace a laminate material with a new one having a suitable width every time a recording medium is replaced with a new one having a different width, and if an attempt is made to omit this troublesome replacement work, laminate materials having a relatively large width is to be used for various recording media having different widths. In this case, a remaining portion of the laminate layer (a portion not laminated on the recording surface: non-laminated portion) must be cut away along an edge of the recording medium after the lamination process. Whichever the case is, a troublesome work must be done.

To address the above, there exists a laminating apparatus that can omit the troublesome work of cutting away the non-laminated portion (Patent Document 2). FIG. 54 illustrates a schematic arrangement of the laminating apparatus having almost the same arrangement as that of the laminating apparatus disclosed in Patent Document 1, in that a recording medium A cut into a piece having a given feeding length and a laminate material B supplied as a continuous sheet from a roll are laminated together via a film guide roll F; they are thermally bonded together when passing between a platen roll G and a heated intermediate roll H; and then a substrate C is peeled off from a laminate layer D by a peeling-off roll I disposed on the downstream side, and in the laminating apparatus disclosed in Patent Document 2, a non-laminated portion Db is cut away from a laminated portion Da when peeling off the substrate C and is taken away along with the substrate C.

Patent Document 1: Official Gazette of Japanese Patent Application Laid-open No. Sho-58-224779

Patent Document 2: Official Gazette of Japanese Patent Application Laid-open No. Hei-10-211651

SUMMARY OF THE INVENTION

Problems to be Solved by the Invention

The laminating apparatus disclosed in Patent Document 2 is to lift up the non-laminated portion along with the substrate C by moving the substrate C away from the recording surface of the recording medium A, causing a pulling force near the boundary between the non-laminated portion Db and the laminated portion Da, by which the relevant portion is forcibly broken away (forcibly torn off).

This poses a problem, in which a part of the non-laminated portion Db is left on the side of the laminated portion Da; a part of the laminated portion Da is torn off from the recording medium A; or the edge of the laminated portion Da, along which the non-laminated portion Db has been removed, does not conform to the edge of the recording medium A but has an uneven shape, as illustrated in FIG. 55. This invites the necessity to carry out an edge treatment of the recording medium A which has been subjected to the lamination process.

In a case where the adhesive force of the laminated portion Da to the recording medium A and/or the adhesive force of the non-laminated portion to the substrate C is not uniform or poor near the edge of the recording medium A, or in a case where the conveying speed of the laminate material B, the characteristics of the laminate layer D, or the angle at which the substrate C is peeled off from the recording medium A is not appropriate, a problem may be posed in which instead of separation of the non-laminated portion Db from the laminated portion Da, the laminated portion Da is entirely torn off from the recording medium A by being pulled by the non-laminated portion Db, or the surface layer including the recording surface is torn off from the recording medium A by being pulled by the non-laminated portion Db.

The present invention has been thus conceived in consideration of those problems associated with the conventional laminating apparatus due to the system, which involves separation of the non-laminated portion from the laminated portion by moving the laminate layer laminated on the recording medium away from the recording surface (laminate surface). It is an object of the present invention to provide a laminating apparatus and a laminating method that are capable of achieving the lamination process with fine finish to a recording medium without carrying out the edge treatment after the lamination process of the recording medium.

Means to Solve the Problems

A laminating apparatus of the present invention is characterized by that a laminating apparatus for forming a laminate layer on a recording surface of a recording media comprises a press bonding unit for laying a laminate material having a size larger than the recording medium over the same and thermally press bonding them together, wherein the laminate layer protruding outwards from the recording medium is transferred onto a transfer medium means disposed on the side of the surface of the recording medium opposite to the recording surface.

A laminating method of the present invention is characterized by that a laminating method of forming a laminate layer on a recording surface of a recording medium, comprises laying a laminate material having a size larger than the recording medium over the same and thermally press bonding them together, and transferring the laminate layer protruding outwards from the recording medium onto a transfer medium means that is disposed on the side of the surface of the recording medium opposite to the recording surface.

According to the above arrangement, the laminate layer of the laminate material having a size larger than the recording medium can be adhered onto the entire recording surface of the recording medium and a portion thereof protruding outwards from the recording surface is adhered onto the transfer medium means.

Under the above state, when the transfer medium means is moved towards the side of the surface of the recording medium opposite to the recording surface, the laminate layer is pulled to (drawn into) the side opposite to the recording medium. At this moment, a pulling force acts intensively along a boundary (that is, the edge of the recording medium) between a portion having a recording medium and a portion having no recording medium, so that not only a portion having the laminate layer press bonded to the recording surface (a laminated portion having the laminate layer laminated onto the recording surface) is cut away from a portion having the laminate layer press bonded to the transfer medium means (a non-laminated portion not laminated onto the recording medium), but also the edge of the laminate layer formed on the recording surface of the recording medium is finely finished along the edge of the recording medium.

In this case, if an attempt is made to carry out the laminating process with a fine finish without the necessity to carry out edging treatment after the laminating process of the recording medium, the laminating apparatus of the present invention further comprises a separating unit for moving the recording medium with the laminate layer adhered thereon relatively away from the transfer medium means so as to separate the transfer medium means from the surface of the recording medium opposite to the recording surface.

As the transfer medium means, it is possible to use an under film. According to the laminating apparatus having this arrangement, when the laminate material is thermally press bonded to the recording surface of the recording medium and the under film, the laminate layer of the laminate material is adhered onto the entire recording surface of the recording medium, and a portion thereof protruding outwards from the recording surface adheres onto the under film. Then, by providing the separating unit, it is possible to carry out the operations including thermally press bonding the laminate material, the recording medium and the under film together and separating the laminated recording medium from the under film in sequential manner (in automatic manner).

In the laminating apparatus of the present invention, it is possible to have an arrangement in which the press contacting means comprises a pair of conveying members for conveying the recording medium while thermally press bonding the same, and one of the pair of conveying members disposed on the side of the surface of the recording medium opposite to the recording surface to be conveyed functions as the transfer medium means, as well as functioning as a transfer conveying member, on which the laminate layer is transferred when in the thermally press bonding.

According to the laminating apparatus having the above arrangement, the pair of conveying members of the press bonding unit thermally press bond the laminate material to the recording medium and the transfer conveying member while conveying the recording medium, with the recording medium interposed between the laminate material and the transfer conveying member having the recording surface facing the laminate layer, so that this thermally press bonding enables the laminate layer of the laminate material to be adhered onto the entire recording surface of the recording medium, and a portion thereof protruding outwards from the recording surface to be adhered onto the transfer conveying member.

Along with the conveying of the recording medium, the recording medium is relatively moved away from the surface of the transfer conveying member having the laminate layer adhered thereon. Accordingly, a portion having the laminate layer press bonded to the recording surface (a laminated portion) is cut away from a portion having the laminate layer press bonded to the transfer conveying member (a non-laminated portion). That is, it is possible to cut away (separate) the laminated portion from the non-laminated portion by the action of a pulling force along the edge of the recording medium along with the relative movement between the surface of the transfer conveying member and the recording medium. Herein, it is possible to make the press bonding unit function as a separating unit. Whereby, the edge of the laminate layer formed on the recording surface of the recording medium is finely finished along the edge of the recording medium without manual labor.

As a representative example of the transfer conveying member, it is possible to cite a roller member, a belt member, etc.

The laminating apparatus may further comprises a removing means for removing the laminate layer transferred onto the transfer conveying member. With this, it is possible to remove an excessive laminate layer, which is attached and stacked onto the transfer conveying member and thereby enables the thermally press bonding to be uniformly applied by the pair of conveying members, or the conveying to be carried out with a good condition.

The transfer conveying member may be detachably mounted to the press bonding unit. With this, it is possible to periodically detach the transfer conveying member and clean the same, or replace it with a new one.

In the laminating apparatus of the present invention, it is possible to employ an arrangement in which the laminate material is made up of a sheet-like substrate peelably laminated on the laminate layer, and the laminating apparatus further comprises a peeling-off unit for separating the laminate layer adhered onto the recording surface of the recording medium away from the substrate.

According to the laminating apparatus having the above arrangement, since the laminate material is made up of a sheet-like substrate peelably laminated on the laminate layer, when the laminate material is thermally press bonded to the recording surface of the recording medium and the transfer medium means at the press bonding unit, the laminate layer of the laminate material is prevented from being scratched or damaged, or wrinkled and adhered onto the entire recording surface of the recording medium, and a portion thereof protruding outwards from the recording surface is adhered onto the transfer medium means. That is, according to the laminate layer having a laminate structure made up of the laminate layer and the substrate, the laminate layer is protected by the substrate, and stiffness is given to the laminate material. Further, when thermally press bonded as described above, the laminate layer is prevented from being scratched or damaged by pressing force effected by the thermally press bonding, and the laminate layer is prevented from being wrinkled or the like and is thus adhered onto the entire recording surface and the transfer medium means.

It is possible to automatically peel of the substrate by providing the peeling-off unit for separating the laminate layer adhered onto the recording surface of the recording medium away from the substrate.

In this case, the adhesive force of the laminate layer relative to the recording surface of the recording medium is preferably set to be stronger than the adhesive force of the laminate layer relative to the substrate when the recording surface of the recording medium is laminated with the laminate layer. According to the laminating apparatus having this arrangement, the laminate layer is unlikely to be peeled off from the recording surface along with the pulling of the substrate at the time when the substrate is peeled off from the laminate layer, and thus it is possible to smoothly peel off the substrate without damaging the laminate layer and the recording medium.

In the laminating apparatus of the present invention, the transfer medium means is a film, and it is possible to use the laminate material and the transfer medium means, each of which are cut into sheet-like pieces each having a size larger than the recording medium.

According to the laminating apparatus having the above arrangement, the laminate material, the recording medium and the film can be easily laid over each other by hand without providing units or devices for supplying them. That is, the laminate material and the transfer medium means, each being a film cut into sheet-like pieces, contributes to good handling property of the laminate material, the recording medium and the film, and it is possible to easily interpose the recording medium between the laminate material and the film (transfer medium means) even by hand. Accordingly, it is possible to simplify the arrangement of the laminating apparatus by thermally press bonding the laminate material, the recording medium and the film together, which have been thus laid over each other by hand.

According to the laminating apparatus and method of the present invention, the transferred width of the laminate layer transferred onto the transfer medium means is preferably about 3 mm or larger. Although no limitation is intended to the upper limit, the transferred width of the laminate layer transferred onto the transfer medium means is intended to be a given width or larger. As a given width, it is possible to cite about 3 mm to 8 mm although it depends on the adhesiveness between the transfer means and the laminate layer. When the width is smaller that this value, the adhesiveness between the transfer medium means and the laminate layer is easy to be lowered, so that the portion having the laminate layer press bonded to the recording surface may not be finely cut away from the portion having the laminate layer press bonded to the transfer medium means.

According to the laminating apparatus and method of the present invention, it is possible to employ an arrangement in which the thermally press bonding is carried out several times.

According to the above arrangement, the thermally press bonding is carried out not only one time but several times, so that the adhesiveness of the laminate layer to the recording surface of the recording medium is increased. By the increase of the adhesiveness, air mixed between the recording medium and the laminate layer can be appropriately removed without being left as air bubbles.

In a case where the peeling-off step is provided, the peeling-off unit may be disposed between the first press boding unit and the second press bonding unit, or may be disposed downstream of the second press bonding unit. In the former case, the thermally press bonding is carried out at the first press bonding unit for an intermediate in laminate structure of the laminate layer and the substrate having high stiffness compared with the laminate layer, and is carried out at the second press bonding unit for an intermediate with the substrate peeled off therefrom. In the latter case, the thermally press boding is carried out at any one of the first press bonding unit and the second press bonding unit for an intermediate having the substrate still laminated on the laminate layer.

According to the laminating apparatus and method of the present invention, it is possible to employ an arrangement in which the thermally press bonding is again carried out for an intermediate with the substrate peeled off therefrom.

According to the above arrangement, the thermally press bonding is carried out in an upstream stage of the peeling-off step, and again carried out in a downstream stage of the peeling-off step. In the upstream stage, the thermally press bonding is carried out for an intermediate having the substrate, which is high stiffness as compared with the laminate layer, still laminated on the laminate layer, so that it is possible to prevent damaging or scratching the laminate layer by the substrate when in the thermally press bonding, or prevent wrinkles in the laminate layer. In the downstream stage, the thermally press bonding is carried out for an intermediate having the substrate peeled off therefrom, so that the laminate layer is softened upon release from the restriction of the substrate, and thus the press bonding force directly acts on the laminate layer. Accordingly, the adhesiveness of the laminate layer to the recording surface of the recording medium is increased. Therefore, even if air is mixed between the recording medium and the laminate layer when laminating the laminate material to the recording medium, it can be appropriately removed and thus a finely finished surface can be produced.

In this case, according to the laminating apparatus of the present invention, from the point of view of the finishing treatment, as the heating temperature and/or the press contact force at the second press bonding unit are preferably set to be lower than the heating temperature and/or the press contact force at the press bonding unit (first press bonding unit).

According to the laminating apparatus of the present invention, it is possible to employ an arrangement, in which the press bonding unit (first press bonding unit) and/or the second press bonding unit each comprise a pair of rollers for causing a press contacting effect, and at least one of each pair of rollers, which acts on the laminate layer, comprises a roller having a soft layer on a rigid roller surface.

According to the laminating apparatus having the above arrangement, the soft layer of the roller, which acts on the laminate layer by the press contacting force of the rollers, is elastically deformed, so that the area of area of the surface, through which the press bonding action is caused, is increased. Therefore, the adhesiveness of the laminate layer to the recording surface of the recording medium is increased. Accordingly, even if air mixes between the recording medium and the laminate layer, it can be securely forced outwards, or dispersed on the recording surface of the recording medium to such a degree as not to be visible, and therefore the air is unlikely to remain as air bubbles. When the soft layer is excessively thick or the roller is entirely soft, the roller surface is recessed to be in conformity with the surface configuration of the opposite roller, the contacting surface between both the rollers is formed into an arc shape relative to the conveying surface of the recording medium, and therefore the straight traveling performance of the recording medium when it is conveyed is deteriorated, and when the soft layer is excessively thin, the effect of the elastic deformation is not appropriately exhibited. Accordingly, the thickness of the soft layer is preferably about 1 mm.

According to the laminating apparatus of the present invention, it is possible to employ an arrangement, in which the press bonding unit (first press bonding unit) and/or the second press bonding unit each comprise a pair of rollers for causing a press contacting effect, and at least one of each pair of rollers is formed into a drum-like shape having an outer diameter that is reduced as it advances from the center portion towards the opposite ends in the axial direction, and is designed to be elastically deformed by being urged.

According to the laminating apparatus having the above arrangement, when the laminate material is pressed by urging of the opposite ends of the roller, the center portion of the roller contacts the laminate material. Accordingly, the roller is elastically deformed by urging of the opposite ends, and contacts the laminate material via the outer circumference of the roller throughout the entire length, so that the laminate material is evenly pressed to the recording medium, and thus the laminate material is evenly thermally press bonded to the recording surface.

Thus, it is possible to evenly thermally press bond the laminate material to the recording surface of the recording medium even when the laminate material is pressed by the roller while being heated, and improve the finishing quality.

According to the laminating apparatus of the present invention, it is possible to employ an arrangement, in which the press bonding unit (first press bonding unit) and/or the second press bonding unit each are provided with a pair of press contacting means for causing a press contacting effect, wherein one of each pair of press contacting means, which acts on the laminate layer, has an acting surface having an uneven surface configuration.

According to the laminating apparatus having the above arrangement, the surface pattern of the press contacting means is transferred onto the laminate layer by thermally press bonding, the surface of the laminate layer is also formed into an uneven surface configuration, thus realizing a laminate process with a semi-glossy finish such as mat finish or non-glossy finish.

According to the laminating apparatus and method of the present invention, it is possible to employ an arrangement, in which plural recording media are supplied to have a precedent recording medium spaced with a given distance from a subsequent recording medium, and then thermally press bonded.

According to the above arrangement, when the laminate material is thermally press bonded to the recording surface of each recording medium and the transfer medium means, the laminate layer and the transfer medium means is securely adhered to each other between the precedent recording medium and the subsequent recording medium.

The recording media supplied with a given distance from each other have the laminate layer and the transfer medium means thermally press bonded between the precedent recording medium and the subsequent recording medium, so that the area of the laminate layer adhered onto the transfer medium means can be increased and the adhesive force of the laminate layer to the recording medium means can be increased. Thus, it is possible to securely prevent the laminate layer from being released from the adhered state with the transfer medium means (from being peeled off from the transfer medium means) when the recording medium with the laminate layer adhered thereon is moved away from the transfer medium means. Whereby, a portion having the laminate layer press bonded to the recording surface (a laminated portion having the laminate layer laminated on the recording surface) can be securely cut away from a portion having the laminate layer press bonded to the transfer medium means (a non-laminated portion not laminated on the recording medium).

Alternatively, contrarily to this, according to the laminating apparatus and method of the present invention, it is possible to employ an arrangement, in which the laminate material having a length in the first direction longer than the length of each recording medium in the first direction and a length in a second direction orthogonal to the first direction longer than the length of each recording medium in a second direction orthogonal to the first direction is used, and the recording media and the laminate material are supplied along the first direction so as to have a precedent recording medium kept substantially close to a precedent recording medium.

According to the above arrangement, the laminate material having a size larger than the recording medium, the transfer medium means and the recording medium interposed therebetween are thermally press bonded, so that the laminate layer of the laminate material is adhered onto the entire recording surface of the recording medium and a portion thereof protruding outwards from the opposite lateral ends of the recording surface in a direction (width direction) orthogonal to the supplying (conveying) direction is adhered onto the transfer medium means.

In addition, when a capability to sequentially and successively supply recording media is given, it is possible to carry out the thermally press bonding without spacing between the adjacent recording media. Accordingly, while a precedent recording medium is kept substantially close to a subsequent recording medium, the laminate layer can be formed (adhered) on the recording surfaces of both the recording media. Thus, a non-laminated portion between the adjacent recording media is almost not formed and the laminate material for it is saved and the running cost can be reduced.

Although the precedent recording medium is kept connected to the subsequent recording medium via the laminate layer after the separation of the transfer medium means, for example, both the recording media can be separated from each other in a cutting step provided after the separation step of the transfer medium means. In the cutting step of this case, it is possible to employ an arrangement, in which both the recording media kept connected together are moved relatively away from each other, the laminate layer connecting both the recording media is ruptured and both are separated from each other.

According to the laminating apparatus and method of the present invention, it is possible to employ an arrangement, in which the laminate material having a length in a first direction longer than the length of each recording medium in the first direction and a length in a second direction orthogonal to the first direction being substantially equal to the length of each recording medium in a second direction orthogonal to the first direction is used, and the recording media and laminate material are supplied to have the opposite ends of the laminate material in the second direction substantially matched to the opposite ends of each recording medium in the second direction, and are thermally press bonded.

According to the above arrangement, when the laminate material is thermally press bonded to each recording medium and the transfer medium means at the press bonding unit, the laminate material (laminate layer) protruding outwards from the opposite ends of each recording medium in the first direction is adhered onto the transfer medium means while the opposite ends of each recording medium and the opposite ends of the laminate material, in the second direction are being substantially matched to each other.

Since a laminate is formed, in which the opposite ends of each laminate material and the opposite ends of the laminate material are substantially matched to each other after they are thermally press bonded at the press bonding unit and only a portion of the laminate material (laminate layer) protruding outwards from the opposite ends of each recording medium in the first direction is adhered onto the transfer medium means, it is possible to reduce the formation of a non-laminated portion not used for the laminate, and minimize the consumption of the laminate material as much as possible.

In this case, according to the laminate apparatus of the present invention, it is possible to employ an arrangement, in which the laminate material supplying unit includes a storing means for storing the laminate material in such a manner as to be capable of supplying the same to the press bonding unit, and the storing means is designed to be capable of being replaced with a different storing means that stores a laminate material having a length in the second direction corresponding to the length of each recording medium in the second direction, so as to correspond to the size of each recording medium supplied from the recording medium supplying unit. With this arrangement, it is possible to carry out the lamination process corresponding to the size of each recording medium supplied from the recording medium supplying unit. In this case, the storing means preferably comprises a holder that axially supports the laminate material, which is lengthy in the first direction and is wound into a roll. With this, it is possible to successively supply the laminate material to have the opposite ends thereof in the second direction matched to the opposite ends of each recording medium in the second direction, which is supplied from the recording medium supply unit, by pulling out the laminate material in the first direction.

In another embodiment, it is possible to employ an arrangement, in which the recording medium supplying unit and the laminate material supplying unit are designed to be capable of respectively supplying the laminate material and the recording media towards the press bonding unit so as to bring the first direction of the laminate material and the recording media into the supplying direction thereof, and a limiting guide is provided at least on the upstream side of the press bonding unit so as to guide the opposite ends of each of the laminate material and each recording medium in the second direction, thereby limiting the movement of each of the laminate material and the recording media in the second direction. With this, it is possible to supply the recording media and the laminate material to the press bonding unit while the opposite ends of each recording medium in the second direction is being securely and substantially matched to the opposite ends of the laminate material in the second direction.

According to the laminating apparatus and method of the present invention, it is preferable to employ an arrangement, in which at least one of the laminate material and the under film is preheated before thermally press bonding.

According to the above arrangement, the pair of conveying members convey the laminate material, each recording medium and the under film while thermally press bonding the same together, with the arrangement, in which each recording medium is interposed between the sheet-like laminate material and the under film with the recording surface facing the laminate layer, in which the laminate material is formed by the laminate layer for laminating the recording surface, which layer having a surface area larger than the surface area of each recording medium, and the under film is disposed on the opposite side to the recording surface of each recording surface. Accordingly, the laminate layer of the laminate material is adhered onto the entire recording surface of each recording medium and a portion thereof protruding outwards from the recording surface is adhered onto the under film by thermally press bonding.

In addition, since at least one of the laminate material and the under film is preheated before thermally press bonding, the preheated laminate material and/or the under film are easy to be heated to a desired temperature at a thermally press bonding portion at which these laminate material and under film are heated to the desired temperature, and therefore it is possible to obtain the stabilized heating temperature when the thermally press bonding is to be carried out.

In this case, according to the laminating apparatus of the present invention, it is possible to employ an arrangement, in which at least one of the pair of conveying members is any one of a roller member and a belt member that is heated for the thermally press bonding and has a surface moving for the conveyance, and any one of the laminate material and the under film or at least one of the laminate material and the under film, which is disposed on the side of any one of the roller member and the belt member, is partially wound around any one of the roller member and the belt member so as to provide a preheat area having a given width on the upstream side of a thermally press bonding point in a surface moving direction of any one of the roller member and the belt member and to be preheated at the preheat section. With this arrangement, the roller member or the belt member is used for thermally press bonding, and the laminate material and/or the under film wound around the roller member or the belt member are preheated at the preheat area. Accordingly, it is not necessary to provide a preheating device or unit separately from the roller member or the belt member. Whereby, the arrangement can be simplified and the cost can be held down as a result of the simplification.

It is possible to employ an arrangement, in which the apparatus further includes a free roller, which is rotatably disposed corresponding to the member to be heated, of the conveying members, in an area capable of being influenced by heat from the member to be heated, wherein any one of the laminate material and the under film or at least one of the laminate material and the under film is wound around the free roller so as to be further preheated by the free roller influenced by heat from the member to be heated, prior to thermally press bonding. With this, the preheated laminate material and/or under film are easier to be heated to a desired temperature, and therefore it is possible to obtain the stabilized heating temperature when the thermally press bonding is to be carried out. Since the free roller is heated by utilizing heat from one of the conveying members to be heated, it is not necessary to provide a heating means separately from the heating means of the member to be heated, and therefore the cost can be held down for it. As a material, which can be used at least for the surface of the free roller, it can be cited materials having high heat absorptivity and high heat conductivity, such as dark metal materials (specifically, black alumite).

In this case, the free roller is not limited to the one which is capable or not capable of being influenced by heat of the one of the conveying members to be heated. That is, it is possible to employ an arrangement, in which the press bonding unit comprises a pair of conveying members that convey recording media while thermally press heating the same, and a free roller that is disposed on the upstream side of the pair of conveying members and is designed to be heated, wherein the laminate material and/or the under film are wound around the free roller prior to thermally press bonding.

At least one of the pair of conveying members is designed to be heated for thermally press bonding, and the free roller is disposed in an area capable of being influenced by heat from the at least one of the pair of conveying members so as to be heated.

The free roller may have a surface layer on the surface of a roller body, which surface layer having a higher heat absorptivity than the roller body. As a material, which can be used for the surface of the free roller, it can be cited black alumite, as described above.

According to the laminating apparatus and method of the present invention, it is possible to employ an arrangement, in which the transfer medium means is separated upon elapse of a given time after thermally press bonding.

According to the above arrangement, when the laminate material is thermally press bonded to the recording surface of each recording medium and the transfer medium means, the laminate layer of the laminate material is activated and then adhered onto the entire recording surface of the recording medium, and a portion thereof protruding outwards from the recording surface is adhered onto the transfer medium means. For example, when the laminate layer is made of a thermo plastic resin or the like, the laminate layer is softened by heating and the adhesive effect is produced, so that the laminate layer is adhered onto each recording medium and the transfer medium means by the adhesive effect and the application of pressure.

Since the laminate material is kept activated at the time immediately after the thermally press bonding or in a given time, it has adhesiveness or the like while having stickiness or the like. Therefore, when an external force (e.g., a force in a direction in which the laminate material is peeled off (separated) from the recording surface of each recording medium, or a force applied to move the laminate material in a surface direction) is applied, a displacement (slippage) may occur between the laminate material and the recording surface, or the laminate material may be peeled off from the recording surface. However, with the above arrangement, the separating unit is provided to move each recording medium with the laminate layer adhered thereon relatively away from the transfer medium means upon elapse of a given time after thermally press bonding at the press bonding unit (after the adhesiveness has been stabilized) so as to separate the surface of each recording medium opposite to the recording surface from the transfer medium means. Therefore, it is possible to cut the laminated portion away from the non-laminated portion and finely finish the edge of the laminate layer formed on the recording surface of each recording medium, along the edge of the recording medium, as well as preventing the occurrence of displacement, peeling-off or the like between the laminate material and the recording medium when in the laminating process.

According to the laminating apparatus of the present invention, it is possible to employ an arrangement, in which the apparatus further comprises a forcibly cooling means for cooling each laminate formed by thermally press bonding at the press bonding unit.

According to the laminating apparatus having the above arrangement, the laminate material, having the laminate layer which is formed in an area larger than the surface area of each recording medium, is used. Therefore, when the laminate material is thermally press bonded to each recording medium and the transfer medium means at the press bonding unit, the laminate layer is activated and produces an adhesive effect or the like and then adhered onto the entire recording surface of the recording medium and a portion of the transfer medium means protruding outwards from the recording surface of the recording medium, thus forming a laminate. Then, the laminate is forcibly cooled by the forcibly cooling means so that the laminate layer is securely adhered onto the recording surface.

Since the laminate material is thermally press bonded to each recording medium and the transfer medium means at the press bonding unit, for the laminate layer of the laminate material, a material producing an adhesive effect (adhesiveness or the like) to the recording surface and the transfer medium means by heating, such as a thermo plastic resin, which is softened and produces the adhesiveness (has its adhesive activated) by heating, is employed.

Accordingly, when an external force has been applied to the laminate material (when the recording medium having the laminate material adhered thereon is moved relatively away from the transfer medium means), peeling-off or displacement (slippage) may occur between the laminate layer and the recording surface. However, since there is provided the forcibly cooling means in the laminating apparatus of the present invention, the activated state of the laminate layer can be suppressed by cooling of the forcibly cooling means, and even when the transfer medium means is moved relatively away from the recording medium, it is possible to form the laminate layer on the recording surface with a finely finish edge along the edge of the recording medium. Since a laminate is forcibly cooled, it is possible to bring the laminate back into a substantially normal equilibrium state by cooling in a short time, as compared with the case in which the laminate is naturally cooled along with the elapse of the time after thermally press bonding, and therefore carry out the laminating process to each recording medium in a short time.

According to another embodiment, it is possible to employ an arrangement, in which the apparatus further comprises a conveying passage for conveying each laminate formed by thermally press bonding at the press bonding unit, wherein the conveying passage is defined by a guide member for guiding each laminate, and the guide member has a heat releasing property so as to constitute the forcibly cooling means. With this arrangement, when a laminate is guided by the guide member, the heat of the laminate is transferred to the guide member and this heat is released to the outside from the guide member. Thus, it is possible to cool a laminate by a simplified arrangement.

According to the laminating apparatus of the present invention, it is possible to employ an arrangement, in which the apparatus further comprises a guide member that is disposed upstream of a separating point of the separating unit, at which a laminated portion is separated from a non-laminated portion, so as to limit the movement of the laminated portion and the non-laminated portion in a direction crossing a first direction in the upstream side of the separating point.

Since the separating unit is designed to separate the laminated portion from the non-laminated portion by moving the non-laminated portion in a second direction different from a feeding direction (first direction) so as to move the transfer medium means away from the surface of the recording medium opposite to the recording surface, the laminated portion is moving along with the non-laminated portion by being pulled by the non-laminated portion due to the change in moving direction of the non-laminated portion, when the laminated portion is separated from the non-laminated portion.

That is, as described above, when a laminated portion is to be separated from a non-laminated portion by a pulling force intensively acted along the edge of each recording medium at the separating unit, the moving direction of the non-laminated portion is changed to the second direction, so that the non-laminated portion on the downstream side is oriented at a given angle (preferably acute angle (not more than 90°)) relative to the laminated portion and the non-laminated portion located on the upstream side of the separating point, at which the laminated portion is separated from the non-laminated portion. Accordingly, along with the change of the moving direction of the non-laminated portion, there may cause lifting-up or flapping in the laminated portion and the non-laminated portion, of the upstream side of the separating point, with the point (separating point), at which the moving direction of the laminated portion is deviated from the moving direction of the non-laminated portion, being served as a fulcrum.

Accordingly, even when an attempt is made to change the direction between the laminated portion and the non-laminated portion on the downstream side in consideration of the aforesaid separation characteristics between the laminated portion and the non-laminated portion, the laminated portion and the non-laminated portion on the upstream side may be lifted up, which leads to the possibility that an angle required for separation of the laminated portion from the non-laminated portion cannot be secured. According to the laminating apparatus having the above arrangement, the guide member is disposed upstream of the separating point of the separating unit, at which the laminated portion is separated from the non-laminated portion, so as to limit the movement of the laminated portion and the non-laminated portion in a direction crossing the first direction in the upstream side of the separating point. Therefore, as described above, even when the moving direction of the laminated portion is different from the moving direction of the non-laminated portion, it is possible to prevent the lifting-up or flapping of the laminated portion and the non-laminated portion located on the upstream side of the separating point, and securely separate the laminated portion from the non-laminated portion.

Alternatively, according to the laminating apparatus of the present invention, it is possible to employ an arrangement, in which the apparatus further comprises a guide member that is disposed corresponding to a separating point of the separating unit at which a laminated portion is separated from a non-laminated portion and its proximity, so as to limit the movement of the laminated portion at the separating point and its proximity, in a direction opposite to the moving direction of the non-laminated portion which moves in the downstream side of the separating point.

Since the separating unit is designed to separate the laminated portion from the non-laminated portion by moving the non-laminated portion in a second direction different from a feeding direction (first direction) so as to move the transfer medium means away from the surface of the recording medium opposite to the recording surface, the laminated portion is moving along with the non-laminated portion by being pulled by the non-laminated portion due to the change in moving direction of the non-laminated portion, when the laminated portion is separated from the non-laminated portion. Particularly, when the tailing end of the laminated portion (recording medium) is passing the separating unit (separating point), the laminated portion is easy to follow the non-laminated portion located on the downstream side of the separating point and changed its position, and therefore when the laminated portion has been finally separated from the non-laminated portion along the boundary therebetween by a pulling force intensively acting along the boundary, there is caused flapping in the tailing end of the laminated portion by the action of the elasticity of the laminated portion, which deteriorates the conveying stability of the laminated portion after separation.

In addition, by the flapping of the tailing end of the laminated portion, dust whirls in the laminating apparatus (when the recording medium is paper, paper powder or the like attached to the edge of the recording medium), and the dust adheres on a laminate material before thermally press bonding, which leads to the problem that there is formed a laminated portion with dust therein.

However, according to the laminating apparatus having the above arrangement, there is further provided the guide member that is disposed corresponding to the separating point of the separating unit at which a laminated portion is separated from a non-laminated portion and its proximity, so as to limit the movement of the laminated portion at the separating point and its proximity, in a direction opposite to the moving direction of the non-laminated portion which moves in the downstream side of the separating point. Accordingly, when the tailing end of the laminated portion is separated from the non-laminated portion, the tailing end of the laminated portion is swung in a direction opposite to the moving direction of the non-laminated portion on the downstream side of the separating point (after the separation) by a self-repulsive force. However, this motion is limited by the guide member so that the flapping of the tailing end of the laminated portion can be minimized and the conveying stability of the laminated portion can be maintained. In addition, it is possible to prevent whirling of dust within the laminating apparatus and form a finely finished laminate layer on the recording surface of the recording medium.

Alternatively, according to the laminating apparatus of the present invention, it is possible to employ an arrangement, in which the apparatus further comprises a guide member that is disposed between an upstream side and a downstream side, of the separating unit, straddling over a separating point of the separating unit, at which a laminated portion is separated from a non-laminated portion, so as to limit the movement of the laminated portion and the non-laminated portion in a direction crossing a first direction in the upstream side of the separating point, and limit the movement of the laminated portion at the separating point and its proximity in a direction opposite to the moving direction of the non-laminated portion which moves in the downstream side of the separating point.

Since the separating unit is designed to separate the laminated portion from the non-laminated portion by moving the non-laminated portion in a second direction different from a feeding direction (first direction) so as to move the transfer medium means away from the surface of the recording medium opposite to the recording surface, the laminated portion is moving along with the non-laminated portion by being pulled by the non-laminated portion due to the change in moving direction of the non-laminated portion, when the laminated portion is separated from the non-laminated portion.

That is, as described above, when a laminated portion is to be separated from a non-laminated portion by a pulling force intensively acted along the edge of each recording medium at the separating unit, the moving direction of the non-laminated portion is changed to the second direction, so that the non-laminated portion on the downstream side is oriented at a given angle (preferably acute angle (not more than 90°)) relative to the laminated portion and the non-laminated portion located on the upstream side of the separating point, at which the laminated portion is separated from the non-laminated portion. Accordingly, along with the change of the moving direction of the non-laminated portion, there may cause lifting-up or flapping in the laminated portion and the non-laminated portion, of the upstream side of the separating point, with the point (separating point), at which the moving direction of the laminated portion is deviated from the moving direction of the non-laminated portion, being served as a fulcrum.

Accordingly, even when an attempt is made to change the direction between the laminated portion and the non-laminated portion on the downstream side in consideration of the aforesaid separation characteristics between the laminated portion and the non-laminated portion, the laminated portion and the non-laminated portion on the upstream side may be lifted up, which leads to the possibility that an angle required for separation of the laminated portion from the non-laminated portion cannot be secured.

When the tailing end of the laminated portion (recording medium) is passing the separating unit (separating point), the laminated portion is easy to follow the non-laminated portion located on the downstream side of the separating point and changed its position, and therefore when the laminated portion has been finally separated from the non-laminated portion along the boundary therebetween by a pulling force intensively acting along the boundary, there is caused flapping in the tailing end of the laminated portion by the action of the elasticity of the laminated portion, which deteriorates the conveying stability of the laminated portion after separation. In addition, by the flapping of the tailing end of the laminated portion, dust whirls in the laminating apparatus (when the recording medium is paper, paper powder or the like attached to the edge of the recording medium), and the dust adheres on a laminate material before thermally press bonding, which leads to the problem that there is formed a laminated portion with dust therein.

However, according to the laminating apparatus having the above arrangement, there is provided the guide member that is disposed between an upstream side and a downstream side, of the separating unit, straddling over a separating point of the separating unit, at which a laminated portion is separated from a non-laminated portion, so as to limit the movement of the laminated portion and the non-laminated portion in a direction crossing a first direction in the upstream side of the separating point, and limit the movement of the laminated portion at the separating point and its proximity in a direction opposite to the moving direction of the non-laminated portion which moves in the downstream side of the separating point. Therefore, even when the moving direction of the laminated portion is different from the moving direction of the non-laminated portion, it is possible to prevent the lifting-up or flapping of the laminated portion and the non-laminated portion located on the upstream side of the separating point, and securely separate the laminated portion from the non-laminated portion. In addition, it is possible to minimize the flapping of the tailing end of the laminated portion when the laminated portion is separated from the non-laminated portion, maintain the conveying stability of the laminated portion, prevent whirling of dust within the laminating apparatus and form a finely finished laminate layer on the recording surface of the recording medium.

According to the laminating apparatus and method of the present invention, the separating step of the transfer medium means may be carried out after the peeling-off step of the substrate. Alternatively, contrarily to this, the peeling-off step of the substrate may be carried out after the separation step of the transfer medium means.

According to the above arrangement, with respect to the peeling-off (peeling-off step) of the substrate by the peeling-off unit and the separation (separating step) of the transfer medium means by the separating unit, any one of the steps is carried out after the residual step, so that a pulling force relating to the separation is not dispersed but can be applied intensively along the edge of each recording medium. It is also possible to prevent flapping or the like in the normal direction and therefore securely convey a recording media.

In the above case, it is optional which step is to be first carried out. If the separation of the transfer medium means is carried out for an intermediate with the substrate still adhered thereon (when the separation step is first carried out), the substrate having a weak adhesive force may be partially peeled off from the laminate layer. Accordingly, in the latter peeling-off step, a pulling force for peeling off the substrate may not be successively and evenly applied, and thus the quality (finished condition) of the surface may be deteriorated. For preventing this problem, it is effective to carry out the separation (separating step) of the transfer medium means after the substrate has been peeled off (after the peeling-off step). With this arrangement, it is also expected to produce an effect of intensively applying a pulling force for the separation along the edge of each recording medium, since the separation step is carried out under the condition without restriction of the substrate.

On the other hand, when the peeling-off of the substrate is carried out after the separation of the transfer medium means (after the separation step), the substrate is kept adhered onto the laminate layer until the peeling-off step, and therefore it is expected to produce an effect that a display surface (the surface on the side of the recording surface) of each recording medium is hard to be scratched or damaged. Also, since the display surface is protected, it is assumed to produce an advantage that the manufacturing costs can be lowered such as by using a low-cost material or part, for example, for the conveying guides.

According to the laminating apparatus and method of the present invention, the separation of the transfer medium means and the peeling-off of the substrate may be substantially simultaneously carried out. With this, for example, it is possible to dispose the peeling-off unit and the separating unit at substantially the same position on the conveying passage of the recording media (so as to allow them to face each other with the conveying passage therebetween), and the respective functional elements (e.g., a substrate collecting unit for the peeling-off unit, and a transfer medium means collecting unit for the separating unit) can be disposed close to them. Thus, this consolidated arrangement of the respective functional elements realizes reducing the entire size of the laminating apparatus.

According to the laminating apparatus and method of the present invention, it is possible to employ an arrangement, in which the speed at which the transfer medium is separated is lowered for at least a leading edge side of the leading edge side and a tailing edge side, of each recording medium in a direction along which the transfer medium means is separated.

According to the above arrangement, the transfer medium means is separated from each recording medium by moving the transfer medium means towards the side of the surface of the recording medium opposite to the recording surface, and the control is made so that the speed at which the transfer medium is separated is lowered for at least a leading edge side of the leading edge side and a tailing edge side, of each recording medium in a direction along which the transfer medium means is separated. According to a specific example of lowering the separating speed for both the leading edge side and the tailing edge side, the separating speed is lowered just before the leading edge of a recording medium, and the separating speed is increased (for example, returned to the original speed) when having passed the leading edge of the recording medium. Then, the separating speed is lowered again just before the tailing edge of the recording medium, and the separating speed is again increased (for example, returned to the original speed) when having passed the tailing edge of the recording medium.

Then, by lowering the separating speed of the transfer medium means for the leading edge side and the tailing edge side, of each recording medium in the separating direction of the transfer medium means, a pulling force can be easier to act on the laminate layer along the leading edge and the tailing edge, of the recording medium, and therefore the leading edge and the tailing edge, of each recording medium can be more finely finished. Particularly, unless the separating speed is lowered for the leading edge side of a recording medium, a pulling force acts to the leading edge side of the recording medium via the laminate layer, and thus the leading edge side is drawn in along with the transfer medium means, which leads to the possibility that recording media cannot be securely conveyed along the conveying passage. However, with the above arrangement, this kind of problem is unlikely to be caused. In addition, it is possible to prevent the lowering of the productivity rate since the separating speed of the transfer medium means is not lowered for the residual portion.

In this case, according to the laminating apparatus of the present invention, there is provided the laminating apparatus, which is adapted to carry out the thermally press bonding and separating while conveying the recording media, wherein the speed at which the transfer medium means is separated is lowered for the leading edge side and the tailing edge side, of each recording medium by temporarily lowering the speed at which the recording media are conveyed. With the laminating apparatus having this arrangement, the control can be made so that the conveying speed of the recording media is lowered just before the leading edge or tailing edge of each recording medium passes the separating point, and the conveying speed of the recording media is increased when the leading edge or tailing edge of the recording medium has passed the separating point.

Specifically, according to the laminating apparatus of the present invention, it is preferable to employ an arrangement, in which sensors for detecting the leading edge and the tailing edge, of each recording medium are disposed at given positions in the upstream and downstream sides of the separating point in a conveying direction of the recording media, so as to change the conveying speed for the recording media. According to the laminating apparatus having this arrangement, the control can be made as follows: when the sensor on the upstream side of the separating point detects the leading edge of a recording medium, the conveying speed of the recording media is lowered, and when the sensor on the downstream side of the separating point detects the leading edge of the recording medium, the conveying speed of the recording media is increased. Then, when the sensor on the upstream side of the separating point detects the tailing edge of the recording medium, the conveying speed of the recording media is again lowered, and when the sensor on the downstream side of the separating point detects the tailing edge of the recording medium, the conveying speed of the recording media is again increased.

According to the laminating apparatus and method of the present invention, it is possible to employ an arrangement, in which the speed at which the substrate is peeled off is lowered for at least a leading edge side of the leading edge side and a tailing edge side, of each recording medium in a direction along which the substrate is peeled off.

With the above arrangement, the substrate is peeled off from the laminate layer of the laminate material by moving the substrate towards the side of the surface of a recording medium opposite to the recording surface, and the control is made so that the peeling-off speed is lowered for at least a leading edge side of the leading edge side and a tailing edge side, of each recording medium in the peeling direction of the substrate. According to a specific example of lowering the peeling-off speed for both the leading edge side and the tailing edge side, the peeling-off speed is lowered just before the leading edge of a recording medium, and the peeling-off speed is increased (for example, returned to the original speed) when having passed the leading edge of the recording medium. Then, the peeling-off speed is lowered again just before the tailing edge of the recording medium, and the peeling-off speed is again increased (for example, returned to the original speed) when having passed the tailing edge of the recording medium.

Then, by lowering the peeling-off speed of the substrate for the leading edge side and the tailing edge side, of each recording medium in the peeling-off direction of the substrate, an excessive pulling force is unlikely to be applied to the laminate layer along the edge of each recording medium, and therefore the laminate layer formed on the recording surface of each recording medium is unlikely to be unintentionally peeled off from the edge of the recording medium. Thus, it is possible to carry out the laminating process for a recording medium with fine finish by securely peeling off only the substrate. Particularly, unless the peeling-off speed of the substrate is lowered for the leading edge side of a recording medium, a pulling force caused by the peeling-off of the substrate acts to the leading edge side of the recording medium via the laminate layer, and thus the leading edge side tends to lift up from the transfer medium means. This may result in that the laminate layer is curled up or peeled off from the edge of a recording medium by an impact caused when the leading edge side returns to the original position by an elastic restoring force, so that the recording medium has an edge finished with a bad appearance. However, with the above arrangement, this kind of problem is unlikely to be caused. In addition, it is possible to prevent the lowering of the productivity rate since the peeling-off speed of the substrate is not lowered for the residual portion.

In this case, according to the laminating apparatus of the present invention, there is provided the laminating apparatus, which is adapted to carry out the thermally press bonding and peeling-off while conveying the recording media, wherein the speed at which the substrate is peeled off is lowered for the leading edge side and the tailing edge side, of each recording medium by temporarily lowering the speed at which the recording media are conveyed. With this arrangement, the control is made so that the conveying speed of the recording media is lowered just before the leading edge or tailing edge of each recording medium passes the peeling-off point, and the conveying speed of the recording media is increased when the leading edge or tailing edge of the recording medium has passed the peeling-off point.

Specifically, according to the laminating apparatus of the present invention, it is possible to employ an arrangement, in which sensors for detecting the leading edge and the tailing edge, of each recording medium are disposed at given positions in the upstream and downstream sides of the peeling-off point in a conveying direction of the recording media, so as to change the conveying speed for the recording media. With this arrangement, the control can be made as follows: when the sensor on the upstream side of the peeling-off point detects the leading edge of a recording medium, the conveying speed of the recording media is lowered, and when the sensor on the downstream side of the peeling-off point detects the leading edge of the recording medium, the conveying speed of the recording media is increased. Then, when the sensor on the upstream side of the peeling-off point detects the tailing edge of the recording medium, the conveying speed of the recording media is again lowered, and when the sensor on the downstream side of the peeling-off point detects the tailing edge of the recording medium, the conveying speed of the recording media is again increased.

According to the laminating apparatus and method of the present invention, it is possible to employ an arrangement, in which a transfer medium material having a sheet-like shape is used as the transfer medium means, and the transfer medium material is separated from each recording medium in an oblique direction relative to the same.

According to the above arrangement, a pulling force acts only to the intersection points between a boundary between a portion having a recording medium and a portion having no recording medium, of the laminate layer (i.e., a rectangular boundary on the laminate layer defining the laminated portion and the non-laminated portion), and a separation line (a boundary along which the transfer medium material is defined by a portion separated and a portion not yet separated) by moving the transfer medium material away from the recording medium in an oblique direction thereto. Accordingly, the cutting of the laminate layer is proceeded in a local manner along the rectangular boundary (i.e., the laminated portion and the non-laminated portion are gradually cut away from each other from a corner through an opposite corner, of the rectangular boundary). Thus, the edge of the laminate layer formed on the recording surface of each recording medium is finely finished in more secure manner.

In this case, according to the laminating apparatus of the present invention, there is provided the laminating apparatus, which is adapted to carry out the thermally press bonding, transferring and separating while conveying the recording media, the laminate material and the transfer medium material, wherein the recording media are supplied in a direction obliquely to the conveying direction, and the transfer medium material is separated in a direction parallel to the conveying direction. That is, the transfer medium material is separated from the recording medium in a direction obliquely thereto by supplying the transfer medium material in a direction parallel to the conveying direction and separating the transfer medium material in a direction parallel to the conveying direction.

Contrarily to this, according to the laminating apparatus of the present invention, there is provided the laminating apparatus, which is adapted to carry out the thermally press bonding, transferring and separating while conveying the recording media, the laminate material and the transfer medium material, wherein the recording media are supplied in a direction parallel to the conveying direction, and the transfer medium material is separated in a direction obliquely to the conveying direction. In the same manner as the former arrangement, the transfer medium material is separated from the recording medium in a direction obliquely thereto by supplying the recording medium in a direction parallel to the conveying direction and separating the transfer medium material in a direction obliquely to the conveying direction.

In the latter arrangement, it is preferable to employ an arrangement, in which the separating is carried out via a lengthy separating guide member that is disposed along a width direction with respect to the conveying direction and has an edge inclined to the width direction with respect to the conveying direction. With this arrangement, the transfer medium material is oriented obliquely to the conveying direction by having the separated transfer medium material wound around the edge of the separating guide member, which is inclined to the width direction with respect to the conveying direction. By pulling the transfer medium material under this state, the transfer medium material is separated from the recording medium in a direction obliquely thereto. It is possible to securely separate the transfer medium material by providing the separating guide member.

According to another embodiment, it is possible to employ an arrangement, in which the transfer medium means is a sheet-like transfer medium material, and the separating unit is designed to separate the transfer medium material towards the side of a surface of each recording medium opposite to the recording surface via a lengthy separating guide member that is disposed along a width direction with respect to the conveying direction, and an edge of the separating guide member is formed into a non-linear shape.

According to the above arrangement, a pulling force acts only to the intersection points between a boundary between a portion having a recording medium and a portion having no recording medium, of the laminate layer (i.e., a rectangular boundary on the laminate layer defining the laminated portion and the non-laminated portion), and the edge of the separating guide member. Accordingly, the cutting of the laminate layer is proceeded in a local manner along the rectangular boundary (i.e., the laminated portion and the non-laminated portion are gradually cut away). Thus, the edge of the laminate layer formed on the recording surface of each recording medium is finely finished in more secure manner.

According to the laminating apparatus of the present invention, it is possible to employ an arrangement, in which the separating unit is provided with a guide member that is disposed in proximity and downstream of a separating point in the conveying direction of the recording media, at which separating point the surface of each recording medium opposite to the recording surface is separated from the transfer medium means, and the guide member has at least an upstream end disposed offset away from the conveying passage of the recording media of the upstream side of the guide member in a direction along which the transfer medium means is separated.

According to the laminating apparatus of the present invention, it is possible to employ an arrangement, in which the separating unit is provided with a guide member that is disposed in proximity and downstream of a separating point in the conveying direction of the recording media, at which separating point the surface opposite to the recording surface of each recording medium is separated from the transfer medium means, the guide member has a first guide surface that extends in the conveying direction, and a second guide surface that is inclined at an oblique angle relative to the first guide surface towards the side opposite to the recording surface from the side of the separating point of the first guide surface, and the second guide surface of the guide member has an upstream end disposed offset away from the conveying passage of the recording media in the upstream side of the guide member, in a direction along which the transfer medium means is separated.

According to the laminating apparatus having each of the above arrangements, for example, even if there is a clearance between the separating point and the guide member, it is possible to make the leading edge of each recording medium difficult to intrude into the clearance. Whereby, it is possible to appropriately guide each recording medium coming from the separating point and hence appropriately separate the transfer medium means from the recording medium.

According to the laminating apparatus of the present invention, it is possible to employ an arrangement, in which the apparatus further comprises a supplying unit that supplies the laminate material having a substrate peelably laminated on the laminate layer from a roll as a continuous sheet onto the recording surface of each recording medium, and for the roll of the laminate material in the supplying unit, a roll with the laminate layer wound thereinto to have the laminate layer facing inwardly is used.

According to the laminating apparatus having the above arrangement, since a roll wound to have the laminate layer facing inwardly is used as the roll of the laminate material in the supplying unit, the laminate layer is not exposed to the surface and constantly covered by the substrate. Therefore, it is not likely that dust or the like attaches to the laminate layer in a time before it is supplied to each recording medium. Thus, it is possible to produce a finely finished surface without dust or the like between the recording surface of each recording medium and the laminate layer laminated thereto by thermally press bonding.

In this case, from the point of view of automatic processing, it is preferable to employ an arrangement, in which the apparatus further comprises a peeling-off unit for peeling off the substrate from the laminate layer of the laminate material, and a collecting unit for collecting the peeled substrate by winding it into a roll to have a side of the substrate, on which the laminate layer has been laminated, facing inwardly. The side of the substrate, on which the laminate layer has been laminated, still has a certain degree of stickiness, since the laminate layer was laminated thereto up to then. Therefore, by winding the substrate into a roll to have the side, on which the laminate layer has been laminated, facing inwardly, this side is not exposed to the surface and dust or the like is not likely to attach to the roll. Therefore, the collected substrate may be efficiently recycled while it is kept in clean condition.

According to the laminating apparatus of the present invention, it is possible to employ an arrangement, in which the apparatus further comprises a laminate material supplying unit that successively supplies a lengthy laminate material, wherein the press bonding unit is designed to be capable of being switched between a press bonding mode and a non-press bonding mode, and the laminate material supplied by a given feeding length under the non-press bonding mode can be pulled back into the laminate material supplying unit.

The laminating apparatus having the above arrangement makes it possible to produce an advantage of preventing the unnecessary consumption of the laminate material. This will be explained by taking a specific example. For example, when only a single recording medium is processed, the laminate material is successively supplied until the substrate is peeled off from the laminate layer in a latter step after the laminating at the press bonding unit. If the press bonding unit is held in the press bonding mode during this time, the laminate layer is necessarily adhered onto the transfer medium means and thus the laminate material is likely to be unnecessarily consumed. According to the laminating apparatus having the above arrangement, when the recording medium has been laminated at the press bonding unit, the press bonding unit is manually or automatically released from the press bonding mode, thereby preventing the laminate layer from being unnecessarily adhered onto the transfer medium means.

Then, after the peeling-off of the substrate in the latter step, the laminate material is manually or automatically pulled back by a given feeding length while designating the feeding length of the laminate material once supplied as maximum. Thus, it is possible to reuse it for a recording medium to be introduced next time, and efficiently use the laminate material.

In this case, it is possible to employ an arrangement, in which the transfer medium means is a lengthy under film, the apparatus further comprises an under film supplying unit that successively supplies the under film and is so structured that the under film, which has been supplied under the non-press bonding mode, can be pulled back into the under film supplying unit by a given feeding length along with the pulling back of the laminate material.

Accordingly, in the same manner as the case for the laminate material, the press bonding unit is manually or automatically released from the press bonding mode after the laminating of each recording medium, thereby preventing the laminate layer from being unnecessarily adhered onto the under film. Then, after the peeling-off of the substrate, the under film is manually or automatically pulled back by a given feeding length while designating the feeding length of the under film once supplied as maximum. Thus, it is possible to reuse it for a recording medium to be introduced next time, and efficiently use the under film.

Additionally, it is preferable to employ an arrangement, in which the press bonding unit does not contact the supplied laminate material under the non-press bonding mode. Specifically, there is further provided a roller that is disposed between the laminate material supplying unit and the press bonding unit and controls so that the press bonding unit does not contact the supplied laminate material when the press bonding unit is held in the non-press bonding mode.

According to the laminating apparatus having the above arrangement, the press bonding unit does not contact the laminate material when released from the press bonding mode. Whereby, it is possible to prevent heat of the press bonding unit from transferring to the laminate material (laminate layer). Therefore, since the laminate material (laminate layer) supplied after the release from the press bonding mode is not influenced by heat of the press bonding unit, and therefore can be reused without deterioration of the quality.

Then, the control roller is disposed at a given position enabling the laminate material to contact thereto in the non-press bonding mode when the laminate material has not yet reached the press bonding unit, and the laminate material not to contact the press bonding unit in an approaching passage from the contact point to the conveying passage.

The control roller may be designed to have a function enabling itself to contact the laminate material in the press bonding mode when the laminate material has not yet reached the press bonding unit, thereby enabling the laminate material to contact the press bonding unit at an appropriate point.

According to the laminating apparatus of the present invention, there is provided the laminating apparatus, which has the press bonding unit mounted in a housing and is adapted to form the laminate layer on the recording surface of each recording medium, wherein the housing is capable of being freely opened and closed, and the apparatus further comprises a locking means that prevents the housing from being opened when the press bonding unit is at a given temperature or higher.

According to the laminating apparatus having the above arrangement, until the temperature of the press bonding unit is lowered than a given set value, the housing cannot be opened, and when lowered than the given set value, it can be opened. Thus, the operator is unlikely to unintentionally touch any heated structural elements of the press bonding unit.

EFFECTS OF THE INVENTION

As described above, according to the present invention, the laminate material having a size larger than a recording medium is laid over the same, then they are thermally press bonded, then the laminate layer of the laminate material is pulled (drawn in) towards the side opposite to the recording surface of the recording medium, thereby allowing a pulling force to intensively act along the boundary between a portion having a recording medium and a portion having no recording medium and cutting the laminated portion away from the non-laminated portion. Accordingly, it is possible to finely finish the edge of the laminate layer formed on the recording surface of the recording medium along the edge of the recording medium, so that the recording medium subjected to the laminating process can be finely finished without the necessity to carry out edging treatment after the laminating process of the recording medium.

BRIEF DESCRIPTION OF THE DRAWINGS

FIG. 11(A) is a plan view of a laminate laminated with a laminate material by the laminating apparatus of the first embodiment, and FIG. 11(B) is a cross sectional view taken along a line I-I in FIG. 11(A).

FIG. 13 are cross sectional views of the products obtained by an Applied Example 1, in which FIG. 13(A) illustrates a product subjected to a lamination process with normal gloss finish, FIG. 13(B) illustrates a product subjected to a lamination process with semigloss finish using a semigloss recording medium, and FIG. 13(C) illustrates a product subjected to a lamination process with gloss finish using a semigloss recording medium.

FIG. 14 are diagrams illustrating the variations in conveying speed of a laminating apparatus of an Applied Example 2.

FIG. 26(A) is a plan view of a laminate laminated with a laminate material by the laminating apparatus of the another embodiment (4). FIG. 26(B) is a cross sectional view taken along a line I-I in FIG. 26(A). FIG. 26(C) is a cross sectional view taken along a line II-II in FIG. 26(A).

FIG. 29 illustrates a recording medium which is passing through a press bonding unit of the laminating apparatus of the another embodiment (4).

FIG. 33(A) is a plan view of a laminate laminated with a laminate material by the laminating apparatus of the another embodiment (5). FIG. 33(B) is a cross sectional view taken along a line I-I in FIG. 33(B).

FIG. 38 is a plan view of a laminate laminated with a laminate material by the laminating apparatus of the another embodiment (6). FIG. 38(B) is a cross sectional view taken along a line I-I in FIG. 38(A).

FIG. 41 are plan views of knife edges for use at the separating unit of the laminating apparatus of the another embodiment (6), in which FIG. 41(A) illustrates a saw-like edge, FIG. 41(B) illustrates a ridge shaped edge, FIG. 41(C) illustrates a valley shaped edge and FIG. 41(D) illustrates corrugated edge.

FIG. 51 illustrates a substrate which is being peeled off from a recording medium, and an under film which is being separated from the recording medium, at the peeling-off unit and the separating unit, of the laminating apparatus of the another embodiment (22).

DESCRIPTION OF THE REFERENCE CODES

Figure 1:
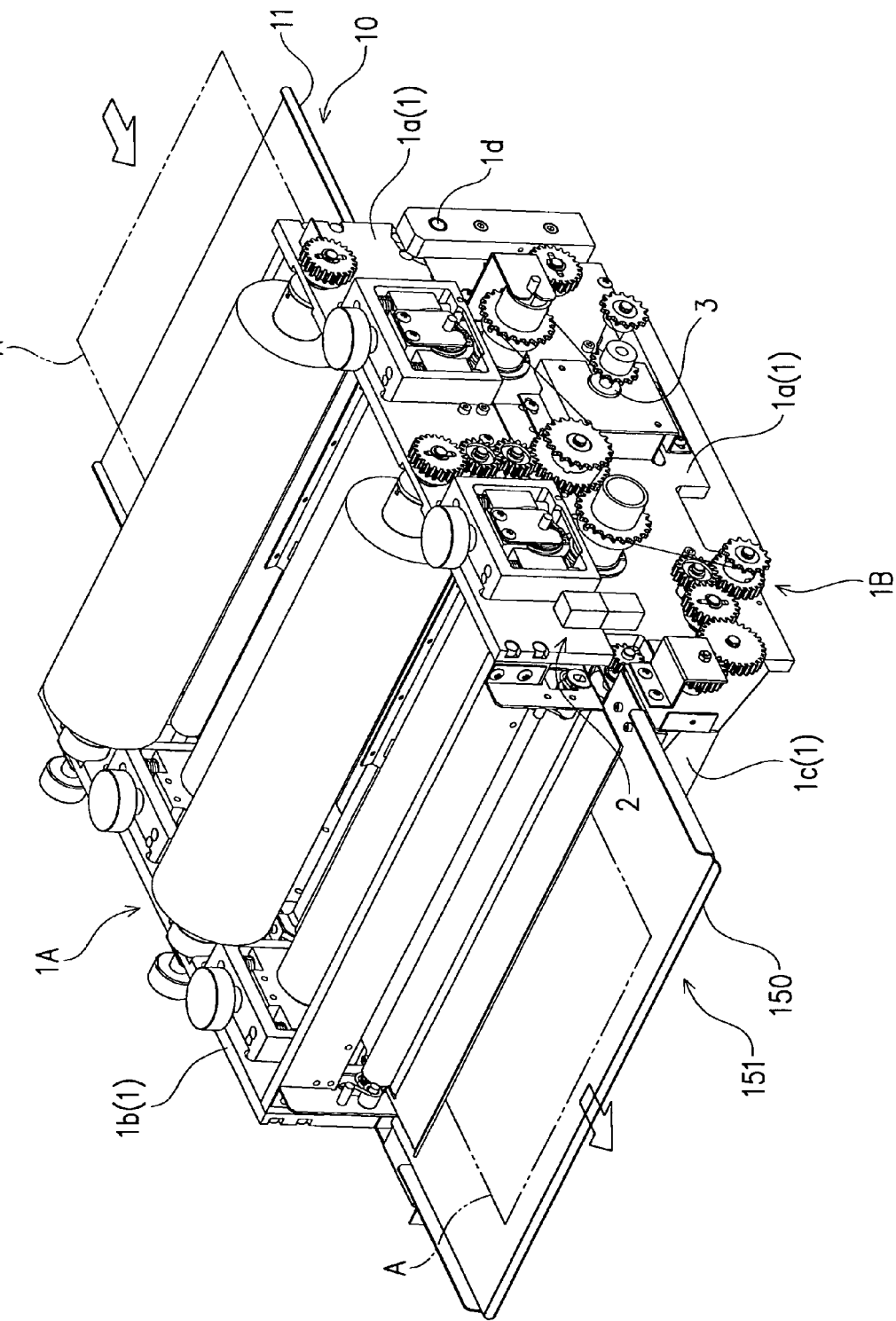
FIG. 1 is a perspective view of a laminating apparatus according to a first embodiment.

1: housing
10: recording medium supplying unit (supplying unit)
11: mounting plate
100: conveying roller members
150: finished product discharging unit (discharging unit)
151: mounting plate
20: laminate material supplying unit (supplying unit)
21: holder (continuous laminate material holding member, storing means)
30: under film supplying unit (supplying unit)
31: holder (continuous under film holding member)
40: first press bonding unit (press bonding unit)
41: driving roller
43: press contact roller
45: press contact force adjusting mechanism
46: press contact and releasing mechanism
50: second press bonding unit (press bonding unit)
51: driving roller
53: press contact roller
55: press contact force adjusting mechanism
60: peeling-off unit
61: knife edge (peeling guide member)
70: substrate collecting unit (collecting unit)
71: holder (collected substrate holding member)
80: separating unit
81: knife edge (separating guide member)
85: scraper (removing means)
90: under film collecting unit (collecting unit)
91: holder (collected under film holding member)
A: recording medium
B: laminate material
C: substrate
D: laminate layer
Da: laminated portion
Db: non-laminated portion
D': adhesive layer
D": protection layer
E: under film (transfer medium material)

BEST MODE FOR CARRYING OUT THE INVENTION

Now, the description will be made for the embodiments of the present invention with reference to the attached drawings.

First Embodiment

Figure 2:
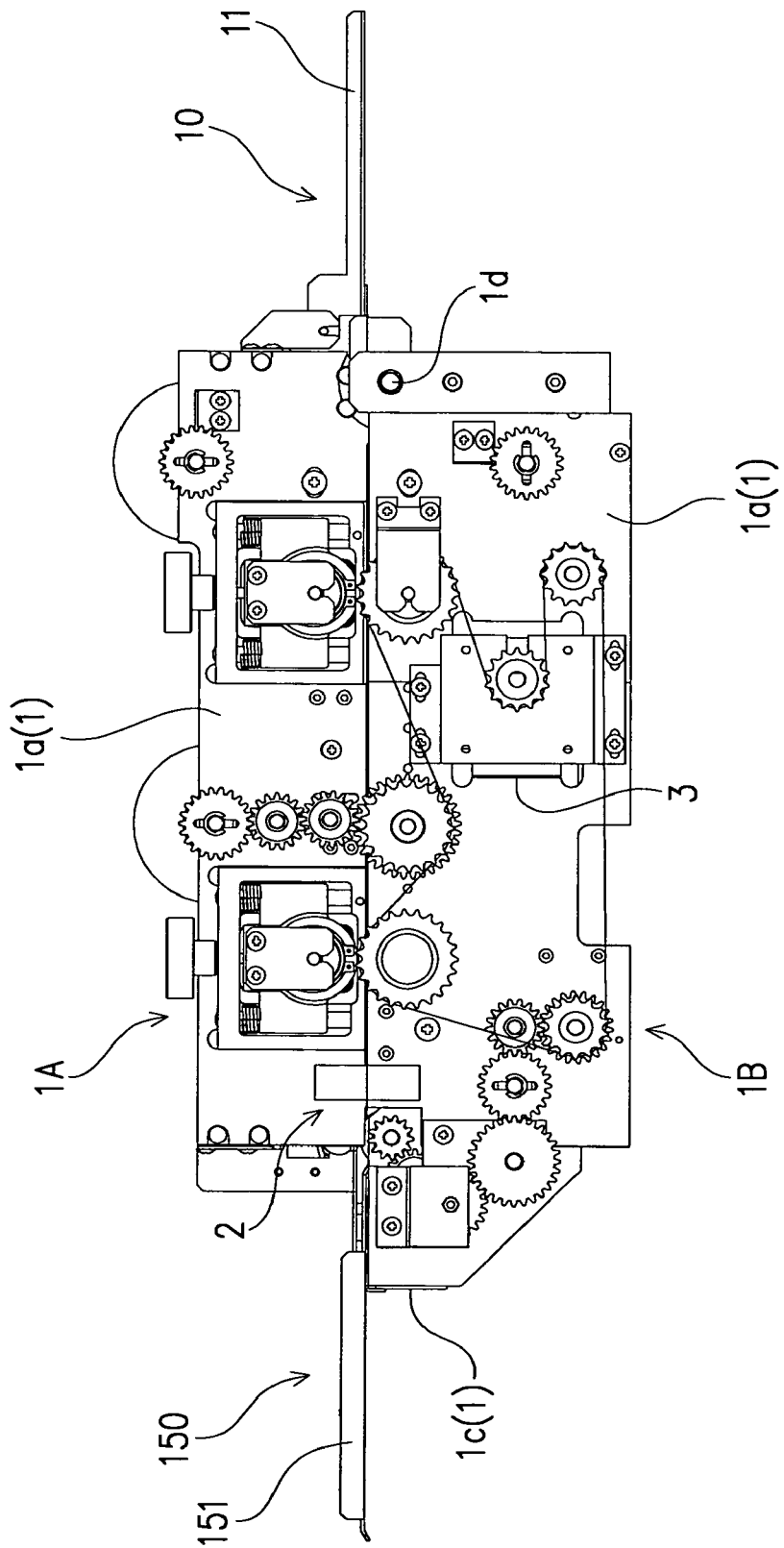
FIG. 2 is a side view of the laminating apparatus of the first embodiment.

First, an image of the appearance of the laminating apparatus of this embodiment will be briefly described with reference to FIGS. 1 and 2. The laminating apparatus has a housing 1 with various function units (hereinafter described) mounted therein, a recording medium supplying unit (supplying unit) 10 disposed on a first side of the housing 1 for supplying recording media A, each having an image recorded thereon, for a lamination process, and a finished product discharging unit (discharging unit) 150 disposed on a second side of the housing 1 for discharging the recording media A, which have been subjected to the lamination process.

The housing 1 is made up of side frames 1a, 1b disposed on the left and right sides, and connection frames 1c disposed at appropriate positions between the side frames 1a, 1b for connection of the side frames 1a, 1b with giving spacing. The side frames 1a, 1b each are divided into an upper portion and a lower portion, in which an upper housing part 1A is formed by the upper side frames 1a, 1b and the connection frame 1c connecting them together, while a lower housing part 1B is formed by the lower side frames 1a, 1b and the connection frame 1c connecting them together.

Thus, the housing 1 is dividable into the upper and lower parts. More specifically, the upper housing part 1A has a part 1d that is rotatably supported by the lower housing part 1B so as to be pivotally moved between an open position and a close position relative to the lower housing part 1B. In order to keep the close position at which the upper housing part 1A is fitted to the lower housing part 1B, a locking means 2 made of, for example, a power lock is mounted to the housing 1. Specifically, one of the structural elements of the locking means is attached to the upper housing part 1A and the other is attached to the lower housing part 1B so as to face the one of the structural elements. As long as predetermined conditions (hereinafter described) are satisfied, the locking means is exited by the electricity to generate electromagnetic absorptivity between a pair of the structural elements of the locking means so that the housing cannot be brought into the open position.

A recording medium supplying unit 10 includes a mounting plate 11 attached to a boundary portion between the upper housing part 1A and the lower housing part 1B, on the first side of the housing 1. On the other hand, a finished product discharging unit 150 includes a mounting plate 151 attached to a boundary portion between the upper housing part 1A and the lower housing part 1B, on the second side of the housing 1. The mounting plate 11 is rotatably attached to the upper housing part 1A so as to take a horizontal position enabling mounting of a recording medium A and a vertical position disabling mounting of a recording medium A. The mounting plate 151 is fixedly attached to the lower housing part 1B. A pair of width limiting guides that are moved towards and away from each other in the width direction are preferably disposed on the mounting plate 11 so that the widthwise center of each recording medium A is constantly matched, regardless of the width of each recording medium A.

A conveying passage for the recording medium A communicating between the recording medium supplying unit 10 and the finished product discharging unit 150 is arranged along the boundary portion between the upper housing part 1A and the lower housing part 1B in the same manner as the mounting plate 11 of the recording medium supplying unit 10 and the mounting plate 151 of the finished product discharging unit 150. Thus, at the open position realized by pivotally moving the upper housing part 1A upwards, the conveying passage is opened to the outside so that a recording medium A on the conveying passage can be taken away.

Figure 3:
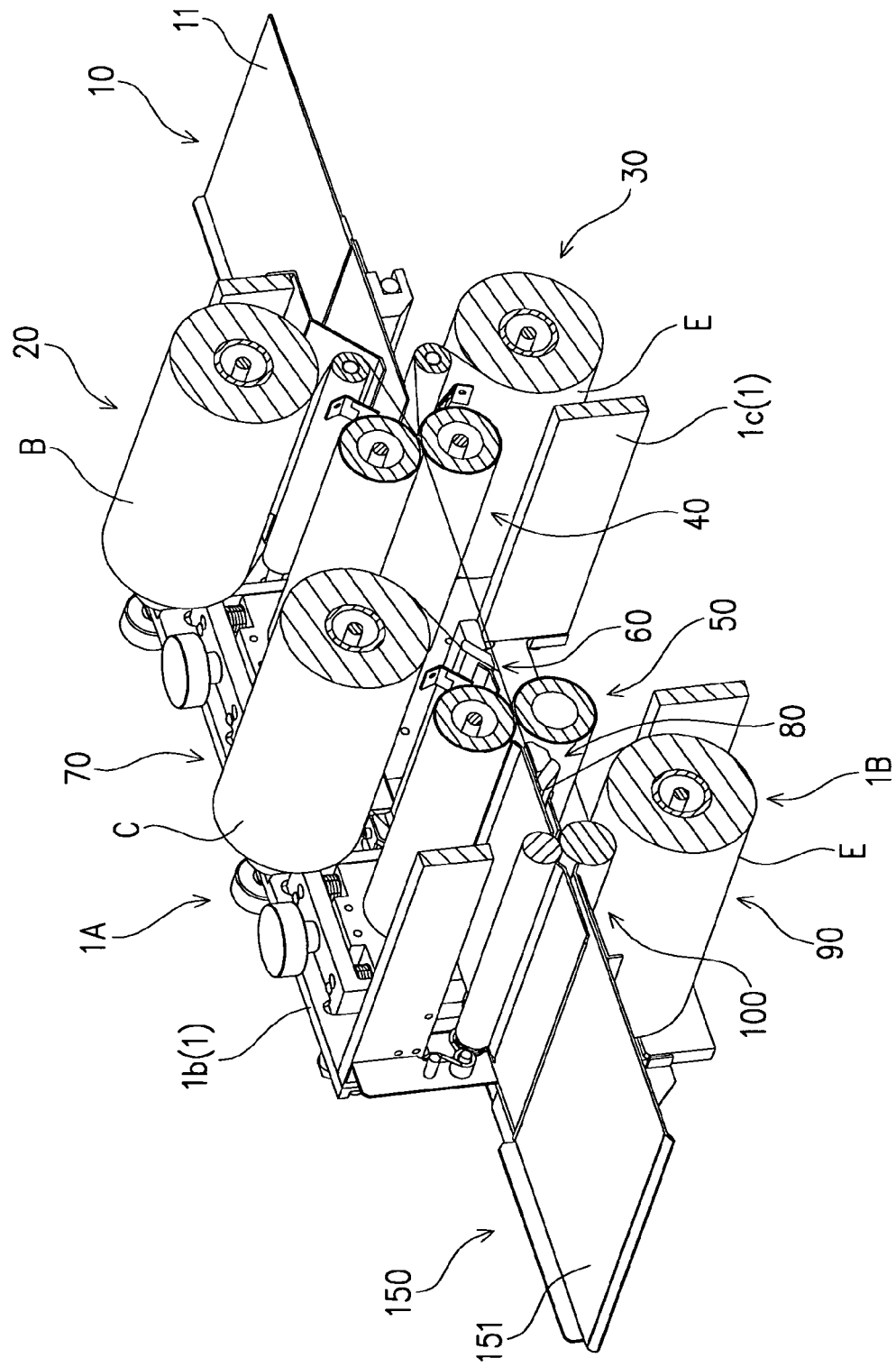
FIG. 3 is a perspective view with a partially cross section of the laminating apparatus of the first embodiment.
Figure 4:
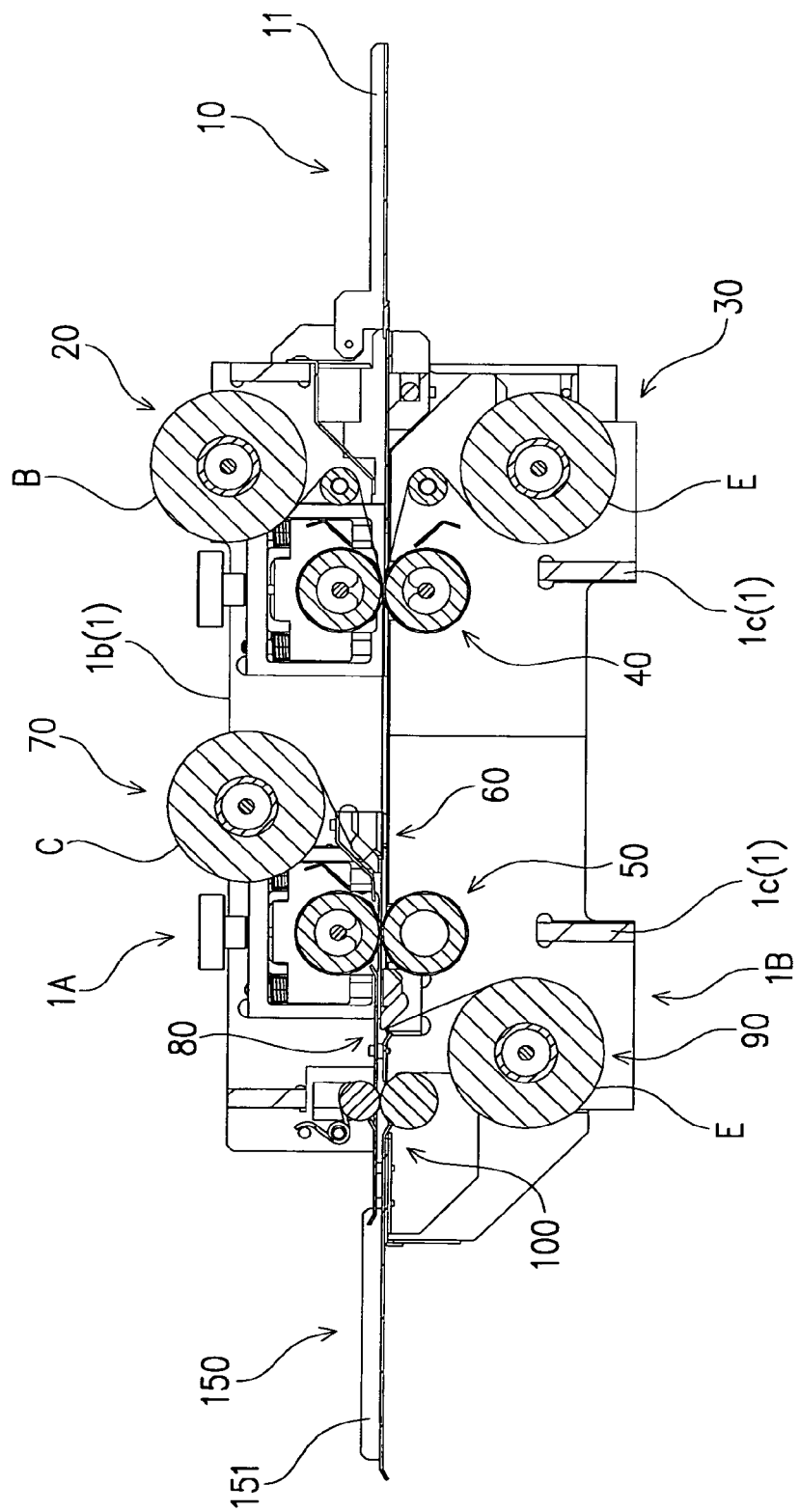
FIG. 4 is a side view with a partially cross section of the laminating apparatus of the first embodiment.

As illustrated in FIGS. 3 and 4, the function portions are roughly divided into a laminate material supplying unit that supplies a laminate material B having a sheet-like shape and laminated with a substrate C as a base and a laminate layer from the side of a recording surface (upper surface) of each recording medium A conveyed on the conveying passage, an under film supplying unit 30 (supplying unit) that supplies a sheet-like under film E as a transfer medium means from the side of a surface opposite to the recording surface, of each recording medium A conveyed on the conveying passage, first and second press bonding units 40, 50 (press bonding units) that thermally press bond a laminate having a recording medium A supplied and laminated between the supplied laminate material B and the under film E (an intermediate with a recording medium A interposed between the laminate material B and the under film E), a peeling-off unit 60 that peels off the substrate C from the thermally press bonded laminate material B, a substrate collecting unit (collecting unit) 70 that collects the peeled substrate C, a separating unit 80 that separates the thermally press bonded under film E from the recording medium A, and an under film collecting unit (collecting unit) 90 that collects the separated under film E.

Figure 5:
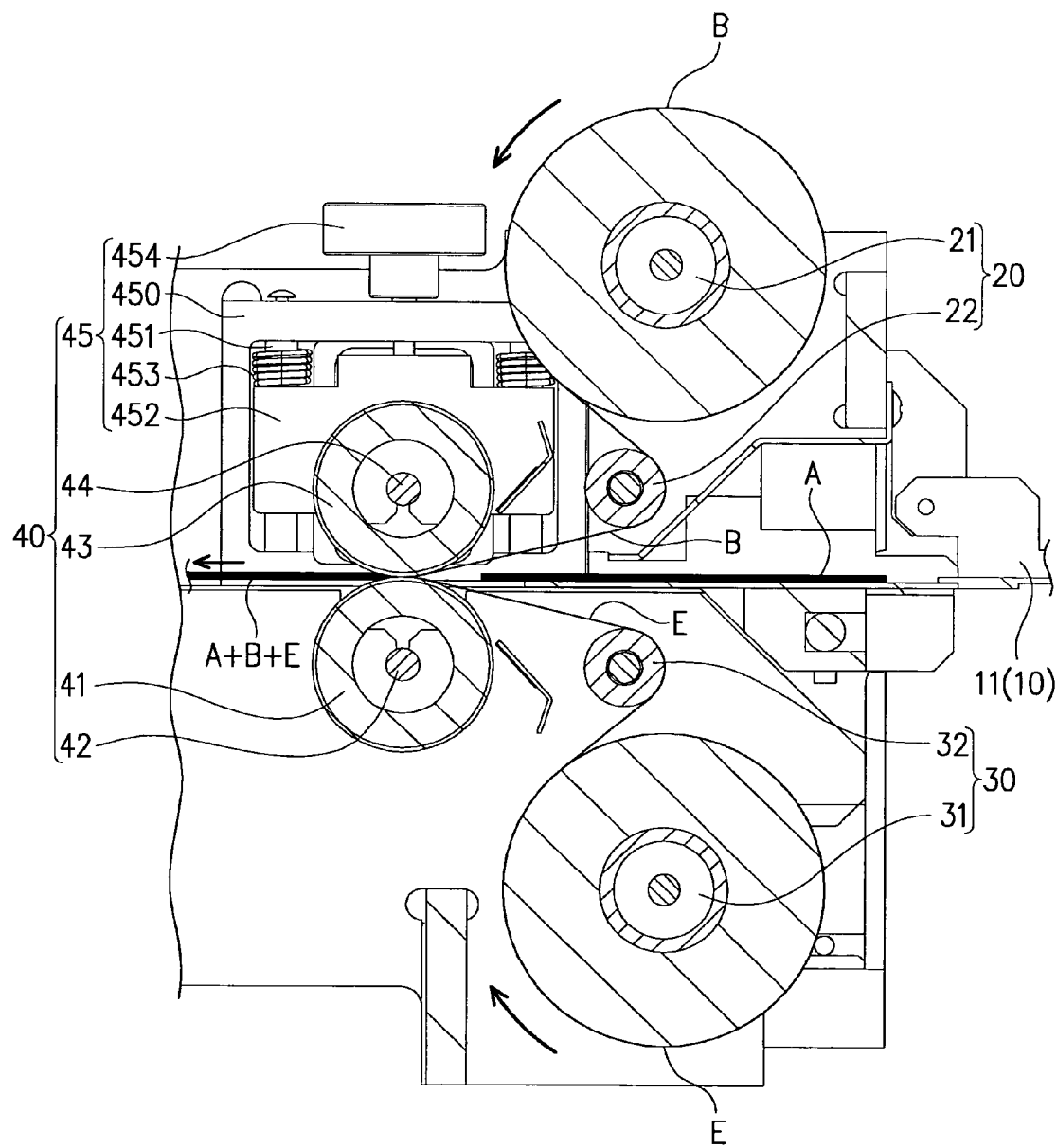
FIG. 5 is a side view with an enlarged essential portion of a first press bonding unit and its proximity, of the laminating apparatus of the first embodiment.

The laminate material supplying unit 20 is, as illustrated in FIG. 5, to supply the laminate material B in the form of a continuous sheet from a roll towards the first press bonding unit 40 and is provided with a storing means 21 for storing the laminate material B in such a manner as to be capable of supplying the same to the first press bonding unit 40. The storing means 21 of this embodiment is made up of a holder (continuous laminate material holding member) that holds a roll of the laminate material B in such a manner as to be capable of pulling out the laminate material therefrom in the lengthwise direction. The holder as the storing means 21 is structured to be detachably mounted and replaceable by a different holder 21. Specifically, the laminate material supplying unit 20 is structured to have the holder 21 detachably mountable, thereby enabling the replacement with a roll of the laminate material B corresponding to the size of each recording medium A supplied from the recording medium supplying unit 10. The laminate material supplying unit 20 is equipped with a free roller 22 disposed between the holder 21 and the conveying passage, as well as being equipped with the holder 21.

The holder 21 is, along with the free roller 22, rotatably supported via its both ends by the side frames 1a, 1b. The free roller 22 is disposed (close to the conveying passage) inward of the common tangent of a roll mounted to the holder 21 and a roller 43 of a later described press bonding unit, so that the laminate material B fed out from the roll is wound around the free roller 22 through a predetermined angular range in a predetermined section leading up to the conveying passage, and the angle at which the laminate material B approaches to the conveying passage is determined at the same time. This free roller 22 is disposed in an area capable of being influenced by heat from the press contact roller 43, as a later described heating roller, of the first press bonding unit 40. A material used for at least the surface of the free roller 22 is black alumite, which is relatively excellent in heat absorptivity and heat conductivity.

Figure 10:
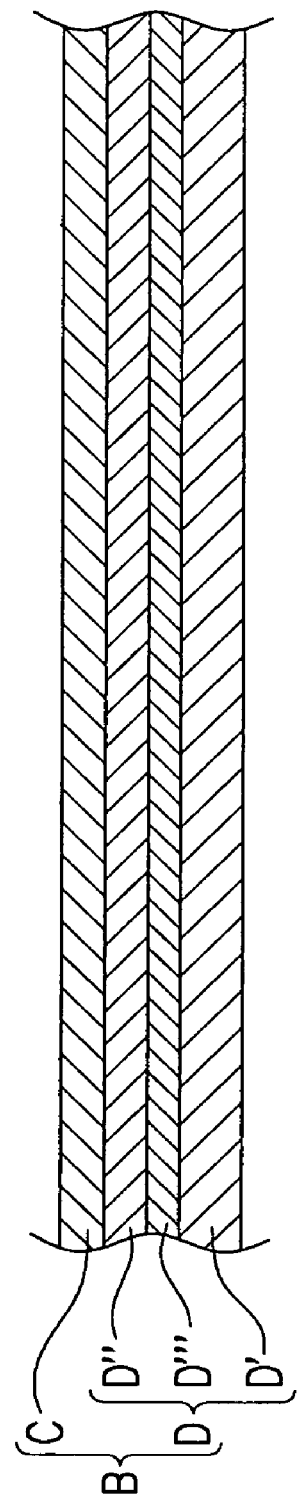
FIG. 10 is a cross sectional view of a laminate material.

The laminate material B for use in the laminating apparatus of this embodiment includes, as illustrated in FIG. 10, a laminate layer D that laminates the recording surface of a recording medium A. The laminate layer D has a laminate structure made up of an adhesive layer D' adhered onto the recording surface and a protection layer D" formed on the adhesive layer D' for protecting the recording surface. The protection layer D" of this embodiment is made of an acrylic resin having permeability. The adhesive layer D' together with the protection layer D" forms a laminate structure via a permeable anchor coat layer D''' used for jointing purpose. The adhesive force of the adhesive layer D' to the under film E is higher than the adhesive force of the substrate C to the protection layer D", and the adhesive layer D' is made of a resin having permeability (thermoplastic resin that increases the adhesive force by the application of heat: polyester type resin in this embodiment).

The laminate material B has a sheet-like substrate C peelably laminated on the laminate layer (protection layer D''') D in order to prevent the laminate layer D from being scratched in the thermally press bonding operation or conveying, or prevent occurrence of creases or the like in the laminate layer D in the thermally press bonding operation. Specifically, the laminate layer B has the substrate C laminated on the laminate layer D so as to prevent scratching of the surface of the laminate layer D, give stiffness to the laminate material itself (increase the thickness, thereby decreasing the bending flexibility of the laminate material B), and thus prevent the occurrence of creases in the laminate layer D due to the influence such as pressure in the thermally press bonding operation). The substrate C is made of a polyethylene terephthalate (PET) film, which is peelably adhered to the laminate layer (protection layer D") D with its own adhesion, and forms a laminate structure along with the laminate layer D.

The thus structured laminate material B has a size larger than the recording medium A, that is, such a size as to be able to lie over a recording medium A with the laminate layer D facing the recording surface of the recording medium A. More specifically, the laminate material B is so sized as to be larger than the recording medium A in a predetermined direction when overlapped on the recording medium, and for example, as illustrated in FIG. 11, has a size larger in the conveying direction and the width direction thereof than a size of the recording medium A in the conveying direction and the width direction thereof. In this embodiment, as described above, in a case where the laminate material B having an enlarged size covers the recording medium A as protruding outwards from the opposite sides both in the lengthwise and widthwise directions, the length in one direction (traveling direction in the conveying passage) does not become problematic, and has a width (size in a direction orthogonal to the traveling direction in the conveying passage) larger than the width of the recording medium A on the conveying passage.

Therefore, not only the recording medium A oriented parallel to the conveying direction, but also the recording medium A slightly oblique thereto does not protrude outwardly in the width direction from the laminate material B, and can be securely and entirely covered by the laminate material B (laminate layer D). A roll of the thus structured laminate material B is wound up to have the substrate C facing outwards and the laminate layer D facing inwards, and therefore allows the substrate C to be brought into contact with the free roller 22.

Referring back to FIG. 5, the under film supplying unit 30 is to supply the under film E in the form of a continuous sheet from a roll, and is equipped with a holder (continuous under film holding member) 31 for holding a roll of the under film E, as well as being equipped with a free roller 32 disposed between the holder 31 and the conveying passage.

The holder 31 is, along with the free roller 32, rotatably supported via its both ends by the side frames 1a, 1b. The free roller 32 is disposed (close to the conveying passage) inward of the common tangent of a roll mounted to the holder 31 and a roller 41 of a later described press bonding unit, so that the under film E fed out from the roll is wound around the free roller 32 through a predetermined angular range in a predetermined section leading up to the conveying passage, and the angle at which the under film E approaches to the conveying passage is determined at the same time. This free roller 32 is disposed in an area capable of being influenced by heat from the driving roller 42, as a later described heating roller, of the first press bonding unit 40. A material used for at least the surface of the free roller 32 is black alumite, which is relatively excellent in heat absorptivity and heat conductivity, in the same manner as the free roller 22.

The under film E functions as a transfer medium material (transfer medium means) that becomes a base in a laminated state, and a resin film of a material having a thermal bonding property to the adhesive layer D' of the laminate material B or a resin film of a material having the same characteristics as those of the adhesive layer D' is used for the under film E. The under film E may be of either a single layer structure or a laminate structure, and in this embodiment, a single layer film of PET (polyethylene terephthalate) is employed. The under film E having a width equal to or larger than the laminate material B is used so as to prevent the laminate material B (laminate layer D) from protruding sidewards from the side edges of the under film E when in a laminated state.

The first press bonding unit 40 includes the driving roller 41 and the press contact roller 43. The driving roller 41 is disposed on the side of the base surface of the recording medium A, while the press bonding roller 43 is disposed on the side of the recording surface of the recording medium A. These rollers each have opposite ends rotatably supported by the side frames 1a, 1b and have axes extending parallel or substantially parallel to each other. The laminate material B and the under film E, as well as the recording medium A supplied from the recording medium supplying unit 10 therebetween are laminated together between both the rollers 41, 43 (hereinafter, a laminated body in which at least two of the recording medium A, the laminate material B (each layer constituting the laminate material B) and the under film E are laminated is generically referred to "laminate").

Both the rollers 41, 43 together cause a press bonding action to the laminate (A+B+E), and for example, a metal roller or an ultrathin rubber roller is employed for the driving roller 41, and a silicon-type heat resistant rubber roller is employed for the press contact roller 43.

Figure 6:
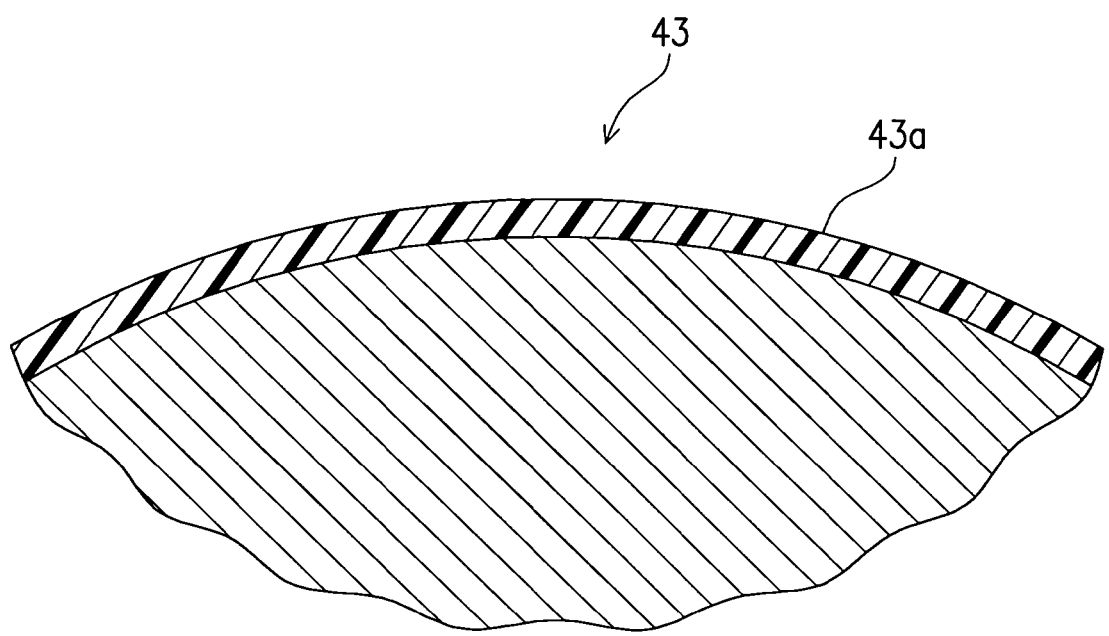
FIG. 6 is an enlarged cross sectional view of an essential portion of a press contact roller in the first press bonding unit of the laminating apparatus of the first embodiment.

More preferably, an ultrathin rubber roller (more specifically, a roller provided with a soft layer (e.g., a roller having a silicon-type heat resistant rubber) on a metal roller) is employed. FIG. 6 is an enlarged cross sectional view of the press contact roller 43. The press contact roller 43, which acts on the laminate layer D, has a soft layer 43a, which is elastically deformed, thereby increasing the area of the surface through which the press bonding action is caused. Therefore, the adhesive force of the laminate layer D to the recording surface of the recording medium A is increased. Accordingly, even if air mixes between the recording medium A and the laminate layer D, it can be securely forced outwards, or dispersed on the recording surface of the recording medium to such a degree as not to be visible (or dispersed finely between dots of ink formed on the recording surface (ink receiving layer) when the recording medium A is printer paper such as ink jet paper), and therefore the air is unlikely to remain as air bubbles. The soft layer 43a has a thickness of about 1 mm. The reason for it is that when the soft layer 43a is excessively thick or the press contact roller 43 is entirely soft, the roller surface is recessed to be in conformity with the surface configuration of the driving roller 41, the contacting surface between both the rollers 41, 43 is formed into an arc shape relative to the conveying surface of the recording medium A, and therefore the straight traveling performance of the recording medium A when it is conveyed is deteriorated, and when the soft layer 43a is excessively thin, the effect of the elastic deformation is not appropriately exhibited.

Referring back to FIG. 5, both the rollers 41, 43 respectively have heaters 42, 44 in shaft portions so as to function as heating rollers. The heating temperature on the surface of each of the rollers 41, 43 is set within a range of 60 to 120° C. for the driving roller 41 and within a range of 80 to 120° C. for the press contact roller 43. The driving roller 41 is disposed forward of the point at which the recording medium A, the laminate material B and the under film E are thermally press bonded (a theoretical contacting point of the rollers 41, 42) so as to allow the under film E supplied from the under film supplying unit 30 to wind therearound through a predetermined angular range, and is designed to preheat the under film E before it reaches the thermally press bonding point. The press contact roller 43 is disposed so as to allow the laminate material B supplied form the laminate material supplying unit 20 to wind therearound through a predetermined angular range before it reaches the thermally press bonding point, and is designed to preheat the laminate material B before it reaches the thermally press bonding point. Since the free rollers 22, 32 are heated upon receiving the heats respectively from the rollers 41, 43, they function as heating rollers as well, so that the laminate material B and the under film E are also preheated by the free rollers 22, 32 prior to the preheating by the rollers 41, 43. The roller (driving roller) 41 on the side of the under film E in the first press bonding unit 40 also functions as a heating roller and has a heating temperature set to be lower than the heating temperature on the roller surface of the roller (press contact roller) 43 on the side of the laminate material B for the reason to limit thermal effects on the under film E, while activating the heat bonding property between the laminate layer D and the under film E.

Figure 7:
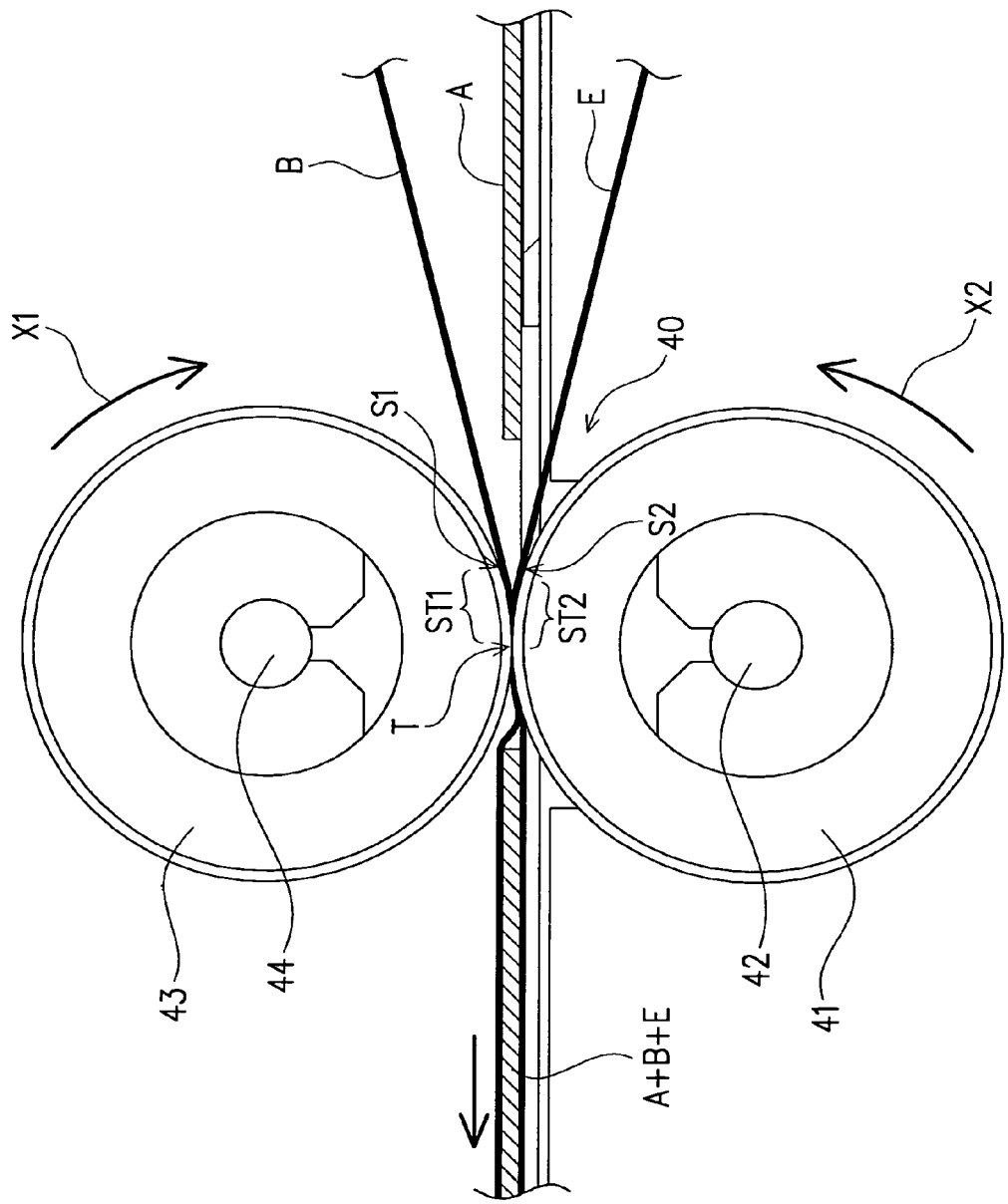
FIG. 7 illustrates a laminate material and an under film in a state where they are preheated before reaching a thermally press bonding point by being respectively and partially wound around a press contact roller and a driving roller.

The above will be described with reference to FIG. 7. This laminating apparatus has a preheating area for preheating the laminate material B and the under film E respectively before they reach a thermally press bonding point T. The laminate material B disposed on the side of the press contact roller 43 and the under film E disposed on the side of the driving roller 41 are partially and respectively wound around the press contact roller 43 and the driving roller 41 through a predetermined angular range so as to be able to provide preheating sections ST1, ST2 each having a predetermined width, between each of contact starting positions S1, S2 and the thermally press bonding point T on the upstream side of the thermally press bonding point T in surface moving directions X1, X2 of the press contact roller 43 and the driving roller 41. The laminate material B and the under film E located on the sides of the rollers 43, 41 to be heated are, prior to be thermally press bonded, wound around the free rollers 22, 32 that can be influenced by heats from the rollers 43, 41.

Temperature sensors (not shown) as temperature measuring means are respectively disposed at portions near the rollers 41, 43 (more specifically, portions near the roller surfaces), at which little interference is caused to the lamination process.

Referring back to FIG. 5, the driving roller 41 cannot be displaced relative to the side frames 1*a*, 1*b*, while the press contact roller 43 can be displaced relative to the side frames 1*a*, 1*b* (and the driving roller 41) via a press contact force adjusting mechanism 45. The press contact force adjusting mechanism 45 includes a base 450 attached to the side frames 1*a*, 1*b*, a shaft 451 that is attached to the base 450 and has an axis extending in a direction orthogonal to the conveying passage, a moving member 452 that slides along the shaft 451, a spring member 453 that urges the moving member 452 towards the conveying passage, and a handle (adjusting member) that adjusts the spring restoring force of the spring member 453. The press contact force between both the rollers 41, 43 are usually set within a range of 50 to 120 kgf.

Figure 8:
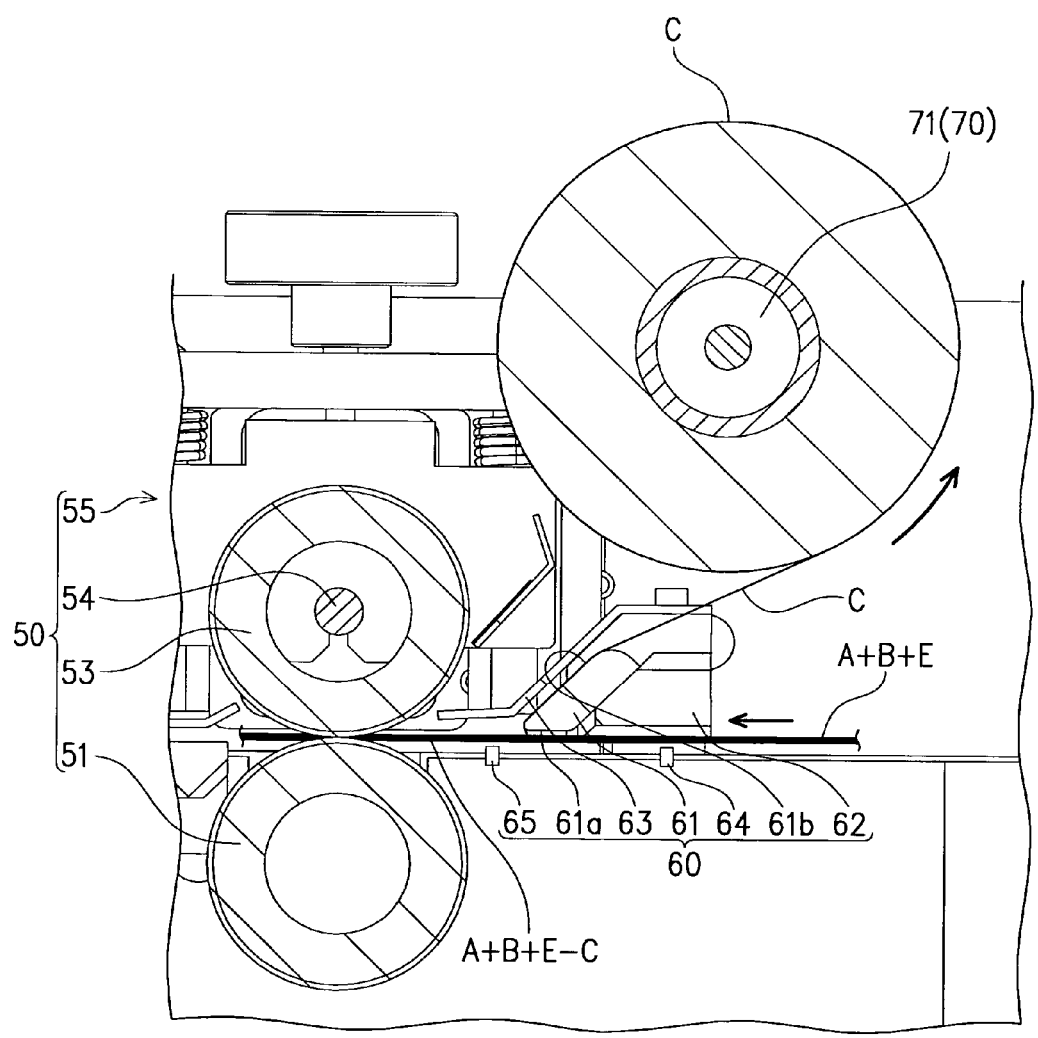
FIG. 8 is an enlarged side view of an essential portion in a second press bonding unit, a peeling-off unit and its proximity, of the laminating apparatus of the first embodiment.

The second press bonding unit 50 is, as illustrated in FIG. 8, equipped with a driving roller 51 and a press contact roller 53. The driving roller 51 is disposed on the side of the base surface of the recording medium A, while the press contact roller 53 is disposed on the side of the recording surface of the recording medium A. The rollers each are rotatably supported via the both ends by the side frames 1*a*, 1*b*. The substrate C of the laminate (A+B+E) is peeled off at the peeling-off unit 60 located upstream of the second press bonding unit 50 along the conveying passage, and therefore the laminate (A+B+E–C) is supplied between both the rollers 51, 53.

Both the rollers 51, 53 together cause a press bonding action to the laminate (A+B+E–C), and for example, a silicon-type heat resistant rubber roller is employed for each of the driving roller 51 and the press contact roller 53. More preferably, an ultrathin rubber roller (more specifically, a roller provided with a soft layer (e.g., silicon-type heat resistant rubber) on a metal roller) is employed for each of the driving roller 51 and the press contact roller 53. The soft layer of the press contact roller 53 has a similar structure to the press contact roller 43 of the first press bonding unit 40, and therefore the detailed description will be omitted.

The press contact roller 53 has a heater 54 in a shaft portion so as to function as a heating roller. The heating temperature on the roller surface is set within a range of 80 to 120° C. The driving roller 51 is not designed as a heating roller. The heating temperature of the second press bonding unit 50 (heating temperature by the press contact roller 53) is set to be lower than the heating temperature of the first press bonding unit 40 (heating temperature achievable totally by the driving roller 41 and the press contact roller 43) because it is intended to be used to carry out a finishing treatment. That is, for example, in a case where air bubbles mix between the recording medium A and the laminate material D, it is not easy to press in the air bubbles when press bonding is made without heating, since the press bonding is made with the adhesive layer D' of the laminate layer kept in a hardened state. By heating, the adhesive layer D' is softened and press bonded under this state, and therefore air bubbles are pressed onto the recording surface of the recording medium A through clearances of ink and hence appropriately removed. In addition, when the heating temperature is excessively high, the laminate layer D (the adhesive layer D' thereof) may be displaced from the recording surface of the recording medium A or peeled off therefrom. For these reasons, heating is also made at the second press bonding unit 50, and the heating temperature at the second press bonding unit 50 is set to be lower than the heating temperature at the first press bonding unit 40. The reasons why the driving roller 51 of the second press bonding unit 50 is not heated are that, as described above, excessive heating at the second press bonding unit 50 is prevented; the quality of the recording medium A or the laminate layer D may be deteriorated when the laminate once heated is repeatedly and excessively heated; the manufacturing cost can be reduced by omitting a heater; the manufacturing cost can be reduced by omitting a heater; and the running cost can be reduced by decreasing the power consumption. A temperature sensor (not shown) as a temperature measuring means is disposed at a portion near the roller 53 (more specifically at a portion near the roller surface), at which little influence is caused to the lamination process. The press contact force at the second press bonding unit 50 is set to be smaller than the press contact force at the first press bonding unit 40 by such a magnitude to be applied to the absent substrate C.

In the same manner as the first press bonding unit 40, the driving roller 51 cannot be displaced relative to the side frames 1*a*, 1*b*, while the press contact roller 53 can be displaced relative to the side frames 1*a*, 1*b* (and the driving roller 51) via a press contact force adjusting mechanism 55. The press contact force adjusting mechanism 55 has a similar structure to the press contact force adjusting mechanism 45 of the first press bonding unit 40 and therefore the detailed description for it will not be made. The press contact force between both the rollers 51, 53 are usually set within a range of 50 to 120 kgf.

The peeling-off unit 60 is disposed between the first press bonding unit 40 located upstream of the conveying passage and the second press bonding unit 50 located downstream of the conveying passage, and is equipped with a knife edge (peeling guide member) 61 disposed facing the conveying passage.

That is, the peeling-off unit 60 has the knife edge 61 located downstream of the first press bonding unit 40 with a given distance therefrom so as to separate the substrate C from the laminate layer D upon onelapse of a given time period after the thermally press bonding at the first press bonding unit 40. The reason for disposing the peeling-off unit 60 with a given distance from the first press bonding unit 40 is that an external force is to be applied onto the laminate material B (laminate layer D) after the laminate layer D activated (had its adhesive activated) by being thermally press bonded at the first press bonding unit 40 has been brought into a normal equilibrium state (a state where the bonding strength has been increased).

In other words, when a given time period has been elapsed after the heating at the first press bonding unit 40, the adhesive force of the laminate layer D to the recording medium A is securely increased as compared with the adhesive force between the substrate C and the laminate layer D. When the substrate C is peeled off under this state, only the substrate C is finely peeled off without unintentional peeling-off of the laminate layer D from the recording medium A. Therefore, a given distance is provided between the peeling-off unit 60 and the first press bonding unit 40. Accordingly, a distance (given interval) between the peeling-off unit 60 and the first press bonding unit 40 is set so that the time until the laminate layer D reaches the peeling-off unit 60 after passing through the first press bonding unit 40 is substantially equal to or longer than the time (a given time) required for bringing the laminate layer D from the activated state back to a substantially normal equilibrium state.

The knife edge 61 is held by a holder 62 to have its leading end positioned close to the conveying passage and inclined at an acute angle relative to the conveying passage. Specifically, the knife edge 61 has a bottom surface 61a facing the conveying passage in the peeling-off unit 60, and an inclined surface 61b connected to a downstream edge of the bottom surface 61a in the conveying direction and extending upwards at an acute angle relative to the bottom surface 61a (extending towards the substrate collecting unit 70). A connection line (ridge line) between the bottom surface 61a and the inclined surface 61b extends in a direction substantially orthogonal to the conveying direction of the recording medium A on the conveying passage.

The peeling-off unit 60 is further equipped with a guide plate 63 having a guide surface facing the inclined surface 61b as a guide surface, of the knife edge 61 with a given distance therefrom, so that the substrate C in the form of a continuous sheet peeled from the laminate layer D is fed to the substrate collecting unit 70 after passing between the inclined surface 61b of the knife edge 61 and the guide surface of the guide plate 63.

The peeling-off unit 60 further has sensors 64, 65 respectively disposed at given positions on the upstream side and the downstream side, of the leading edge (peeling-off point) of the knife edge 61 for detecting the leading and tailing edges of the recording medium A. The sensors 64, 65 can detect the leading and tailing edges of the recording medium A regardless of whether they are of a transmissive type or a reflective type, even in a case where the recording medium A is held between the laminate material B and the under film E, since the laminate material B and the under film E are transparent.

The substrate collecting unit 70 is to collect the substrate C in the form of a continuous sheet, which has been peeled off from the laminate layer D, by winding it into a roll so as to have a side of the substrate C, on which the laminate layer D was laminated, inwardly facing, and is equipped with a holder (collected substrate holding member) 71 for holding the roll of the substrate C. The holder 71 has both ends rotatably supported by the side frames 1a, 1b. The holder 71 is disposed so as to have a winding surface located upstream of the leading end of the knife edge 61 in the conveying passage, so that the peeled substrate C coming from the conveying passage is wound around the leading end of the knife edge 61, and at the same time the peeling angle of the substrate C relative to the conveying passage is determined.

Figure 9:
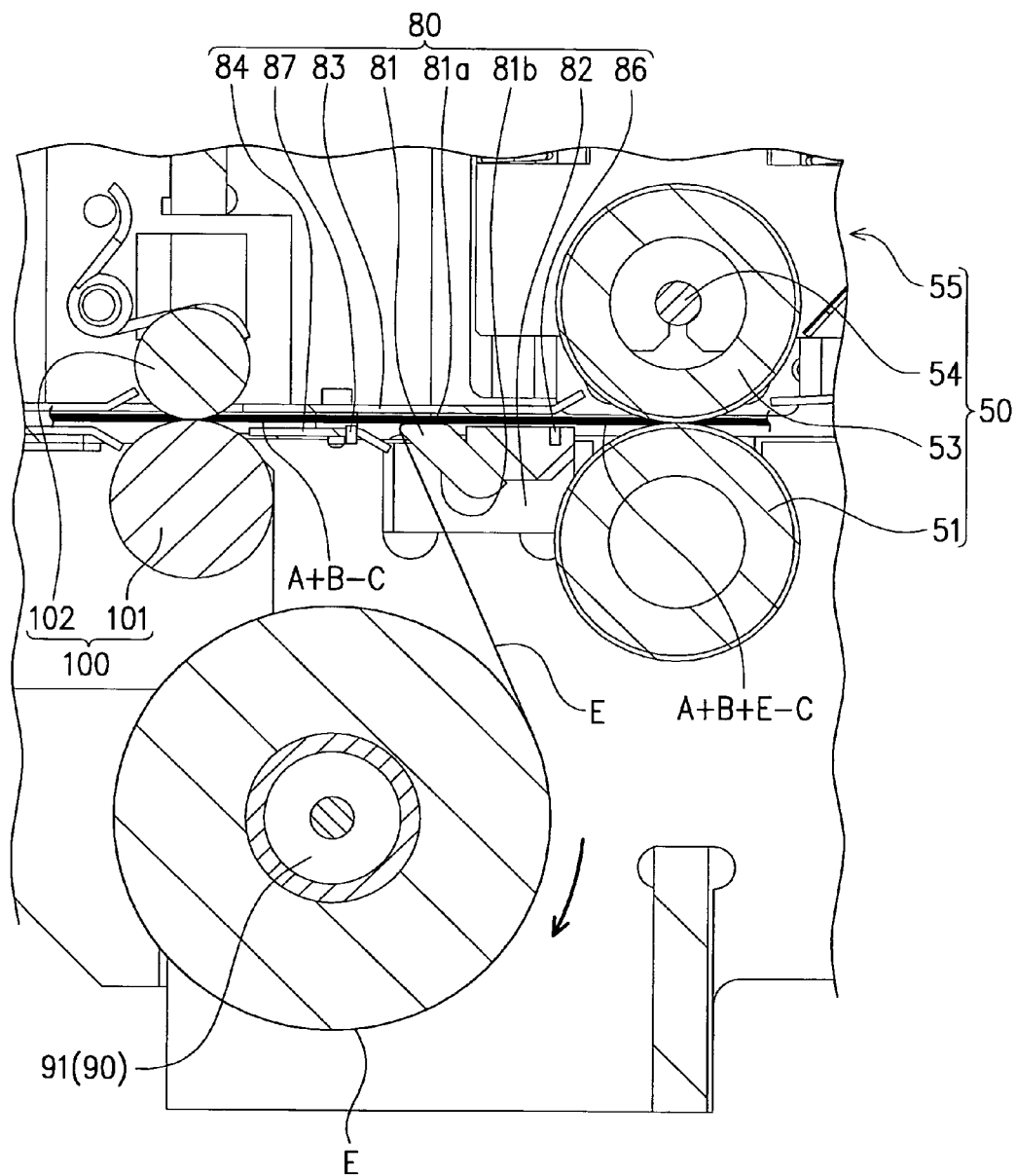
FIG. 9 is an enlarged side view of an essential portion of the second press bonding unit, a separating unit and its proximity, of the laminating apparatus of the first embodiment.

The separating unit 80 is, as illustrated in FIG. 9, disposed downstream of the press bonding unit (second press bonding unit 50) in the conveying passage (more specifically, between the second press bonding unit 50 and conveying roller members 100 for conveying a laminate (A+B−C: finished product) to the finished product discharging unit 150), and is equipped with a knife edge (separating guide member) 81 disposed facing the conveying passage.

That is, the separating unit 80 has the knife edge 81 located downstream of the second press bonding unit 50 with a given distance therefrom so as to separate the under film E from the recording medium A upon elapse of a given time period after the thermally press bonding at the second press bonding unit 50. The reason for disposing the separating unit 80 with a given distance from the second press bonding unit 50 is that an external force is to be applied onto the laminate material B (laminate layer D) after the laminate layer D activated (had its adhesive or the like activated) by being thermally press bonded at the second press bonding unit 50 has been brought into a normal equilibrium state (a state where the adhesive force has been increased).

In other words, when a given time period has been elapsed after the heating at the second press bonding unit 50, the adhesive force of the laminate layer D to the recording medium A is securely increased. When the under film E is peeled off under this state, the laminate layer D is unlikely to be unintentionally peeled from the recording medium A. Therefore, a given distance is provided between the separating unit 80 and the second press bonding unit 50. Accordingly, a distance (given interval) between the separating unit 80 and the second press bonding unit 50 is set so that the time until the laminate layer D reaches the separating unit 80 after passing through the second press bonding unit 50 is substantially equal to or longer than the time (a given time) required for bringing the laminate layer D from the activated state back to a substantially normal equilibrium state.

In FIGS. 3 and 4, the distance from the second press bonding unit 50 to the separating unit 80 is shorter than the distance from the first press bonding unit 40 to the peeling-off unit 60 for the reasons that: the heating temperature at the second press bonding unit 50 is set to be lower than the heating temperature at the first press bonding unit 40; and a guide plate 83, which is disposed between the second press bonding unit 50 and the separating unit 80 (in actual arrangement, straddling over the upstream side and the downstream side of the conveying passage) with the leading end of the separating unit 80 (knife edge 81) therebetween and defines a conveying passage, improves the conveying capability of a laminate (A+B+E−C) and functions as a forcibly cooling means for forcibly releasing heat of a laminate (A+B+E−C), on the contrary to the arrangement where a laminate (A+B+E) passing along the conveying passage between the first press bonding unit 40 and the peeling-off unit 60 is naturally cooled. As much as the distance from the second press bonding unit 50 to the separating unit 80 is shortened, the apparatus can be entirely reduced in size. In this embodiment, the interval between the separating unit 80 and the second press bonding unit 50 is set based on the correlation between the moving speed of a laminate (A+B+E−C on the conveying passage, the cooling efficiency of the guide plate 83 and the like, so as to allow the time until the laminate layer D reaches the separating unit 80 after passing through the second press bonding unit 50 to be the time (given time) required for bringing the laminate layer D from the activated state back to a substantially normal equilibrium state.

Referring back to FIG. 9, the knife edge 81 is held by a holder 82 to have its leading end close to the conveying passage and inclined at an acute angle relative to the conveying passage. Specifically, the knife edge 81 of the separating unit 80 has an upper surface 81a facing the conveying passage in the separating unit 80, and an inclined surface connected to a downstream edge of the upper surface 81a in the conveying direction and extending downwards at an acute angle relative to the upper surface 81a. A connection line (ridge line) between the upper surface 81a and the inclined surface 81b extends in a direction substantially orthogonal to the conveying direction in the conveying passage.

The separating unit 80 is further equipped with the guide plate 83 that is mounted in the housing 1 to define a conveying passage and has a shape straddling over the upstream side and the downstream side of the conveying passage with the leading end of the knife edge 81 therebetween. More specifically, the guide plate 83 has a shape with a leading end extending towards the proximity of the press bonding unit (second press bonding unit 50), and a proximal end portion extending over the leading end of the knife edge 81 to the downstream side of the conveying passage. The separating unit 80 is further equipped with a guide plate 84 (an example of the guide member) having a guide surface facing, with a given distance, an inner surface (guide surface) of a portion of the guide plate 83 located downstream of the leading end of the knife edge 81 in the conveying passage.

Both the guide plates 83, 84 are structured to each have a leading end (upstream end in the conveying direction) bent at a given angle in a direction away from the conveying passage, thereby forming an expanded tapered inlet opening to limit the movement of a laminate in a direction crossing the conveying direction (one direction) (movement exceeding a given tolerance) of the laminate conveyed on the conveying passage, in the downstream side of the inlet opening in the conveying passage. The guide plate 84 is disposed offset away from the conveying passage with reference to the upper surface 81a of the knife edge 81 and is positioned lower than the upper surface 81a of the knife edge 81, so that the interval between the guide plates 83, 84 is larger than the interval between the guide surface of the guide plate 83 and the upper surface 81a of the knife edge 81. That is, the interval between the guide surfaces defining the conveying passage on the downstream side of the knife edge 81 before the separation of the under film E is set to be larger than the interval after the separation of the under film E.

The separating unit 80 further has sensors 86, 87 respectively disposed at given positions on the upstream side and the downstream side, of the leading end (separating point) of the knife edge 81 for detecting the leading and tailing edges of each recording medium A. The sensors 86, 87 can detect the leading and tailing edges of each recording medium A regardless of whether they are of a transmissive type or a reflective type, even in a case where the recording medium A is held between the laminate material B and the under film E, since the laminate material B and the under film E are transparent.

The under film collecting unit 90 is to collect a continuous sheet of the under film E, on which an excessive laminate layer D has been transferred, by winding the under film E into a roll, and is equipped with a holder (collected under film holding member) 91 for holding the roll of the under film E. The holder 91 has both ends rotatably supported by the side frames 1a, 1b. The holder 91 is disposed so as to have a winding surface located upstream of the leading end (ridge line) of the knife edge 81 in the conveying passage, so that the under film E separated and displaced from the conveying passage is wound around the leading end of the knife edge 81, and at the same time the peeling angle of the substrate C relative to the conveying passage is determined.

Each function unit has the structure as mentioned above. Referring back to FIGS. 1 to 4, the laminate material supplying unit 20, the main structural elements of the peeling-off unit 60 and the substrate collecting unit 70 are disposed in the same housing (upper housing part 1A located on the side of the recording surface of each recording medium A), while the under film supplying unit 30, the main structural elements of the separating unit 80 and the under film collecting unit 90 are also disposed in the same housing (lower housing part 1B located on the side of the base surface of each recording medium A). The first press bonding unit 40, the second press bonding unit 50 and the conveying roller members 100 are disposed straddling over both the housings (upper housing part 1A and lower housing part 1B).

The driving rollers 41, 51, 101 of the first press bonding unit 40, the second press bonding unit 50 and the conveying roller members 100 are disposed in a first housing (lower housing part 1B), while the press contact rollers 8 (driven rollers) 43, 53, 102 are disposed in a second housing (upper housing part 1A).

The driving force of the motor 3 is simultaneously transmitted, via conventional driving force transmitting means (cf. FIGS. 1 and 2, no reference codes are allocated since those structures are apparent from Figures), such as sprockets, chains and gear trains, not only to the driving rollers 41, 51, 101 of the first press bonding unit 40, the second press bonding unit 50 and the conveying roller members 100, but also to all of the holders 71, 91 of the substrate collecting unit 70 and the under film collecting unit 90. By this synchronous driving, the laminate material B is pulled out from the laminate material supplying unit 20, the under film E is pulled out from the under film supplying unit 30, and laminates (A+B+E; A+B+E−C; A+B−C) are conveyed along the conveying passage to the downstream side.

Since a thin film, namely the laminate material B (the laminate layer D of which) is conveyed, the driving roller 51 of the second press bonding unit 50 is driven at a speed not more than 3% higher as compared with the driving roller 41 of the first press bonding unit 40, thereby applying back tension to the laminate material B between the press bonding units 40, 50. Not more than 3% is set for it, for the reasons that when back tension is excessively small, loosening is caused between the first and second press bonding units 40, 50, which leads to distortion of the recording medium A, or wrinkles are caused in the laminate layer D which has been softened by heating, which wrinkles are left on the recording surface of each recording medium A, and on the other hand, when back tension is excessively large, such back tension causes elongation of the laminate layer D and hence causes longitudinal wrinkles, which wrinkles are also left on the recording surface of the recording medium.

The laminating apparatus of this embodiment has the above arrangement. Now, the description will be made for each step of the lamination process in this apparatus.

Before carrying out the lamination process for each recording medium A, the laminate material B is previously pulled out from the laminate material supplying unit 20, wound around the free roller 22 and inserted through the first press bonding unit 40 between the driving roller 41 and the press contact roller 43) and the second press bonding unit 50 (between the driving roller 51 and the press contact roller 53), and the leading end thereof is wound around the holder 71 of the substrate collecting unit 70. The under film E is also pulled out from the under film supplying unit 30, wound around the free roll 32, and inserted through the first press bonding unit 40 (between the driving roller 41 and the press contact roller 43) and the second press bonding unit 50 (between the driving roller 51 and the press contact roller 53), and the leading end thereof is wound around the holder 91 of the under film collecting unit 90.

At this time, as mentioned above, the laminate material B and the under film E respectively and partially wound around the press contact roller 43 and the driving roller 41 at a given angle or angles to obtain preheating areas ST1, ST2 having a given width on the upstream side of the thermally press bonding point T in the surface moving directions X1, X2 of the press contact roller 43 and the driving roller 41. Therefore, the laminate material B and the under film E can be preheated at the preheating areas ST1, ST2 and upstream sides of the press contact roller 43 and the driving roller 41 near the preheating areas ST1, ST2. Thus, the preheated laminate material B and the under film E are easy to be heated to desired temperatures at thermally press bonding points ST at which they are heated to the desired temperatures, so that the heating temperature can be more stably obtained when the thermally press bonding is carried out.

When the laminate material B and the under film E are respectively preheated at the preheating areas ST1, ST2 by the use of the press contact roller 43 and the driving roller 41 for thermally press bonding, it is not necessary to provide preheating portions separately from the press contact roller 43, the driving roller 41 and the like, thereby enabling simplification of the arrangement and thus lowering the costs for it. The free rollers thus provided are disposed in the areas capable of being influenced by heats from the press contact roller 43 and the driving roller 41, and the laminate material B and the under film E are wound around the free rollers 22, 32, respectively prior to the thermally press bonding so as to be further preheated upon receiving the influence of heats from the rollers 43, 41. The thus preheated laminate material and under film E are easier to be heated to a desired temperature (s), and therefore the heating temperature can be more stably obtained when the thermally press bonding is carried out.

Since the free rollers 22, 32 are heated by utilizing heats from the press contact roller 43 and the driving roller 41, it is not necessary to provide a heating means separately from the heating means of the rollers 43, 41, and thus the costs for it can be reduced. This is also applicable to a later described second embodiment, and also applicable to a later described third embodiment, except for the matters relating to the under film. Accordingly, the description for the relevant matters will be omitted in the later described second and third embodiments. Under this state, the laminate material B and the under film E are overlapped to each other in the conveying passage between the first press bonding unit 40 and the peeling-off unit 60.

Under this state, as illustrated in FIG. 5, the recording surface of the recording medium A is directed to the side to which the laminate material B is supplied (in this embodiment, the upper side corresponding to the laminate material supplying unit 20), and the recording medium A is successively supplied from the recording medium supplying unit 10. That is, the laminating apparatus is designed to successively carry out lamination processes for plural recording media A, so that the recording media A are successively supplied from the recording medium supplying unit 10 to have a given interval between a preceding recording medium A and a subsequent recording medium A. Accordingly, the thus successively supplied recording media each are held interposed between the laminate material B and the under film E with the recording surface facing the laminate layer D, and the laminate material B, each recording medium A and the under film E are thermally press bonded to each other at the first press bonding unit 40. Since the laminate material B is supplied onto each recording medium A so as to protrude outwards from the opposite sides of the recording medium A both in the lengthwise and widthwise directions, the laminate layer D is softened and deformed to cover the recording surface and edges, of the recording medium when it is thermally press bonded at the first press bonding unit 40.

Then, as described above, since the laminate material B and the under film E are set to each have a size larger than the recording medium A, the recording medium A is held between the laminate material B and the under film E, and as illustrated in FIG. 11(A), the laminate layer D protruding outwards from the recording medium A is transferred onto the under film E to provide a laminated portion Da having the laminate layer D adhered onto the recording surface of the recording medium A and a non-laminated portion Db having the laminate layer D adhered onto the under film E so as to surround the recording medium A of the laminated portion Da.

That is, as illustrated in FIG. 11(B), when the laminate material B, the recording medium A and the under film E are thermally press bonded at the first press bonding unit 40 (or these three members, namely the laminate material B, the recording medium A and the under film E pass through the first press bonding unit 40), there is provided a laminate (A+B+E, B+E) in which the laminated portion Da having the recording medium A, the laminate material B and the under film E laminated together, and the non-laminated portion Db having the laminate material B laminated to the under film E, are provided. The transferred width Db of the laminate layer D transferred onto the under film E is set to be about 3 mm or larger. When the transferred width Db is smaller than this value, the bonding area between the under film E and the laminate layer D is small and sufficient adhesive force is unlikely to be produced. As a result, the under film E may be peeled off from the laminate layer D, which leads to the possibility that the portion having the laminate layer press bonded to the recording surface (laminated portion) Da is not finely separated from the portion having the laminate layer press bonded to the under film E (non-laminated portion) Db.

Then, the laminate (A+B+E, B+E) obtained at the first press bonding unit 40 is conveyed to the peeling-off unit 60, as illustrated in FIG. 8. Since the laminate (A+B+E, B+E) is held in a state where it has been cooled to some extent along with the elapse of a time (given time) after it has been heated at the first press bonding unit 40, the adhesive layer D' of the laminate layer D is already starting to be hardened (is coming back from the activated state to a normal equilibrium state), and is consequently held in a state where the adhesive layer D' has been substantially hardened or hardened to some extent (held in a substantially normal equilibrium state), the laminate (A+B+E, B+E) that has reached the peeling-off unit 60 has an adhesive force between the substrate C and the laminate layer D smaller than the adhesive force between the laminate layer D and the recording surface of the recording medium A or the adhesive force between the laminate layer D and the under film B (or the adhesive force between the laminate layer D and the recording surface of the recording medium A or the adhesive force between the laminate layer D and the under film E becomes larger than the adhesive force between the substrate C and the laminate layer D). Therefore, even when the substrate C is pulled upwards via the knife edge 61 towards the upstream side of the conveying direction, only the substrate C is securely peeled off, and is unlikely to cause the laminate layer D to be partly or entirely taken away along with the substrate C, unlike a conventional laminating apparatus.

In addition, since the leading end of the knife edge in the peeling-off unit 60 is held in slide contact with a laminate (A+B+E), lifting-up of the laminate (A+B+E) along with the peeling of the substrate C is prevented, so that the peeling angle of the substrate C can be stabilized.

Then, a laminate (A+B+E–C) with the substrate peeled off at the peeling-off unit 60 is conveyed to the second press bonding unit 50, at which a second thermally press bonding is carried out. Thus, the laminating apparatus of this embodiment first thermally press bonds a laminate with the substrate C existing therein, and then thermally press bonds the laminate with the substrate C removed therefrom, so that the adhesive force of the laminate layer D to the recording surface of the recording medium A can be enhanced, and even if air bubbles mix between the recording medium A and the laminate layer D during the lamination step at the first press bonding unit 40, these air bubbles can be removed and a finely finished surface can be produced.

Then, a laminate (A+B+E–C), to which the second thermally press bonding was carried out at the second press bonding unit 50, is conveyed to the separating unit 80, as illustrated in FIG. 9. The laminate (A+B+E–C), which has the laminate layer D of the laminate material B reactivated by thermally press bonding at the second press bonding unit 50, is moved towards the separating unit 80 while the adhesive layer D' of the laminate layer D is being hardened (or is being brought back into a normal equilibrium state from the activated state) along with natural radiation upon elapse of a time (given time) after the thermally press bonding at the second press bonding unit 50 and forced cooling by a radiation effect of the guide plate 83. As a result, the laminate (A+B+E–C) reaches the separating unit 80 while it has been brought into a state where its adhesive layer D' is substantially hardened or hardened to some extent (a substantially normal equilibrium state), and has the under film E separated at this unit.

Figure 12:
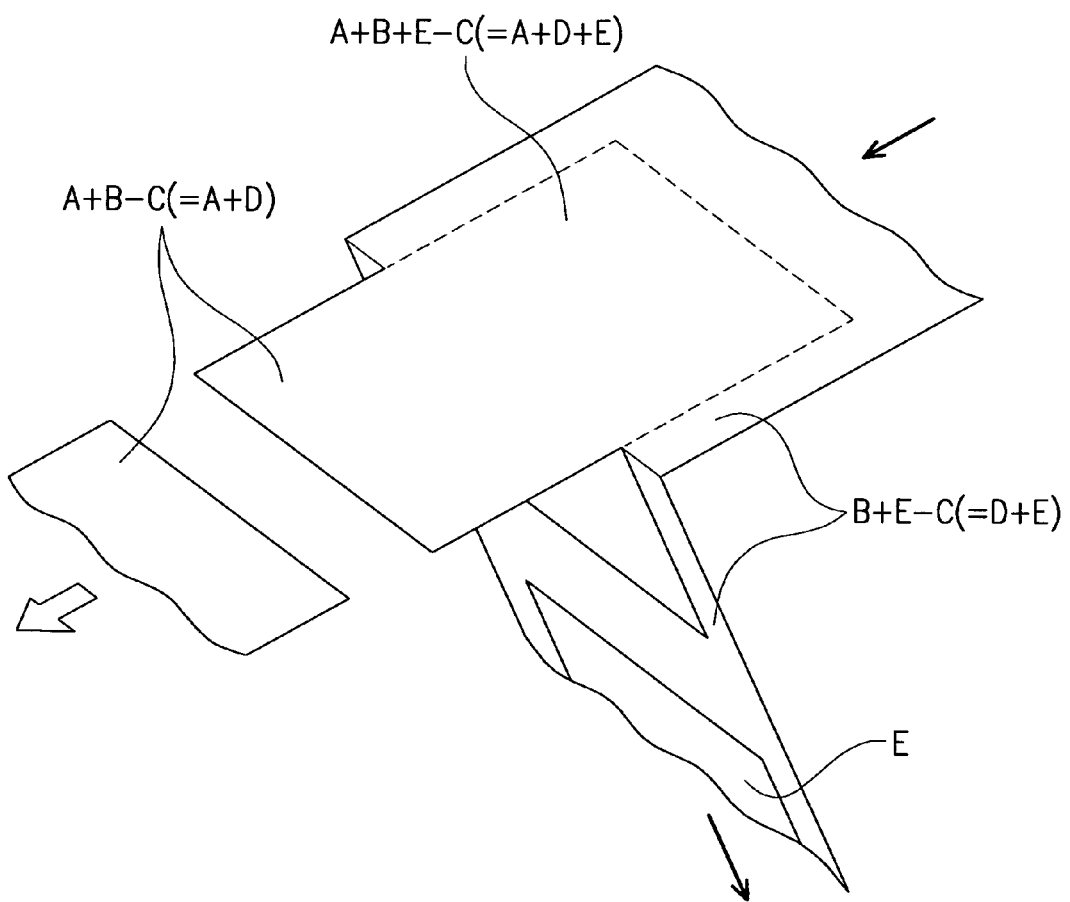
FIG. 12 illustrates an under film at the time when it is separated from a recording medium at the separating unit.

A laminate (A+B+E–C), which has being brought back into the substantially normal equilibrium state and reached the separating unit 80, is moved to the downstream side as being held in slide contact with the upper surface of the knife edge 81 of the separating unit 80, and when passing the ridge line of the knife edge 81, the under film E is rolled up onto the holder 91 of the under film collecting unit 90 while being wound around the leading end of the knife edge 81. At this time, as illustrated in FIG. 12, the recording medium A and the under film E are moved relative to each other so as to have the base surface of the recording medium A moving away from the under film E. Specifically, the recording medium A is further moving towards the downstream side between the guide plates 83, 84 (conveying passage), while the under film E is pulled in a direction different from the moving direction of the recording medium A (in a direction away from the base surface of the recording medium A) and thereby the laminate layer D of the non-laminated portion Db with the substrate C peeled off therefrom is pulled (drawn into) in the same direction as the direction of the under film E. Therefore, the laminate layer D of the non-laminated portion Db with the substrate C peeled off therefrom is also moving in the same direction as the direction of the under film E, a pulling force acts intensively along the boundary between a portion having the recording medium A and a portion lacking the recording medium A (that is, the boundary between the non-laminated portion Db and the laminated portion Da). (In the laminating apparatus of this embodiment, the peeling of the substrate C is carried out at the peeling-off unit 60 prior to the separation of the under film E at the separating unit 80, and this preceding peeling of the substrate C has an effect of more enhancing the intensively acting characteristics of the pulling force.) Thus, only the non-laminated portion Db is securely cut away and the edge of the laminate portion Da is finely finished along the edge of the recording medium A.

One of the reasons that the edge of the laminated portion can be finely finished is presumed that the edge of the recording medium A acts like a cutting blade. That is, a shearing force effected due to the presence of the edge of the recording medium A (a shearing force of the laminate layer D caused with the edge of the recording medium A acting as a boundary by the mutual interaction between the reaction force of the edge of the recording medium A and the adhesive force of the non-laminated portion Db to the under film E when separating the under film E) acts so that the laminated portion Da and the non-laminated portion Db are cut along the edge of the recording medium A. Particularly, the knife edge 81 of this embodiment has the upper surface oriented at an acute angle to the inclined surface, and therefore the moving direction of the under film E on the conveying passage is oriented at an acute angle to the moving direction of the under film E, which moves through the leading end (ridge line) of the knife edge 81 towards the under film collecting unit 90. In light of these, it is presumed that the edge of the recording medium A acts as a significantly sharp cutting blade.

Or, as another reason, as illustrated in FIG. 11(B), a very small width area of the laminate layer D along the edge of the recording medium A is slightly lifted from the under film E due to the thickness of the recording medium A. Since the pulling force at the time of separation of the under film E intensively acts on this lifted portion, the laminate layer D is ruptured along this lifted portion and accordingly the laminated portion Da and the non-laminated portion Db are cut along the edge of the recording medium A. Or, as still another reason, the laminate material B and the under film E each having the size larger than the recording medium A are used, and the laminate material B and the under film E with the recording medium A interposed therebetween are thermally press boded by the press bonding units 40, 50 so that the laminate layer D of the laminate material B is deformed in conformity with the shape of the recording surface, edge or the like of the recording medium A, and as a result, the very small width area of the laminate layer D along the edge of the recording medium A becomes thinner. A pulling force at the time of separation of the under film E intensively acts on this thinned portion so that the laminate layer D is ruptured along this thinned portion, and the laminated portion Da and the non-laminated portion Db are cut along the edge of the recording medium A.

It is a matter of course that the laminate layer D of the non-laminated portion Db cut away from the laminated portion Da is taken away along with the under film E.

At the separating unit 80, as illustrated in FIG. 9, there is provided the guiding surfaces (the inner surfaces of the guide plates 83, 84, the upper surface 81*a* of the knife edge 81) defining the conveying passage throughout the upstream side and the downstream side of the conveying passage with the leading end of the knife edge 81 therebetween, and therefore a laminate (A+B+E–C; A+B–C) can be stably conveyed along the conveying passage, even when the under film E is being separated. As a result, it is possible to prevent the laminate (A+B+E–C; A+B–C) from flapping in the normal direction thereof, as well as stabilizing the separation angle of the under film E. Further, when the under film E is pulled towards the under film collecting unit 90, a leading portion of each recording medium A tends to follow the movement of the under film E in the initial stage. However, before this recording medium A is completely bent or as far as it can restore the posture by its elasticity, the laminated portion Da and the non-laminated portion Db are cut away along the boundary therebetween. Therefore, with the conveying passage enlarged by bending the guide plate 84 disposed on the side of the knife edge 81, a leading portion of the recording medium A is led between the guide plates 83, 84, and this recording medium A is conveyed to the finished product discharging unit 150 on the downstream side. Thus, recording media A each formed with the edge finely finished therealong and laminated with the laminate layer D adhered onto the recording surface without air or the like therebetween are discharged to the finished product discharging unit 150.

Meanwhile, in a case where a most upstream end of the guide plate 34 in the conveying direction is positioned on the conveying passage of the recording medium A on the upstream side of the guide plate 84, the base surface of the recording medium A is separated from the under film E while the under film E is kept wound around the leading end of the knife edge 81. And, when the non-laminated portion Db and the laminated portion Da are cut away from each other, the laminate layer D of the non-laminated portion Db is moving in the same direction as the direction of the under film E, the leading edge of the recording medium A is pulled in a direction away from the under film E along with the movement of the under film E, thereby allowing this leading end to be shifted from the conveying passage of the recording medium A towards a separating direction of the under film E and hence to be held at a position at which it easily intrudes into a clearance between a separating point (the leading end of the knife edge 81) and the guide plate 84. In this regard, since the guide plate 84 is, in this embodiment, disposed offset towards a direction away from the conveying passage with reference to the conveying passage of the recording medium A in the upstream side of the guide plate 84, even if there is a clearance between the separating point and the guide plate 84, it is possible to make the leading edge of the recording medium A difficult to intrude into the clearance. Whereby, it is possible to appropriately guide the recording medium A coming from the separating point to the guide plate 84 and hence appropriately separate the under film E from the recording medium A.

Herein, assuming that an attempt is made to open the upper housing part 1A in order to take out the recording medium A or laminate material B stacked in the conveying passage in the course of the lamination process, or in order to do maintenance after the end of the operation. In this respect, according to the laminating apparatus of this embodiment, as long as the temperatures detected by the temperature sensors of the first press bonding unit 40 and the second press bonding unit 50 are not lower than a given temperature (e.g., 60° C.), the power lock as the locking means 2 is not unlocked so that the upper housing part 1A cannot be opened. Therefore, the operator is unlikely to unintentionally touch a heated roller, and this apparatus is designed with a safety feature.

Applied Example 1

The laminating apparatus of the above embodiment is to carry out the thermally press bonding operation in two stages, namely the first stage, which is made before the peeling-off of the substrate C and the second stage, which is made after the peeling-off of the substrate C. In the thermally press bonding operation of the second stage, since the laminate layer D is released from restriction by the substrate C and is hence softened, the press contact force is directly applied to the laminate layer D so that the adhesiveness of the laminate layer D to the recording surface of the recording medium A is increased. In addition, since the laminate layer D is adhered onto the recording medium A and held stabilized as a result of the thermally press bonding operation of the first stage, the laminate layer D is unlikely to be influenced even by the press contact force and direct heating thereto. Thus, it is possible not only to provide a lamination process offering a normal glossy finish, as illustrated in FIG. 13(A), (a lamination process forming the laminate layer D so as to give the surface (more precisely, the surface of the protection layer D") a glossy finish relative to a glossy recording surface (a recording surface with a high degree of flatness)), but also to provide the following lamination process.

Applied Example 1(1)

As illustrated in FIG. 13(B), there is provided a lamination process forming the laminate layer D to give the surface a semi-glossy finish or non-glossy finish relative to a semi-glossy (such as mat finished) recording surface or non-glossy recording surface (uneven recording surface). In this case, the protection layer D" of the laminate layer D is required to have the flexibility allowing itself to conform the uneven configuration of the recording surface of the recording medium A by the thermally press bonding. Since the press contact roller 53 has a soft surface, it is possible to make the laminate layer D follow the uneven surface configuration of the recording medium A. Accordingly, when the soft layer is excessively thin, its effectiveness may be reduced. For this reason, the soft layer must have a thickness of at least 1 mm, as described above.

Applied Example 1 (2)

As illustrated in FIG. 13(C), there is provided a lamination process forming the laminate layer D to give the surface a glossy finish relative to a semi-glossy (such as mat finished) recording surface or non-glossy surface (uneven recording surface). In this case, the protection layer D" of the laminate layer D is required to have the stiffness preventing itself from conforming the uneven configuration of the recording surface of the recording medium A even by the thermally press bonding.

Applied Example 2

The laminating apparatus of the above embodiment is to carry out the peeling-off step and the separating step by making the conveying speed of a laminate (A+B+E; A+B+E−C; A+B−C) constant at any time. Additionally, it is possible to employ the following process.

Applied Example 2 (1)

In the peeling-off step, the conveying speed of a laminate (A+B+E) is controlled so as to reduce the peeling speed when processing the leading and tailing edge sides, of each recording medium A, following, for example, any one of the patterns illustrated in FIGS. 14(A) to 14(C). Specifically, the controlling as employed is made as follows: When the sensor 65 located on the upstream side of the leading end of the knife edge 61 detects the leading edge of the recording medium A, the conveying speed becomes slower, and when the sensor 65 located on the downstream side of the leading end of the knife edge 61 detects the leading edge of the recording medium A, the conveying speed is returned. Then, when the sensor 64 on the upstream side detects the tailing edge of the recording medium A, the conveying speed again becomes slower, and when the sensor 65 on the downstream side detects the tailing edge of the recording medium A, the conveying speed of the recording medium A is again returned. As a result, an excessive pulling force is unlikely to be applied to the laminate layer D in the leading and tailing edges of the recording medium A, and therefore the laminate layer D laminated on the recording medium A is unlikely to be unintentionally peeled off from the edge of the recording medium A.

Applied Example 2 (2)

In the separating step, the conveying speed of a laminate (A+B+E−C; A+B−C) is controlled so as to delay the separating speed when processing the leading and tailing edge sides, of each recording medium A, following, for example, any one of the patterns illustrated in FIGS. 14(A) to 14(C). Specifically, the controlling is made as follows: When the sensor 86 located on the upstream side of the leading end of the knife edge 81 detects the leading edge of the recording medium A, the conveying speed becomes slower, and when the sensor 87 located on the downstream side of the leading end of the knife edge 81 detects the leading edge of the recording medium A, the conveying speed is returned. Then, when the sensor 86 on the upstream side detects the tailing edge of the recording medium A, the conveying speed again becomes slower, and when the sensor 87 on the downstream side detects the tailing edge of the recording medium A, the conveying speed of the recording medium A is again returned. As a result, a pulling force is gently applied in a section in which the conveying speed is kept slow, the pulling force is easy to be applied intensively along the boundary between the laminated portion Da and the non-laminated portion Db in the leading and tailing edge sides of the recording medium A (that is, a very small width area of the laminate layer D along the leading and tailing edges of the recording medium A). As a result, it is possible to finely finish the leading and tailing edges of the laminate layer D. In addition, by reducing the conveying speed of a laminate (A+B+E−C; A+B−C) in the leading edge side of the recording medium A, it is possible to prevent the leading edge side of the recording medium A from following the under film E and being drawn in along with it. Thus, even when the under film E is being separated, the recording medium A can be stably conveyed along the conveying passage.

Second Embodiment

Figure 15:
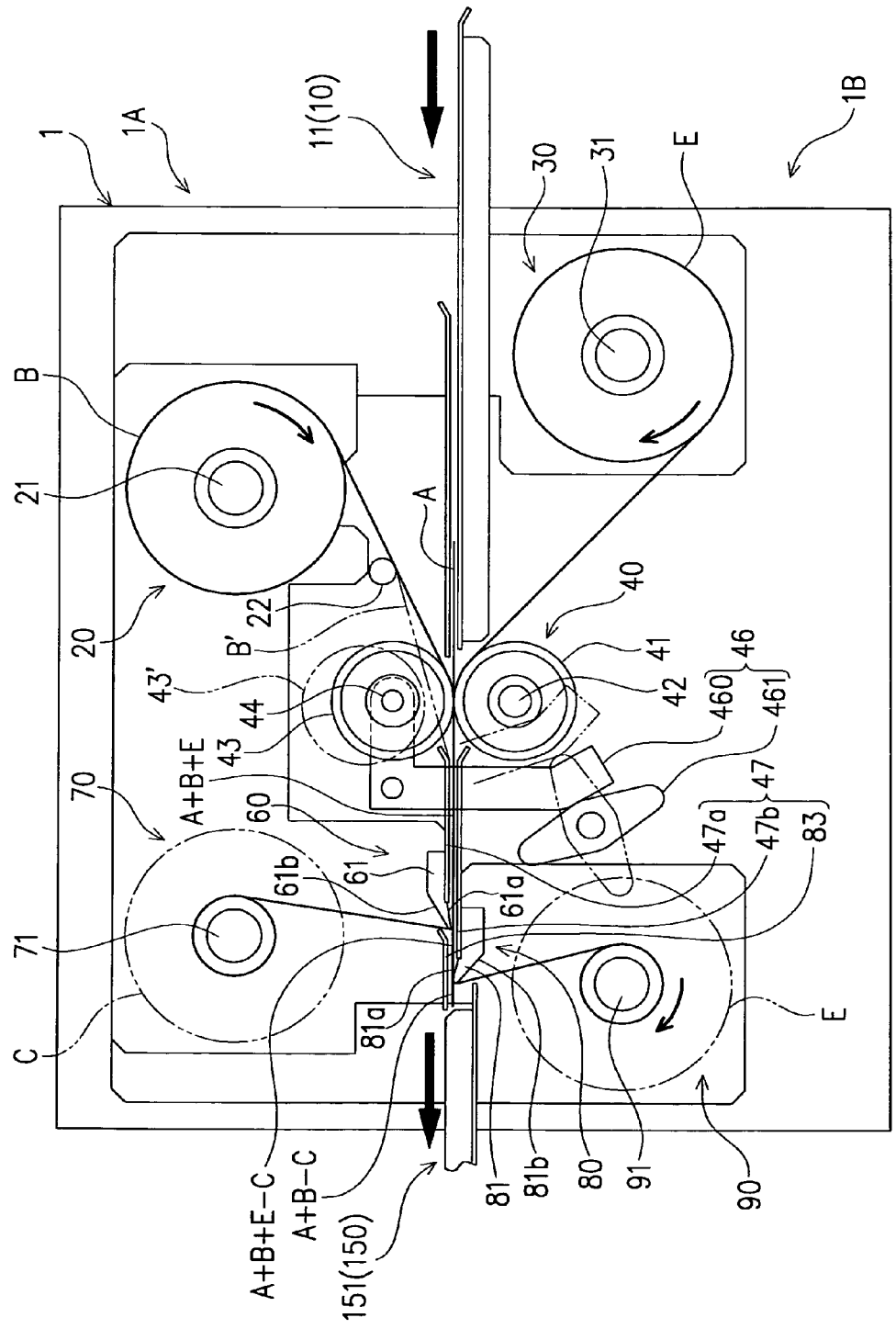
FIG. 15 is a side view of a laminating apparatus of a second embodiment.

A laminating apparatus of this embodiment is illustrated in FIG. 15. The apparatus of this embodiment is different from the apparatus of the first embodiment in that a guide member disposed downstream of the press bonding unit has a different structure, two press bonding units are united into one, and a press contact roller of the press bonding unit is designed to be movable towards and away from a driving roller. The other structures are basically the same as those of the first embodiment so that the same description will be applied thereto or the same description of the first embodiment will be technically appreciated as the description for this embodiment, while the same reference codes as those of the first embodiment are allocated and the description for them is omitted.

The laminating apparatus of this embodiment is equipped with a guide body 47 that guides a laminate (A+B+E), which has passed through the first press bonding unit 40, from the downstream side of the first press bonding unit 40 to the downstream side of the separating unit 80. The guide body 47 is made up of a pair of upstream guide plates 47a, 47b disposed downstream of the press bonding unit 40 so as to be located adjacent to the press bonding unit 40, and a downstream guide plate (guide plate) 83 disposed downstream of a first guide plate 47a via the knife edge 61 of the peeling-off unit 60.

The pair of upstream guide plates 47a, 47b are located between the press bonding unit 40 and the separating unit 80. The pair of upstream guide plates 47a, 47b are disposed facing each other in vertical orientation with a given distance, and together define a conveying passage for conveying a laminate (A+B+E) to the downstream side. Specifically, the pair of upstream guide plates 47a, 47b together define a conveying passage therebetween to guide at least one of the opposite surfaces of the laminate (A+B+E) by the inner surfaces of the upstream guide plates 47a, 47b (limit the movement of the laminate in a direction crossing the surface thereof), and prevent the laminate (A+B+E) from swaying in a direction crossing the surface thereof along with the conveyance and flapping along with the separation at the separating unit 80.

The downstream guide plate 83 is located via the leading end of the knife edge 61 of the peeling-off unit 60 on the downstream side of the above located, upstream guide plate 47a, and extends to the upstream side and the downstream side, of the conveying passage with reference to the leading end of the knife edge 81 in a position facing the upper surface 81a of the knife edge 81 of the separating unit 80 with a given distance (extends to the upstream side and the downstream side, of the conveying passage with the leading end of the knife edge 81 located therebetween). The downstream guide plate 83 has a leading end (an end close to the upstream side of the conveying passage) bent at a given angle in a direction away from the conveying passage, thereby forming an expanded tapered inlet opening and a conveying passage having a given clearance, between the downstream guide plate 83 and the knife edge 81 of the separating unit 80.

In this embodiment, the mounting plate 151 of the finished product discharging unit 150 is located via the knife edge 81 of the separating unit 80 on the downstream side of the second upstream guide plate 47b, and is disposed offset in a direction away from the conveying passage with reference to the upper surface 81a of the knife edge 81, and arranged at a position lower than the upper surface 81a of the knife edge 81. Whereby, the distance between the guide surface of the downstream guide plate 83 and the upper surface of the mounting plate 151 is greater than the distance between the guide surface of the downstream guide plate 83 and the upper surface 81a of the knife edge 81, so that the laminate A (laminated portion Da), which has been subjected to the lamination process, is discharged onto the mounting plate 151 immediately after the separation of the non-laminated portion Db at the separating unit 80.

The guide body 47 (the upstream guide plates 47a, 47b, the downstream guide plate 83) thus located downstream of the press bonding unit 40 is made of a material (such as aluminium alloy, copper alloy or the like) having a high heat conductivity and an excellent heat releasing property, and functions as a radiator (forcibly cooling means) that releases the heat of a laminate (A+B+E) caused by heating at the press bonding unit 40 to the outside during the laminate (A+B+E) passes therethrough, while surely improving the conveying stability for the laminate (A+B+E). Whereby, the laminate layer D of the laminate (A+B+E) that reaches the separating unit 80 from the press bonding unit 40 is brought into a substantially normal equilibrium state from the activated state, so that even if the recording medium A and the under film A are moved relative to each other at the separating unit 80, it is unlikely to cause positional displacement or peeling-off between the laminate layer D and the recording surface of the recording medium A, and the laminated portion Da can be smoothly and securely separated from the non-laminated portion Db.

The reason why the press bonding units are united into one is that even by a single thermally press bonding operation, there is a case where the effect of improving the adhesiveness of the laminate layer D to the recording surface of the recording medium A and the effect of removing air bubbles mixed between the recording medium A and the laminate layer D are within an acceptable level for actual products.

A contacting and separating mechanism (press contact and releasing mechanism) 46 for rollers at the press bonding unit includes an arm (cam follower) 460 that has a first portion at which it rotatably supports a roller (press contact roller 43) and a second portion at which it is pivotally movably supported to the housing 1, and a cam 461 that contacts a third portion of the arm 460 to switch the pivotally moving position of the arm 460 to a first position at which the press contact roller 43 contacts the driving roller 41 and to a second position at which the press contact roller 43 is separated from the driving roller 41. When the pivotally moving position of the arm 460 is brought into the first position, the press contact force between both the rollers 41, 43 imparts a press bonding action to a laminate (A+B+E). Normally, this press contact force is set within a range of 50 to 120 kgf.

The press contact and releasing mechanism 46 is designed to move the press contact roller 43 outside of a trajectory B', which trajectory is followed by the laminate material B when in an arrangement lacking the press contact roller 43, and therefore the press contact roller 43 at a press-contact releasing position does not contact the laminate material B.

Therefore, according to the laminating apparatus of this embodiment, when for example only a single recording medium A is subjected to the lamination process, the press contact roller 43 is released from the press contacting state at the time when the recording medium A has passed through the press bonding unit 40, so that the laminate material B and the under film respectively fed from the laminate material supplying unit 20 and the under film supplying unit 30 before the recording medium is discharged as a finished product are not laminated to each other, and therefore by rewinding the laminate material B and the under film E, respectively, they can be used in the lamination process for the next recording medium A. As a result, the laminate material B can be efficiently utilized.

The above will now be described in detail. When the recording medium A supplied from the recording medium supplying unit 10 has passed through the press bonding unit 40, the press contact and releasing mechanism 46 is operated by the operator or the like to switch the pivotally moving position of the arm 460 from the first position to the second position. Accordingly, the first portion of the arm 460 is moved (moved upwards in this embodiment), and at the same time the position of the press contact roller 43 rotatably supported by the first portion is moved upwards (reference code: 43'). Whereby, the press contact force caused between the press contact roller 43 and the driving roller 41 is released. Thus, the laminate material B and the under film E fed respectively from the laminate material supplying unit 20 and the under film supplying unit 30 in the subsequent operation before the laminated recording medium A is discharged to the finished product discharging unit 150 are not laminated to each other.

The adjustment is made so that the press contact roller 43 does not contact the laminate material B at the time when the press contact force has been released. Specifically, when the pivotally moving position of the arm 460 is at the second position, the press contact roller 43 is positioned outwards (upward) of the trajectory B' of the laminate material B (reference code: 43') so that the press contact roller 43 does not contact the laminate material B (laminate layer), and thus the heat conduction to the laminate layer is prevented. Whereby, the laminate layer is unlikely to be transformed by heat and hence the quality can be kept.

In the above adjustment (adjustment for non-contact), the second position of the arm 460 (the amount of displacement of the arm 460) and the disposed position of the free roller 22 may be able to become parameters (elements) for it, but in a case where for example the disposed position of the free roller 22 is substantially fixed (for example, where the allowable range of the approaching angle of the laminate material B when in the press bonding is small), the adjustment is made based on the amount of displacement by the arm 460. Contrarily to this, in a case where the disposed position of the free roller 22 can be varied to some extent and the amount of displacement of the arm 460 is substantially fixed, the disposed position of the free roller 22 becomes an element for adjustment.

The free roller 22 may not be designated as a parameter for adjustment for non-contact, and instead, an additional roller exclusively used for adjustment for non-contact may be provided as a control roller. Specifically, this control roller is disposed between the free roller 22 and the press contact roller 43 so as to be located outwards of the common tangent of the free roller 22 and the press contact roller 43 (located on the upper side in this embodiment) when in press bonding operation, and when the press contact force is released, the laminate material B contacts this control roller, and the press contact roller 43 is moved away so as to be located outside of the trajectory of the laminate material B (located on the upper side in this embodiment) leading up to the conveying passage passing the control roller, thus enabling preventing contact with the laminate material B.

Then, when the laminated recording medium A has been discharged to the finished product discharging unit 150, an operation to pull back the laminate material B and the under film E, which were fed out and left unlaminated, is carried out. In this operation, the holder 21 (holder 31) is rotated in the direction reverse to the supplying direction of the laminate material B (under film E) (reversely rotated), so that the laminate material (under film E) fed out and left unlaminated is pulled towards the upstream along the conveying passage and is rolled up (rolled back) onto the holder 21 (holder 31).

At this time, the operator or the like may manually rotate the holder 21 (holder 31) in the reverse direction, or there may be employed an arrangement enabling the transmission of the driving force of a not-illustrated motor (driving source) to the holder 21 (holder 31) by known driving-force transmission means (not shown) such as sprockets, chains and gear trains so that the holder 21 (holder 31) is reversely rotated by the driving force of the motor. In the latter case, the holder 21 and the holder 31 may share the common driving source or have separate driving sources. Or, any one of the holders may be driven by a motor.

The amount of each of the laminate material B and the under film E to be pulled back (the length to be rolled back) is appropriately determined while designating each amount fed out and left unlaminated as maximum, and therefore it is not necessary to have both amounts matched. Or, any one of the laminate material and the under film E may only be pulled back.

Once the pulling back operation has been finished, the press contact and releasing mechanism 46 is again operated by the operator or the like so as to switch the pivotally moving position of the arm 460 from the second position to the first position, thereby being brought into a state enabling the lamination process for the next recording medium A.

It is possible to automatically carry out a part or whole of a series of operations (switching from the first position to the second position, pulling-back operation and switching from the second position to the first position) by providing detection means such as sensors at appropriate positions along the conveying passage.

The press contact and releasing mechanism is not necessarily limited to a pivotally moving type and may be of a direct acting type. The press contact and releasing mechanism, regardless of which type is employed, may be applied to the first press bonding unit 40 and/or the second press bonding unit 50 of the laminating apparatus of the first embodiment.

In the second embodiment (the same applied also to a later described third embodiment), a member corresponding to the guide plate 84, an example of the guide member, is the mounting plate 151 that is disposed in proximity and downstream of the separating point, at which the surface opposite to the recording surface of the recording medium A is separated from the under film E, in the conveying direction of the recording medium A, and that has the guide surface extending in the conveying direction. The arrangement of the second embodiment also produces the same advantage as that of the guide member 84 of the first embodiment. That is, in a case where a most upstream end of the mounting plate 151 is disposed so as to be positioned on the conveying passage of the recording medium A on the upstream side of the mounting plate 151, the base surface of the recording medium A is separated from the under film E while the under film E is kept wound around the leading end of the knife edge 81, and at the time when the non-laminated portion is cut away from the laminated portion Da, the laminate layer D of the non-laminated portion Db is moving in the same direction as the direction of the under film E and therefore the leading edge of the recording medium A is pulled in the separating direction of the under film E along with the movement of the under film E, thereby allowing this leading end to be shifted from the conveying passage of the recording medium A in the separating direction of the under film E and hence to be held at a position at which it easily intrudes into a clearance between the separating point and the mounting plate 151. However, in the laminating apparatus of the second embodiment, the mounting plate 151 is disposed offset in a direction away from the conveying passage of the recording medium A on the upstream side of the mounting plate 151, so that even if a clearance exists between the separating point and the mounting plate 151, it is possible to make the leading edge of the recording medium A difficult to intrude into the clearance. Whereby, it is possible to appropriately guide the recording medium A coming from the separating point and hence appropriately separate the under film E from the recording medium A.

Third Embodiment

Figure 16:
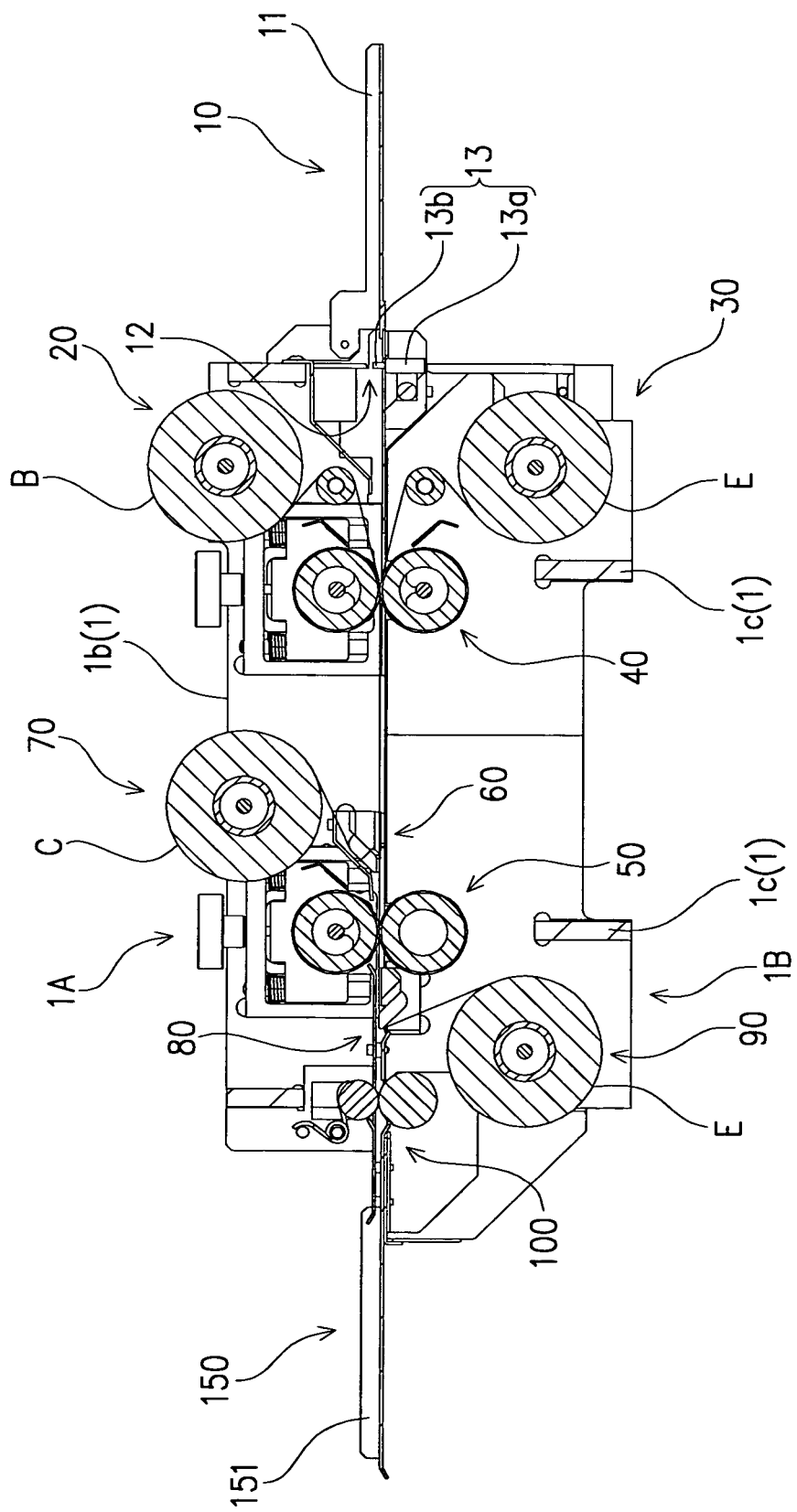
FIG. 16 is a side view of a laminating apparatus of a third embodiment.

A laminating apparatus of this embodiment is illustrated in FIG. 16. The laminating apparatus of this embodiment is different from the laminating apparatus of each of the first and second embodiments in that the timing at which the recording medium supplying unit 10 supplies each recording medium A can be mechanically controlled. The other structures are basically the same as those of the first embodiment or the second embodiment so that the same description will be applied thereto or the same description of the first embodiment or the second embodiment will be technically appreciated as the description for this embodiment, while the same reference codes as those of the first embodiment or the second embodiment are allocated thereto, and the description for them will be omitted.

The recording medium supplying unit 10 of the laminating apparatus of this embodiment is equipped with the mounting plate 11 that is mounted to extend from the upper end of the lower housing part 1B to the outside on one side of the housing 1, and a recording-medium passing block means 13 that switches the recording medium passing condition at a recording medium supplying port 12 formed between the upper housing part 1A and the lower housing part 1B on one side of the housing 1, between a condition allowing passing of the recording medium A and a condition blocking passing of the same.

The mounting plate 11 is structured in the same manner as the mounting plate 11 of the first embodiment or the second embodiment. For the recording-medium passing block means 13 of this embodiment, an electric cylinder that has a cylinder tube 13*a* and a rod 13*b* capable of being moved out and into the cylinder tube 13*a* is employed. The cylinder tube 13*a* of the recording-medium passing block means 13 is connected to the lower housing part 1B. With the rod 13*b* extended, the rod 13*b* is present on the conveying passage through which the recording medium A located at and around the recording medium supplying port 12 passes. The presence of the rod 13*b* can produce a condition for blocking the movement of the recording medium A from the recording medium supplying port 12 towards the first press bonding unit 40, or blocking the supply of the recording medium A. The recording-medium passing block means 13 is so structured that when the rod 13*b* is retracted within the cylinder tube 13*a*, the rod 13*b* is not present on the conveying passage through which the recording medium A at and around the recording medium supplying port 12 passes, and therefore produces a condition allowing the movement of the recording medium A from the recording medium supplying port 12 towards the first press bonding unit 40 or the supply of the recording medium A. The recording-medium passing block means 13 is so structured to have the rod 13*b* extended and retracted based on the detected result of a transmissive sensor, an optoelectronic sensor or other detection sensor (not shown) for detecting the presence and absence of the recording medium A at a given position on the conveying passage between the recording medium supplying port 12 and the first press bonding unit 40.

Specifically, as long as the detection sensor disposed at a given position detects the presence of the recording medium A on the conveying passage, the rod 13*b* is kept extended to block the supply of the recording medium A, and when the detection sensor detects the absence of the recording medium on the conveying passage, the rod 13*b* is retracted to allow the supply of the recording medium A.

Whereby, as long as the recording medium A does not completely pass the given position (the position at which the detection sensor is disposed) on the conveying passage between the recording medium supplying port 12 and the first press bonding unit 40, the subsequent recording medium A cannot be supplied, so that the precedent recording medium A is spaced from the subsequent recording medium A. Whereby, the laminate material (laminate layer D) can be thermally press bonded completely to the entire area of each recording medium A from the leading edge through the tailing edge at the first press bonding unit 40 and the second press bonding unit 50, and the under film E can be thermally press bonded substantially completely to the laminate layer D between the precedent and subsequent recording media A, A so that a non-bonded area of the laminate layer D to the under film E near the boundary between the laminated portion Da and the non-laminated portion formed as surrounding each recording medium A can be minimized. Hence, when the under film E is separated from the base surface of the recording medium A at the separating unit 80, its pulling force can be applied intensively to the edge or its proximity of the recording medium A so that the edge of the laminate layer D of the laminated portion Da after the separation of the non-laminated portion Db can be finely finished.

Fourth Embodiment

Figure 17:
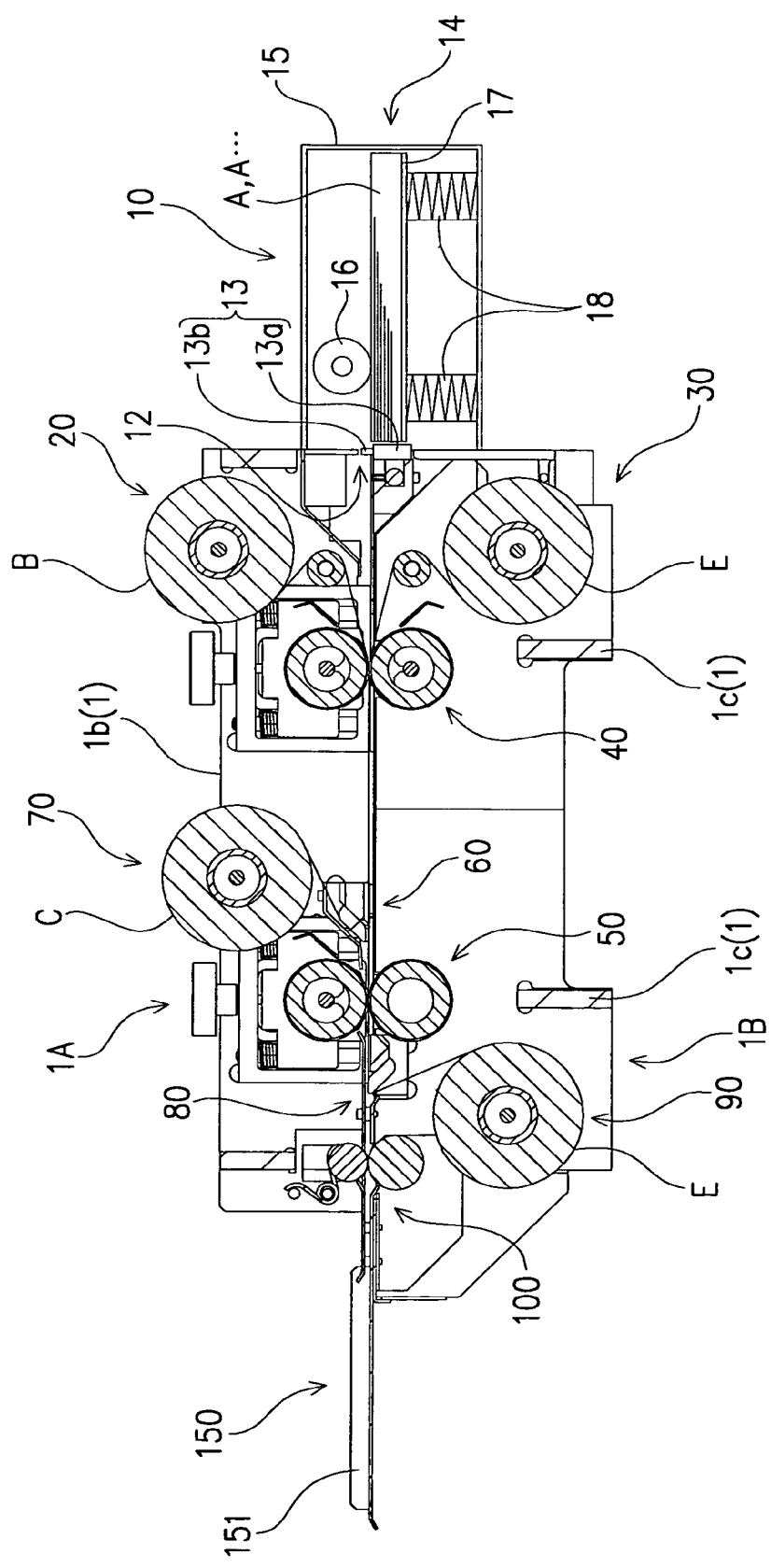
FIG. 17 is a side view of a laminating apparatus of a fourth embodiment.

A laminating apparatus of this embodiment is illustrated in FIG. 17. The laminating apparatus of this embodiment is different from the laminating apparatus of each of the first to third embodiments in that the recording medium supplying unit 10 can automatically supply each recording media A. The other structures are basically the same as those of the first to third embodiments so that the same description will be applied thereto or the same description of the first to third embodiments will be technically appreciated as the description for this embodiment, while the same reference codes as those of the first to third embodiments are allocated thereto, the description for them will be omitted.

The recording medium supplying unit 10 of the laminating apparatus of this embodiment is equipped with a sorter 14 interconnected to the outer wall of the lower housing part 1B on one side of the housing 1, and the recording-medium passing block means 13 that switches the recording medium passing condition at a recording medium supplying port 12 between a condition allowing passing of the recording medium A supplied from the sorter 14 and a condition blocking passing of the same.

The sorter 14 is made up of an accommodation part 15 for accommodating a stack of recording media A, A . . . , and a feeding roller 16 for feeding an uppermost recording medium A of the stack of the recording media A, A . . . , accommodated in the accommodation part 15, towards the recording medium supplying port 12 one by one.

The accommodation part 15 is formed into a box-like shape and has a wall part interconnected to the lower housing part 1B and having a slit-like opening corresponding to the recording medium supplying port 12. Inside of the accommodation part 15 is mounted a mounting plate 17 that is vertically moveable for mounting the recording media A, and an urging means 18 (coil springs in this embodiment) interposed between the bottom of the accommodation part 15 and the mounting plate 17 for urging the mounting plate 17 to the upper side within the accommodation part 15.

The feeding roller 16 is disposed so as to press contact an uppermost recording medium A of the recording media A, A . . . , mounted on the mounting plate 17 and allows an uppermost recording medium A to be positioned corresponding to the slit of the accommodation part 15 (recording medium supplying port 12) by an urging force of the urging means 18 applied to the mounting plate 17. That is, the feeding roller 16 is disposed so as to prevent the uppermost recording medium A from being displaced from the position, at which the slit (recording medium supplying port 12) is formed, by an urging force of the urging means 18. The feeding roller 16 is designed to be rotated and stopped by a timer so as to successively feed recording media A with a distance between a precedent recording medium A and a subsequent recording medium A. By this arrangement, the sorter 14 feeds only the uppermost recording medium A towards the recording medium supplying port 12 by a friction force between the recording surface of the recording medium A and the outer circumference of the feeding roller 16 upon the rotation of the feeding roller 16.

In the same manner as the third embodiment, the recording-medium passing block means 13 is also structured so as to have the rod 13b extended and retracted based on the detected result of a transmissive sensor, an optoelectronic sensor or other detection sensor (not shown) for detecting the presence and absence of the recording medium A at a given position on the conveying passage between the recording medium supplying port 12 and the first press bonding unit 40, thereby switching the recording medium passing condition between a condition allowing passing of the recording medium A to the recording medium supplying port 12 and a condition blocking the supply of the recording medium A. Unlike the third embodiment, the recording-medium passing block means 13 is provided for the purpose of preventing a subsequent recording medium A from being fed towards the recording medium supplying port 12 from the sorter 14, which achieves the automatic feeding, with the subsequent recording medium A located close to the precedent recording medium A.

Whereby, in the same manner as the third embodiment, as long as the recording medium A does not completely pass the given position (the position at which the detection sensor is disposed) on the conveying passage between the recording medium supplying port 12 and the first press bonding unit 40, the subsequent recording medium A cannot be supplied. Therefore, even if the feeding roller 16 is erroneously operated and the recording media A are being fed so as to have a precedent recording medium A kept close to a subsequent recording medium A, a space is securely provided between the precedent recording medium A and the subsequent recording medium A, the laminate material (laminate layer D) can be thermally press bonded completely to the entire area of each recording medium A from the leading edge through the tailing edge at the first press bonding unit 40 and the second press bonding unit 50, and the under film E can be thermally press bonded substantially completely to the laminate layer D between the precedent and subsequent recording media A, A. Whereby, a non-bonded area of the laminate layer D and the under film E near the boundary between the laminated portion Da and the non-laminated portion formed as surrounding each recording medium A can be minimized. Hence, when the under film E is separated from the base surface of the recording medium A at the separating unit 80, its pulling force can be applied intensively to the edge or its proximity of the recording medium A so that the edge of the laminate layer D of the laminated portion Da after the separation of the non-laminated portion Db can be finely finished.

Fifth Embodiment

Figure 18:
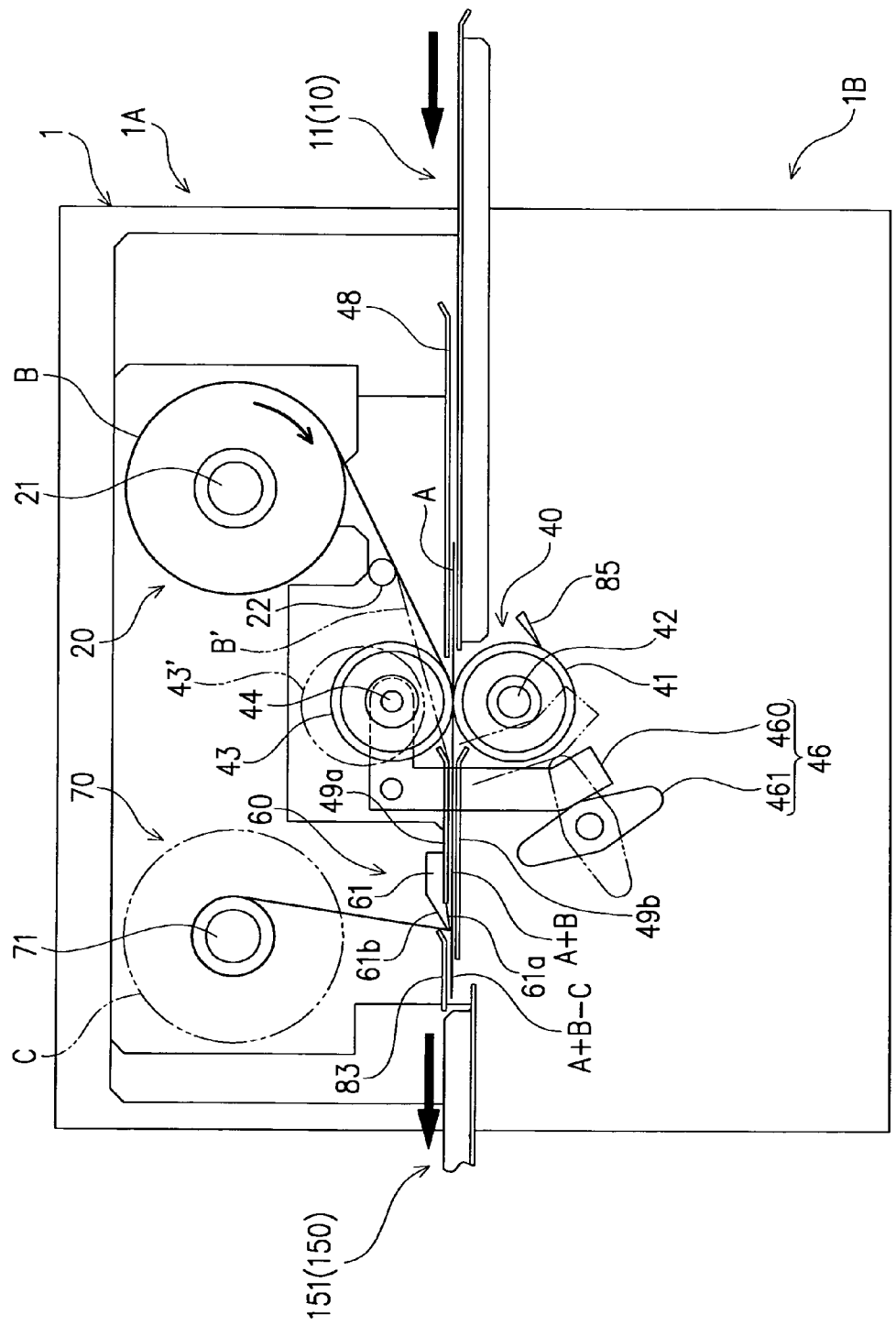
FIG. 18 is a side view of a laminating apparatus of a fifth embodiment.

A laminating apparatus of this embodiment is illustrated in FIG. 18. The laminating apparatus of this embodiment is different from the laminating apparatus of each of the first to fourth embodiments in that the under film supplying unit 30, the under film collecting unit 90 and the separating unit 80 are not provided, and alternative to the arrangement where the laminate layer D (laminate layer D which turns to be the non-laminated portion Db) protruding outwards from the peripheral edge of a recording medium A is adhered (transferred) onto the under film E while it covers the recording medium A, it is transferred onto the surface of a roller (a roller located on the side of the base surface of the recording medium A: the driving roller 41) of a press bonding unit 40 corresponding to the first press bonding unit 40 of each of the first to fourth embodiments, so that the press bonding unit 40 also functions as a separating unit for separating the laminated portion Da and the non-laminated portion Db from each other. The other structures are basically the same as those of the first to fourth embodiments so that the same description will be applied thereto or the same description of the first to fourth embodiments will be technically appreciated as the description for this embodiment, while the same reference codes as those of the first to fourth embodiments are allocated thereto, and the description for them will be omitted.

In the press bonding unit 40 of this embodiment, the width of the driving roller 41 and the width of the press contact roller 43 each are substantially equal to or lager than the width of the laminate material B. In the same manner as the first press bonding unit 40 of each of the first to fourth embodiments, upon the rotation of the driving roller 41, the laminate layer D is adhered onto the recording surface of the recording medium A, while the laminate layer D protruding outwards from the recording medium A is adhered onto the surface of the driving roller 41. The laminate material B is thermally press bonded to the recording medium A and the driving roller 41 so that the driving roller 41 functions as a transfer medium means. Upon the rotation of the driving roller 41, the laminate material B and the recording medium A, which were thermally press bonded to each other, are conveyed in press bonded state towards the downstream side (the finished product discharging unit 150). When the recording medium A and the laminate material B held in laminated state after being thermally press bonded pass a point at which the laminate material B is press bonded to the recording medium A by the driving roller 41 and the press contact roller 43, the driving roller 41 and the recording medium A are moved relative to each other so as to have the outer circumference of the driving roller 41 separated from the base surface of the recording medium A, in the downstream side of the aforesaid point.

Figure 19:
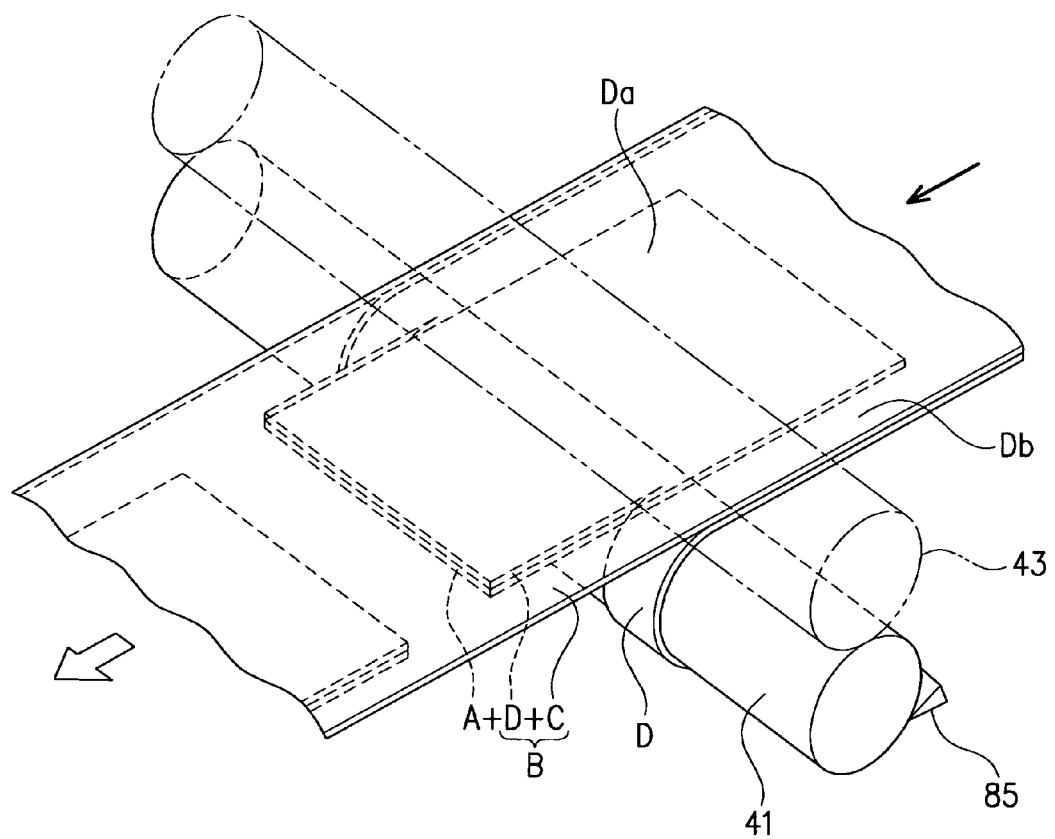
FIG. 19 illustrates a recording medium which is passing through a press bonding unit of the laminating apparatus of the fifth embodiment.

In this case, as illustrated in FIG. 19, at the time when the outer circumference of the driving roller 41 is separated from the base surface, a pulling force is caused along the boundary between the laminated portion Da having the laminate layer D adhered onto the recording surface of the recording medium A and the non-laminated portion Db having the laminate layer D, which protrudes outwards from the peripheral edge of the recording medium A and adheres onto the outer circumference of the driving roller 41, and hence the boundary between the laminated portion Da and the non-laminated portion is finely cut along the edge of the recording medium A in the same manner as the first to fourth embodiments. Therefore, in the laminating apparatus of this embodiment, the press bonding unit 40 is functioned as the separating unit 80 of each of the first to fourth embodiments by making the driving roller 41 function as a transfer medium means in place of the under film E.

When the driving roller 41 is rotated while having an excessive laminate layer D (laminate layer D of the non-laminated portion Db) adhered onto the outer circumference of the driving roller 41, the laminate layers D reaching the point, at which they are each press bonded, are adhered and stacked to each other. According to the laminating apparatus of this embodiment is equipped with a scraper (removing means) 85 that has a leading edge adapted to contact the outer circumference of the driving roller 41 at a given pressure so as to scrape the residue of the laminate layer D adhered onto the outer circumference of the driving roller 41, and is disposed on the upstream side of the point at which each laminate material B is press bonded to the recording medium A, so that a continuous lamination process of the recording media A can be achieved.

Referring back to FIG. 18, according to the laminating apparatus of this embodiment, as described above, the press bonding unit 40 functions in the same manner as the separating unit 80 of each of the first to fourth embodiments, and therefore a pair of guide plates 48, 11 (in this embodiment, the mounting plate 11 of the recording medium supplying unit 10 serves additionally as the guide plate on the downstream side) disposed opposite to each other in the vertical orientation with a given distance are provided on the upstream side of the press bonding unit 40 that functions as the separating unit 80 of each of the first to fourth embodiments, thereby preventing a tailing edge of a laminate from being lifted up or flapping at the time when the laminated portion Da is separated from the non-laminated portion Db, as described above. The laminating apparatus is further equipped with guide members (guide plates 49a, 49b) that are similar to a pair of the downstream guide plates 47a, 47b of the second embodiment and that are located downstream and adjacent to the press bonding unit 40 in such a manner as to correspond to the separation position and its proximal position when the press bonding unit 40 functions as the separating unit.

The laminating apparatus of this embodiment that has the above arrangement and carries out the lamination process is also characterized by that it can efficiently use the laminate material B by the function of the press contact and releasing mechanism 46, in the same manner as the laminating apparatus of the second embodiment. This characteristic feature will be hereinafter described by taking, for example, a case where only a single recording medium A is subjected to the lamination process.

When the recording medium supplied from the recording medium supplying unit 10 has passed through the press bonding unit 40, the press contact and releasing mechanism 46 is operated by the operator or the like to switch the pivotally moving position of the arm 460 from the first position to the second position. Accordingly, the first portion of the arm 460 is moved (moved upward in this embodiment), and the position of the press contact roller 43 that is rotatably supported by the first portion is also moved upward (reference code: 43'). Whereby, the press contact force caused between press contact roller 43 and the driving roller 41. Accordingly, until the laminated recording medium A is discharged to the finished product discharging unit 150 in the subsequent operation, the laminate material B in the amount fed out from the laminate material supplying unit 20 is not transferred onto the roller surface of the driving roller 41.

In the same manner as the second embodiment, the adjustment is made so as to prevent the press contact roller 43 from contacting the laminate material B when the press contact force is released. Therefore, the deterioration of the quality of the laminate layer by the influence of heat of the press contact roller 43 is prevented.

Then, when the laminated recording medium A is discharged to the finished product discharging unit 150, the laminate material B that has been fed out and left unlaminated is pulled back. In this operation, the holder 21 is rotated in a direction reverse to the feeding direction of the laminate material B (in a reverse direction), so that the laminate material B fed out and left unlaminated is pulled towards the upstream side along the conveying passage and then rolled up (rolled back) onto the holder 21.

The reverse rotation of the holder 21 may be made in the same manner as the second embodiment. That is, it may be made manually by the operator or the like, or by a driving force of a motor (driving source) (not shown) connected to the holder 21.

When the pulling back operation is finished, the press contact and releasing mechanism 46 is again operated by the operator or the like so as to switch the pivotally moving position of the arm 460 from the second position to the first position, thereby enabling the laminating operation for the next recording medium A.

In the same manner as the second embodiment, a detection means such as a sensor may be provided appropriately on the conveying passage, so that the above series of operations (switching from the first position to the second position, pulling back operation and switching from the second position to the first position) are partly or entirely carried out in automatic manner.

Sixth Embodiment

Figure 20:
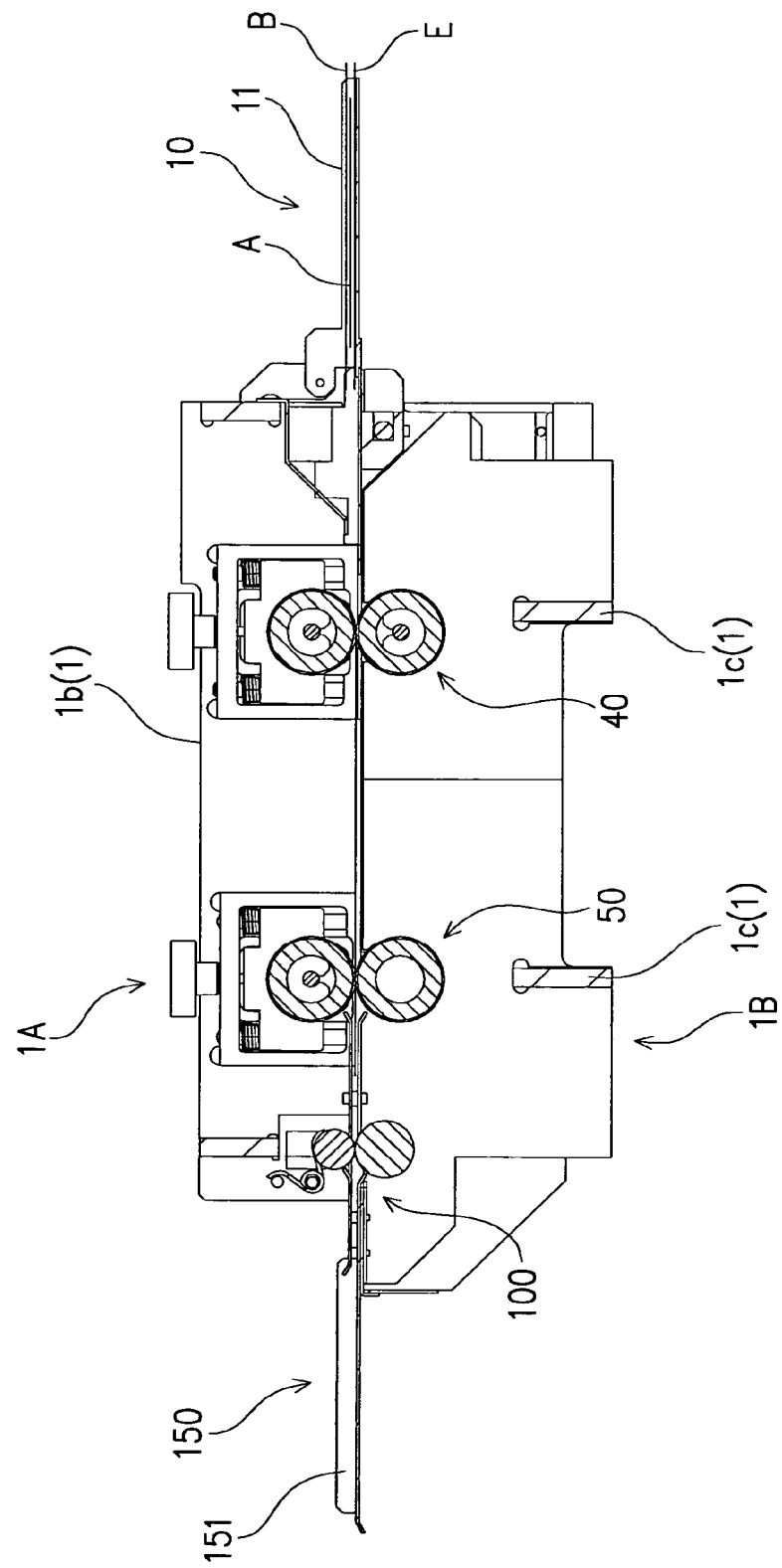
FIG. 20 is a side view of a laminating apparatus of a sixth embodiment.

A laminating apparatus of this embodiment is illustrated in FIG. 20. The laminating apparatus of this embodiment employs a film cut into sheets respectively for a laminate material and an under film. By the employment of the laminate material and the under film in the form of a sheet in this laminating apparatus, a difference relative to the laminating apparatus of the first embodiment lies in that the laminate material supplying unit 20, the under film supplying unit 30, the peeling-off unit 60, the substrate collecting unit 70, the separating unit 80 and the under film collecting unit 90 are not provided. The other structures (the structures of the first press bonding unit 40: press bonding unit, the second press bonding unit 50: press bonding unit, etc.) are basically the same as those of the first embodiment so that the same description will be applied thereto or the same description of the first embodiment will be technically appreciated as the description for this embodiment, while the same reference codes as those of the first embodiment are allocated thereto, and the description for them will be omitted.

According to the laminating apparatus of this embodiment, the laminate material B and the under film E each in the form of a sheet are previously overlapped manually by the operator to have the recording medium A interposed therebetween (a piece having the recording medium A sandwiched between the laminate material and the under film E), which is supplied from a supplying unit 10 corresponding to the recording medium supplying unit 10 of the first embodiment.

Whereby, when passing through the first press bonding unit 40, the laminate layer D of the laminate material B is thermally press bonded to the recording surface of the recording medium A and the under film E protruding outwards from the peripheral edge of the recording medium A, and thus turns to be a laminate. Then, the laminate is again thermally press bonded at the second press contacting unit 50, thereby substantially completely forcing out air interposed between the recording surface of the recording medium A and the laminate layer D. Thus, the adhesiveness between the recording surface and the laminate layer D is increased.

Then, the laminate, which has passed through the first press bonding unit 40 and the second press bonding unit 50, is discharged in the form of a sheet to the finished product discharging unit 150.

The laminating apparatus of this embodiment is, unlike the laminating apparatus of the first embodiment, not designed to remove the substrate C and the under film E within the apparatus, and therefore the substrate C and the under film E are manually peeled off and separated from the laminate discharged to the finished product discharging unit 150. The manually peeling off and separating of the substrate C and the under film E enables the user to peel off and separate the substrate C and the under film E at a timing desirable for the user. Therefore, until the substrate C and the like are peeled off, the laminate layer D can be protected by the substrate C so that it can be prevented from being unnecessarily scratched or damaged.

Figure 21:
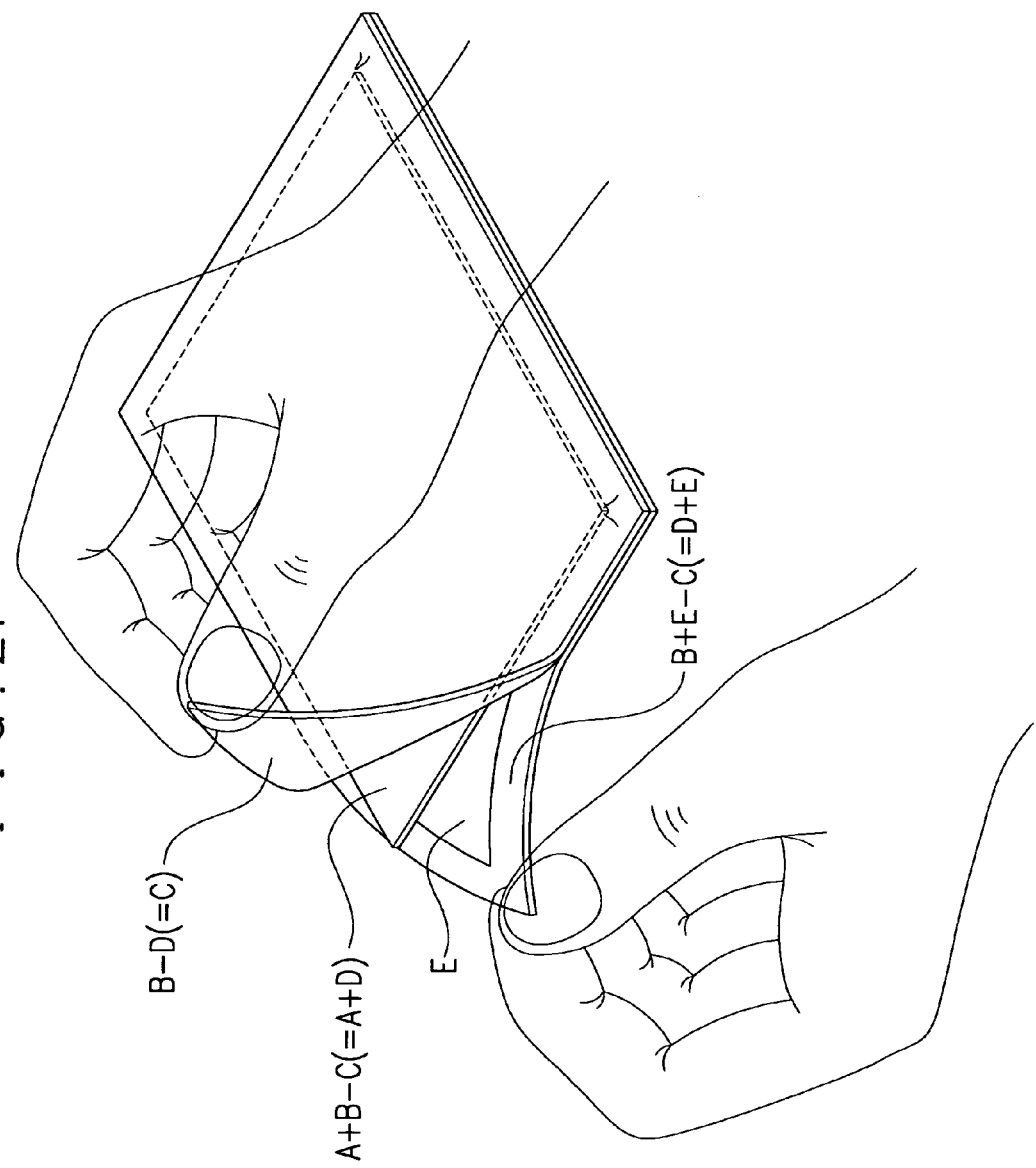
FIG. 21 illustrates an under film of a laminate processed by the laminating apparatus of the sixth embodiment, which is being manually peeled off from a laminate material.
Figure 22:
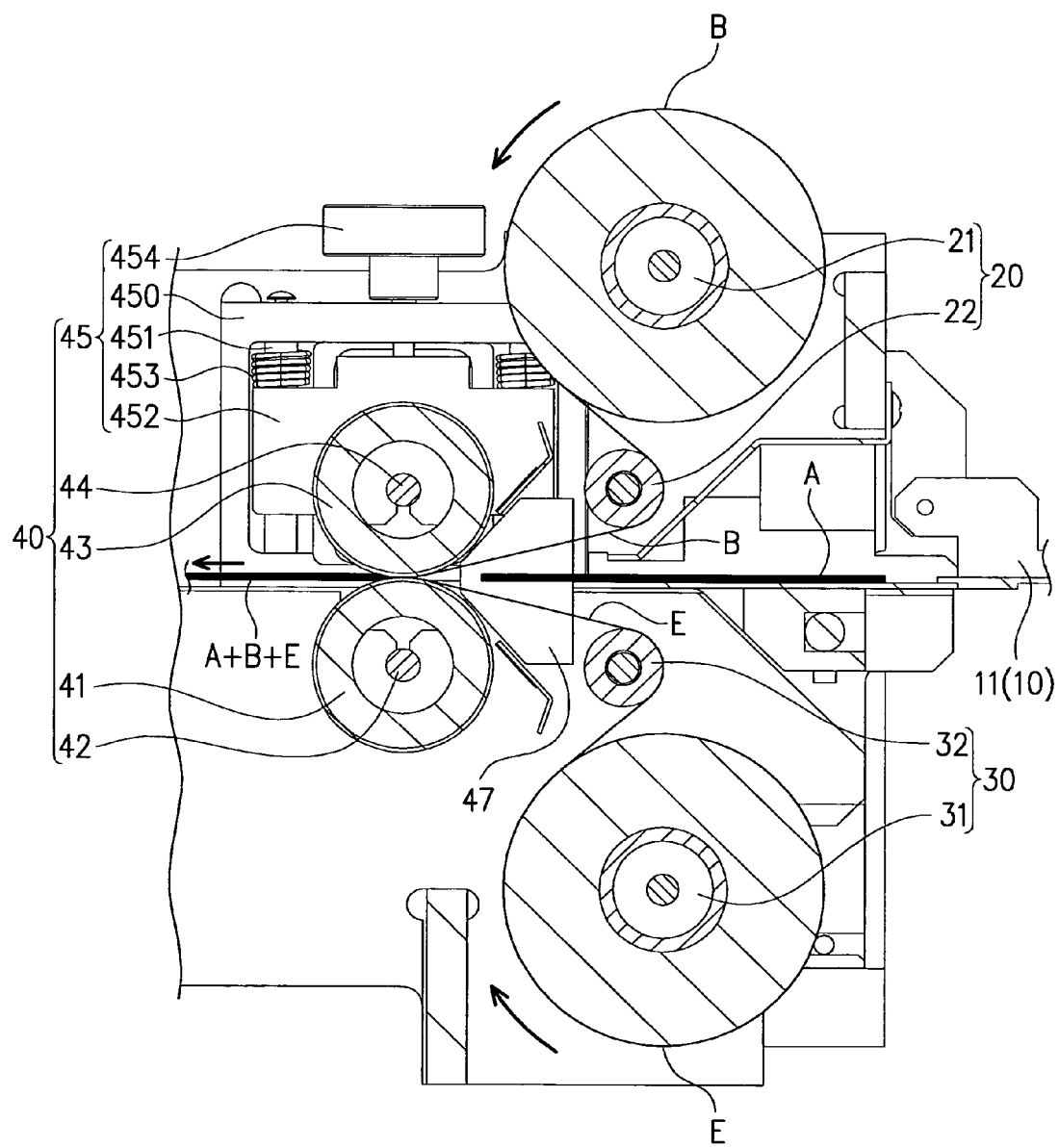
FIG. 22 is an enlarged side view of an essential portion in a first press bonding unit and its proximity, of a laminating apparatus corresponding to the first embodiment, in another embodiment (4).
Figure 23:
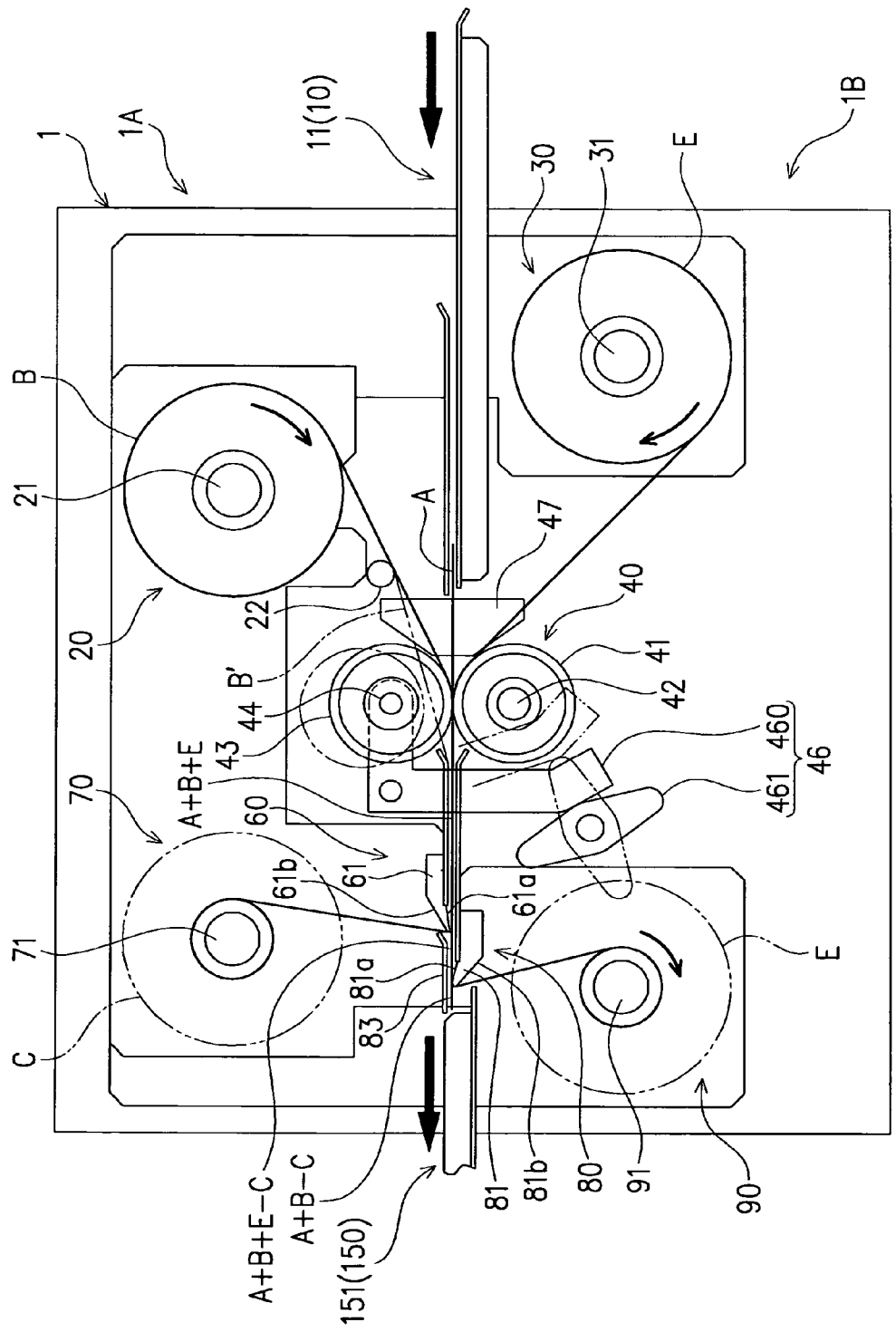
FIG. 23 is a side view of a laminating apparatus corresponding to the second embodiment, in the another embodiment (4).
Figure 24:
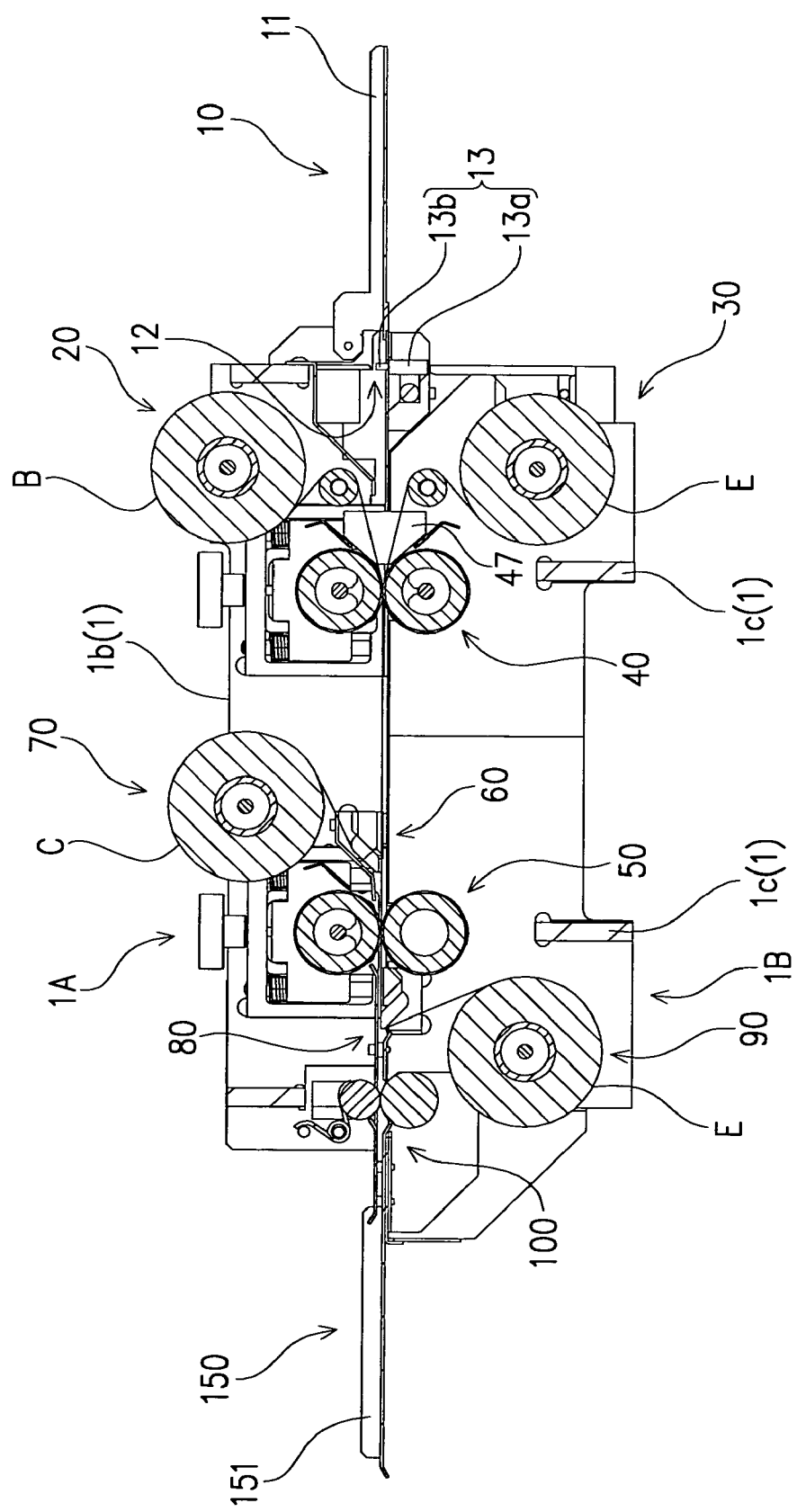
FIG. 24 is a side view of a laminating apparatus corresponding to the third embodiment, in the another embodiment (4).
Figure 25:
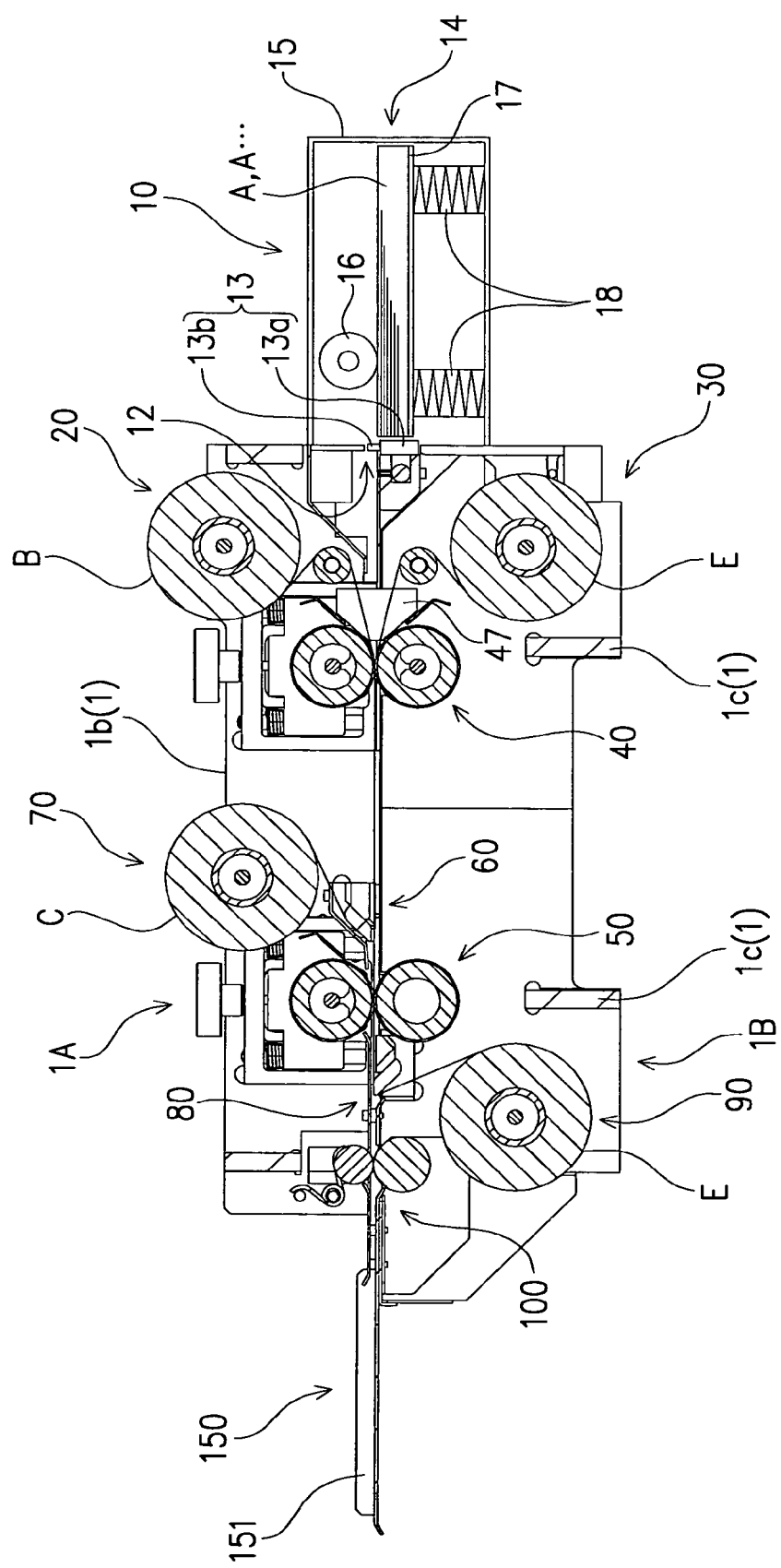
FIG. 25 is a side view of a laminating apparatus corresponding to the fourth embodiment, in the another embodiment (4).

When the under film E is to be separated, as illustrated in FIG. 21, the operator manually peels off the under film E from the laminate material B (pulls up the under film E), thereby producing the same effect as that of each of the first to fifth embodiments, and hence enabling separation of the laminated portion Da from the non-laminated portion Db. The substrate C is kept adhered to the laminate layer via its adhesiveness, and therefore it may be peeled off after removal of the under film E or previously peeled off before removal of the under film E.

As described above, since the laminating apparatus of this embodiment employs a film cut into sheets for each laminate material B and each under film E, the laminate material B, the recording medium A and the under film E can be easily overlapped to each other and supplied towards the press bonding unit (the first press bonding unit 40 and the second press bonding unit 50) by hand without the laminate material supplying unit 20, the under film supplying unit 30 and the like, and hence the laminating apparatus can be simplified in structure. Furthermore, according to the laminating apparatus of this embodiment, since the laminate material B, the recording medium A and the under film E are previously overlapped together by hand before being supplied to the laminating apparatus, the operator can previously check the laminated state of the laminate material B, the recording medium A and the under film E, so that it is possible to securely prevent thermally press bonding of a laminate having the recording medium A protruding outwards from the laminate material B or the under film E. Thus, the lamination process can be securely carried out.

Other Embodiments

The present invention is not necessarily limited to any one of the above embodiments and may be subjected to various modifications without departing from the scope of the present invention.

(1) In any one of the above embodiments, an object to which the lamination process is applied is a recording medium A recorded thereon mainly in an ink jet recording system. Other recording medium recorded not only in a thermal transfer recording system but also other print recording system may be subjected, or a recording medium comprising a silver salt photograph may be subjected.

(2) In any one of the above embodiments, the conveying is carried out with the recording surface of each recording medium A facing upward, but it may be carried out with the surface facing downward, or the conveying may be carried out with an arrangement allowing the recording medium A to be moved in a vertical direction. However, given the arrangement provided with the press contact and releasing mechanism 46 as described such as in the second embodiment and the third embodiment, it is preferable to dispose the press contact roller on the side of the recording surface of the recording medium and dispose the driving roller on the side of the base surface of the recording medium.

(3) In any one of the above embodiments, the laminate material B with the substrate C attached thereto is used because of the excellent handling ability. However, the substrate is not essential in the present invention and in this case, the substrate collecting unit 70 is not necessarily provided.

(4) In any one of the above embodiments, a lengthy laminate material B larger than the width of the recording medium A is used so as to protrude over the longitudinal and lateral edges of the recording medium A, but a lengthy laminate material B having a width equal to the width of the recording medium A (the length in a direction orthogonal to the conveying direction of the recording medium A (the pulling out direction of the laminate material B)) may be used. In this case, the recording media A are successively supplied so as to have a given distance between the preceding recording medium A and the subsequent recording medium A, and the recording medium A, the laminate material (continuous sheet) and the under film E are conveyed on the conveying passage as being guided by a width limiting guide, so that the recording surface of each recording medium A can be entirely covered and laminated with the laminate material B and the amount of the laminate material to be consumed can be reduced. Even in this arrangement, the laminated portion Da and the non-laminated portion Db are separated along the leading edge and tailing edge, of the recording medium A in the moving direction in the same manner as in any one of the above embodiments by separating the under film E from the recording medium A.

Specifically, as illustrated in FIGS. 22 to 25, disposed upstream of the first press bonding unit 40 is a width limiting guide 47 that limits the movement of the recording medium A, the laminate material B and the under film E respectively supplied from the recording medium supplying unit 10, the laminate material supplying unit 20 and the under film supplying unit 30, in a second direction (width direction) orthogonal to the feeding direction (first direction).

The width limiting guide 47 is made up of a pair of guide plates facing each other with a distance. The pair of guide plates 47 are designed to be capable of moving towards and away from each other and is capable of appropriately changing the distance therebetween so as to correspond to the size of each of the laminate material B, the recording medium A and the under film E respectively supplied from the recording medium supplying unit 10, the laminate material supplying unit 20 and the under film supplying unit 30.

Accordingly, as the recording medium A is being guided through its opposite edges of the second direction by the width limiting guide 47 (pair of guide plates), it is moved towards the first press bonding unit 40, and the recording medium A is brought into a position in which it is interposed between the laminate material B and the under film E with the recording surface facing the laminate layer D, each of the laminate material B and the under film E being supplied as each is guided through its opposite edges by the width limiting guide 47 (pair of guide plates). Then, when the laminate material B, the under film E and the recording medium A interposed therebetween reach the first press bonding unit 40, the laminate material B, the recording medium A and the under film E are subsequently thermally press bonded as they are conveyed in the conveying direction. Since the length of each of the laminate material B and the under film E in the first direction (conveying direction) is longer than the length of the recording medium A in the first direction (conveying direction), and the length of each of the laminate material B and the under film E in the second direction (width direction) is substantially equal to the length of the recording medium in the second direction (width direction), the laminate layer D is softened and deformed to cover the recording surface of the recording medium A and the opposite edges of the same in the second direction.

Accordingly, as illustrated in FIG. 26(A), while plural recording media A with a given distance from each other in the first direction (conveying direction) have opposite edges in the second direction matched to the opposite edges of each of the laminate material B and the under film E in the width direction thereof, they are held between the laminate material B and the under film E, thus alternately forming the laminated portion Da having the laminate layer D adhered onto the recording surface of the recording medium A and the non-laminated portion Db having the laminate layer D adhered onto the under film E.

That is, the recording media A are successively supplied so as to have a given distance between a precedent recording medium A and a subsequent recording medium A, and the laminate material B, the recording medium A and the under film E are consecutively thermally press bonded to each other (the laminate material B, the recording medium A and the under film E pass through the first press bonding unit 40). Accordingly, as illustrated in FIG. 26(B) (sectional view taken along a line I-I in FIG. 26(A)), in the width direction of the laminate material B, the opposite edges of the recording medium A in the second direction are substantially matched to the opposite edges of each of the laminate material B and the under film E in the width direction, and only the laminated portion Da having the laminate layer D adhered onto the recording surface of the recording medium A is formed. Whilst, in the first direction (conveying direction) of the laminate material B, as illustrated in FIG. 26(C) (sectional view taken along a line II-II in FIG. 26(A)), there is provided a laminate (A+B+E, B+E) having the laminated portion Da and the non-laminated portion Db alternately formed in the conveying direction (first direction), in which the laminated portion Da has the recording medium A, the laminate material B and the under film E laminated to each other, and the non-laminated portion Db has the laminate material B laminated to the under film E. The distance (supplying interval) between a precedent recording medium A and a subsequent recording medium A is set to allow the laminate layer D transferred onto the under film E to have a transfer width Db of about 3 mm or larger. When the transfer width Db of the laminate layer D is smaller than this value, the bonded area between the under film E and the laminate layer D is small and hence the bonding force is poor. Thus, the under film E may be peeled off from the laminate layer D, which leads to the possibility that a portion (laminated portion) Da having the laminate layer D press bonded to the recording surface is not finely cut away from a portion (non-laminated portion) Db having the laminate layer D press bonded to the under film E.

Figure 27:
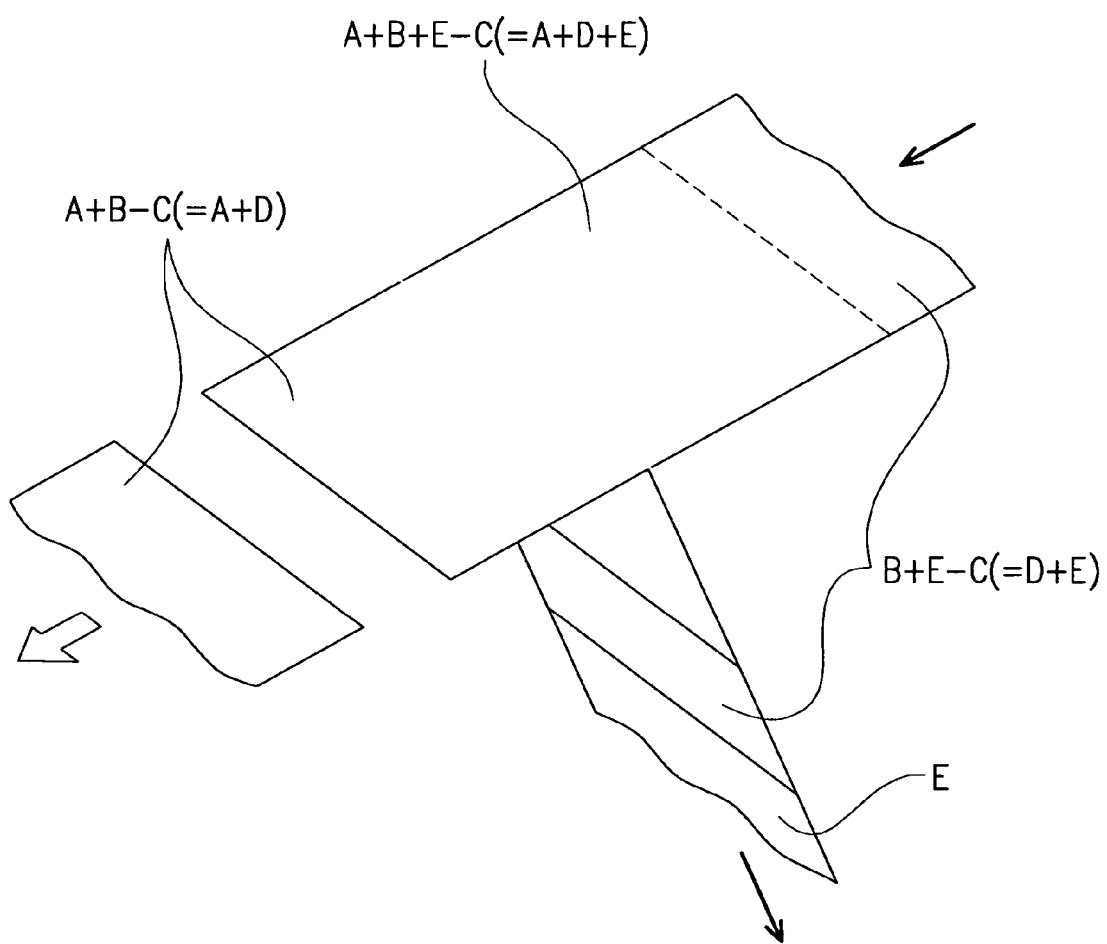
FIG. 27 illustrates an under film which is being separated from a recording medium at a separating unit of the laminating apparatus of the another embodiment (4).

Then, the under film E is rolled up onto the holder 91 of the under film collecting unit 90 at the separating unit 80. At this time, as illustrated in FIG. 27, the recording medium A and the under film E are moved relative to each other so as to have the base surface of the recording medium A separated away from the under film E. That is, while the recording medium A is moving between the guide plates 83, 84 (conveying passage) towards the downstream side, the under film E is pulled in a direction different from the moving direction of the recording medium A (in a direction away from the base surface of the recording medium A). Because of this, the laminate layer D of the non-laminated portion Db with the substrate C peeled off therefrom is moving in the same direction as that of the under film E so that a pulling force is applied intensively to the boundary between a portion having a recording medium A and a portion having no recording medium A (i.e., the boundary between the non-laminated portion Db and the laminated portion Da). Accordingly, only the non-laminated portion Db is cut away and the edge of the laminated portion Da is finely finished along the edge of the recording medium A.

Figure 28:
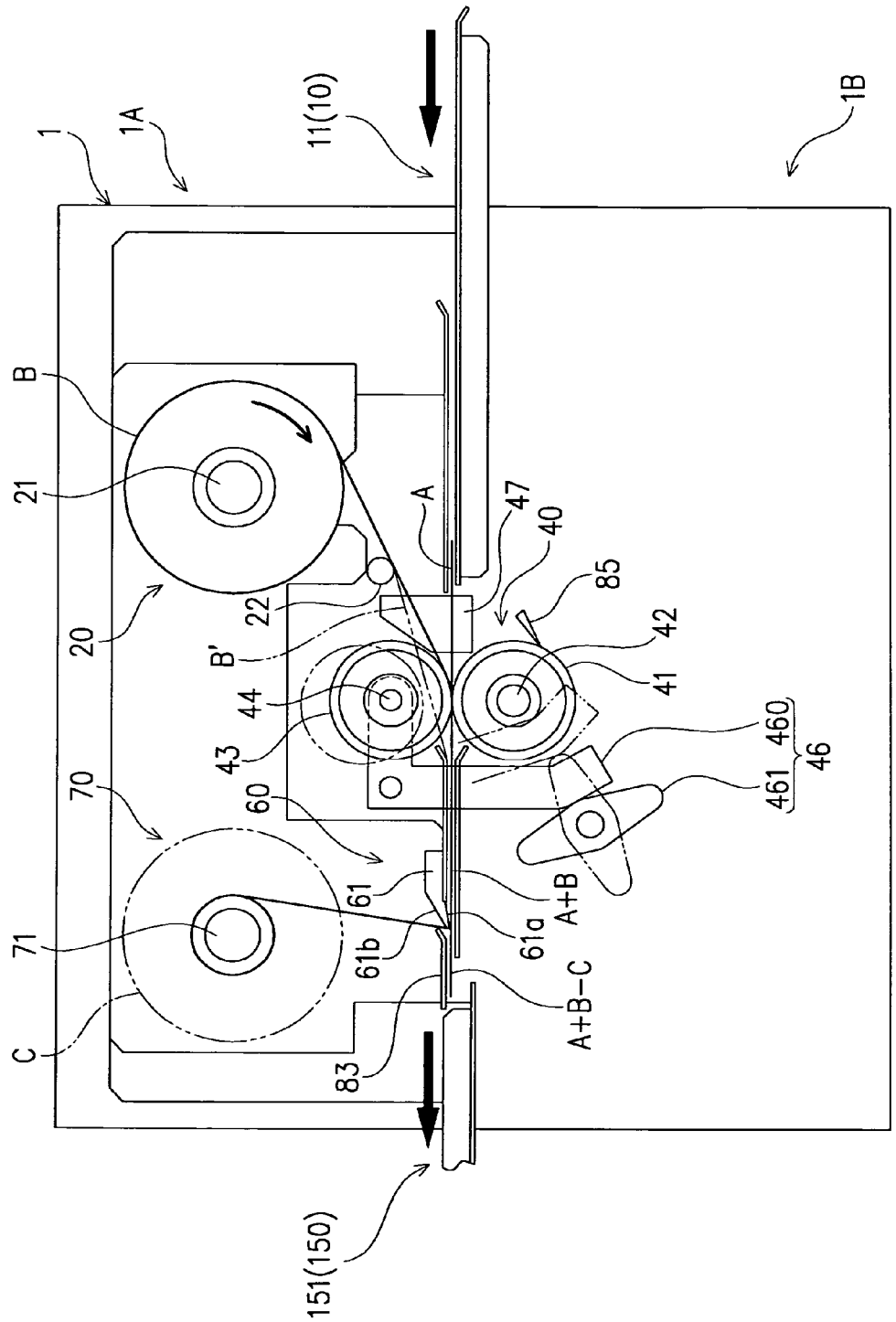
FIG. 28 is a side view of a laminating apparatus corresponding to the fifth embodiment, in the another embodiment (4).

According to the arrangement with the width limiting guide 47 provided to the laminating apparatus of the fifth embodiment as illustrated in FIG. 28, when the outer circumference of the driving roller 41 is separated from the base surface, as illustrated in FIG. 29, a pulling force is caused along the boundary between the laminated portion Da having the laminate layer D adhered onto the recording surface of the recording medium A and the non-laminated portion Db having the laminate layer D which protrudes outwards from the periphery of the recording medium A and is adhered onto the outer circumference of the driving roller 41, so that the boundary between the laminated portion Da and the non-laminated portion Db is also cut finely along the edge of the recording medium A.

Figure 30:
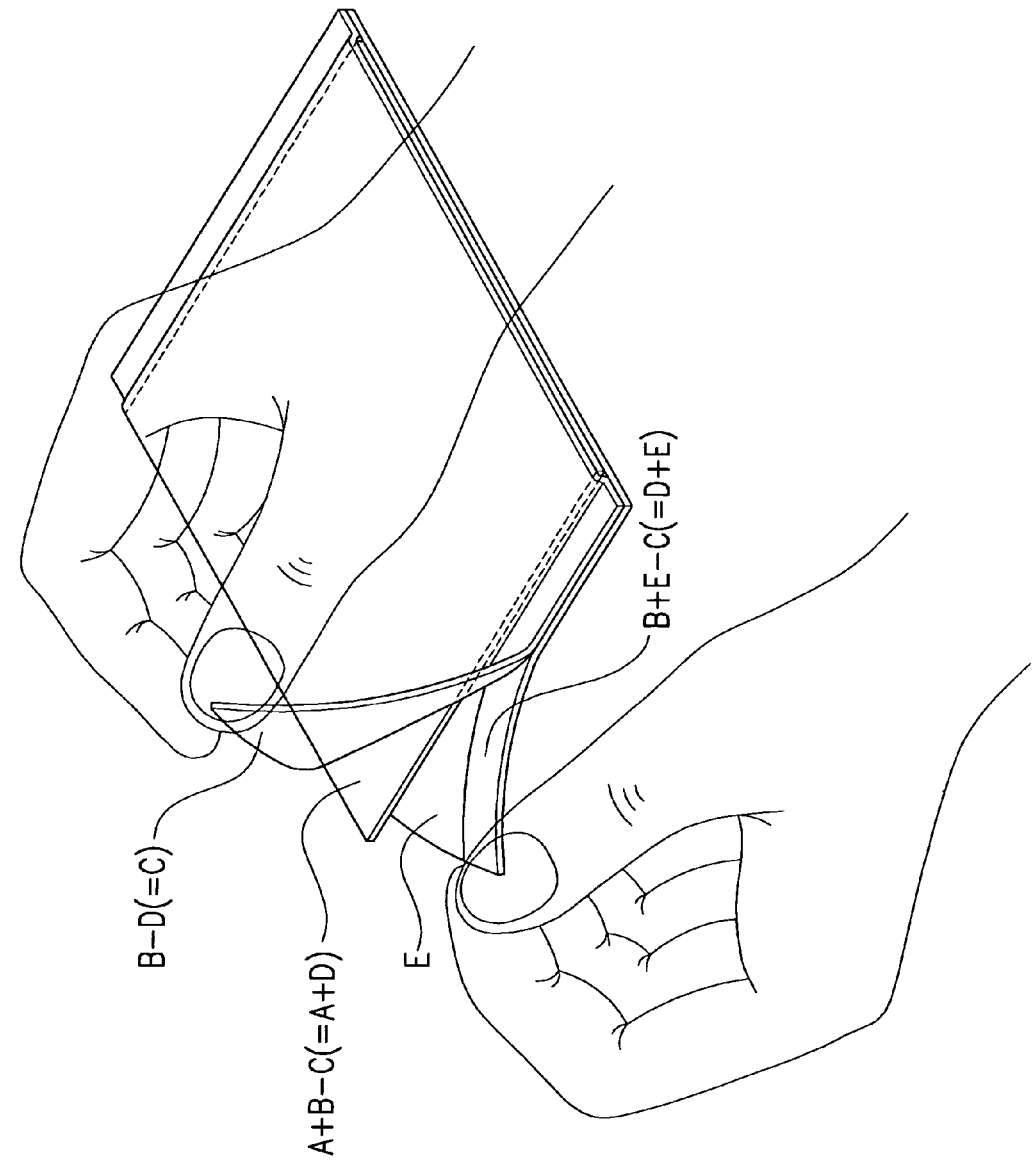
FIG. 30 illustrates an under film of a laminate processed by the laminating apparatus of the another embodiment (4), which is being manually peeled off from a laminate material.

Further, according to the laminating apparatus of the sixth embodiment, as illustrated in FIG. 30, the same effect can be produced by manually peeling off the under film E from the laminate material B by the operator (by pulling up the under film E), thereby enabling cutting of the laminated portion Da away from the non-laminated portion Db.

The width limiting guide 47 is not necessarily provided. That is, the recording medium A itself generally has a stiffness, and therefore in a case where the laminate material B has the substrate C, a stiffness can be given to the laminate material B. Therefore, as long as there are provided sufficient accuracies (conveying directionality) in supplying of the recording medium A at the recording medium supplying unit 10 and supplying of the laminate material B at the laminate material supplying unit 20, it is possible to supply the recording medium A and the laminate material B to the press bonding unit 40 while matching the opposite edges of the recording medium A in the second end respectively to the opposite edges of the laminate material B in the second direction, even without providing the width limiting guide 47. However, it is preferable to provide the width limiting guide 47 in order to achieve a secured laminating operation in a continuous manner.

(5) In any one of the above embodiments, a lengthy laminate material B having a width larger than the recording medium A is used, plural recording media A are successively supplied so as to have a given distance between a preceding recording medium A and a subsequent recording medium A, and the laminate material B (laminate layer D) is sized to protrude outwards from the longitudinal and lateral edges (peripheral edge) of each recording medium A. In this respect, for example, it is possible to use a lengthy laminate material B having a width larger than the recording medium A and successively supply plural recording media A to have the preceding recording medium A positioned close to the subsequent recording medium A. Even in this case, it is possible to achieve lamination with the laminate material B covering entirely the recording surface of the recording medium A, and limit the unnecessary consumption of the laminate material B. In this case, it is possible to cut the laminated portion Da away from the non-laminated portion Db along the boundary, namely the edge of the recording medium A extending in the moving direction thereof, in the same manner as any one of the above embodiments, by moving the under film E away from the recording medium A. However, since the laminate layer D is not press bonded to the under film E between the preceding recording medium A and the subsequent recording medium A, the preceding recording medium A is kept connected to the subsequent recording medium A via the laminate layer D. This laminate layer D, which connects the adjacent recording media A, is ruptured by moving these recording media A away from each other, thereby enabling separation into the individual recording media A.

Figure 31:
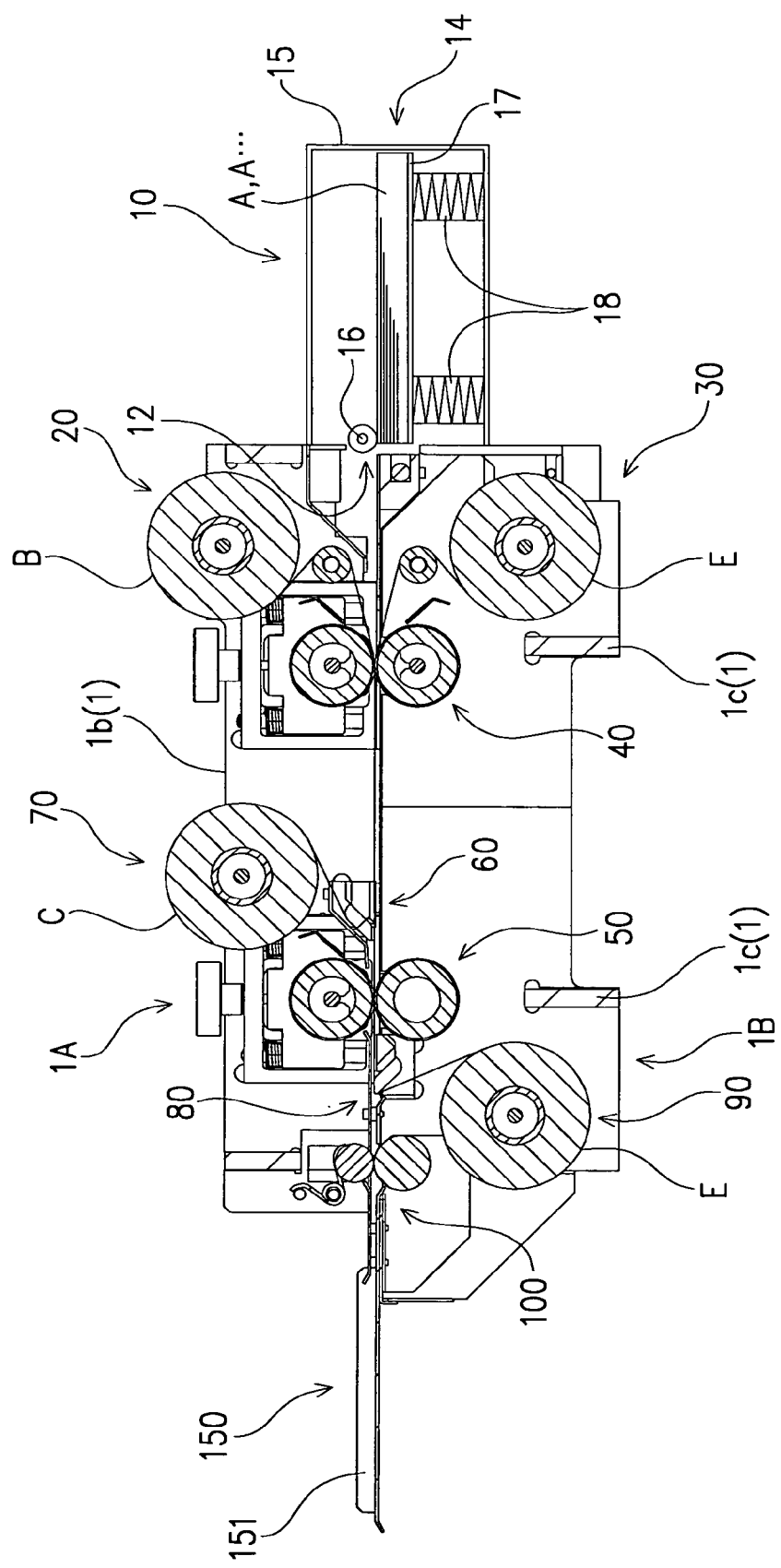
FIG. 31 is a side view of a laminating apparatus corresponding to the first embodiment, in another embodiment (5).
Figure 32:
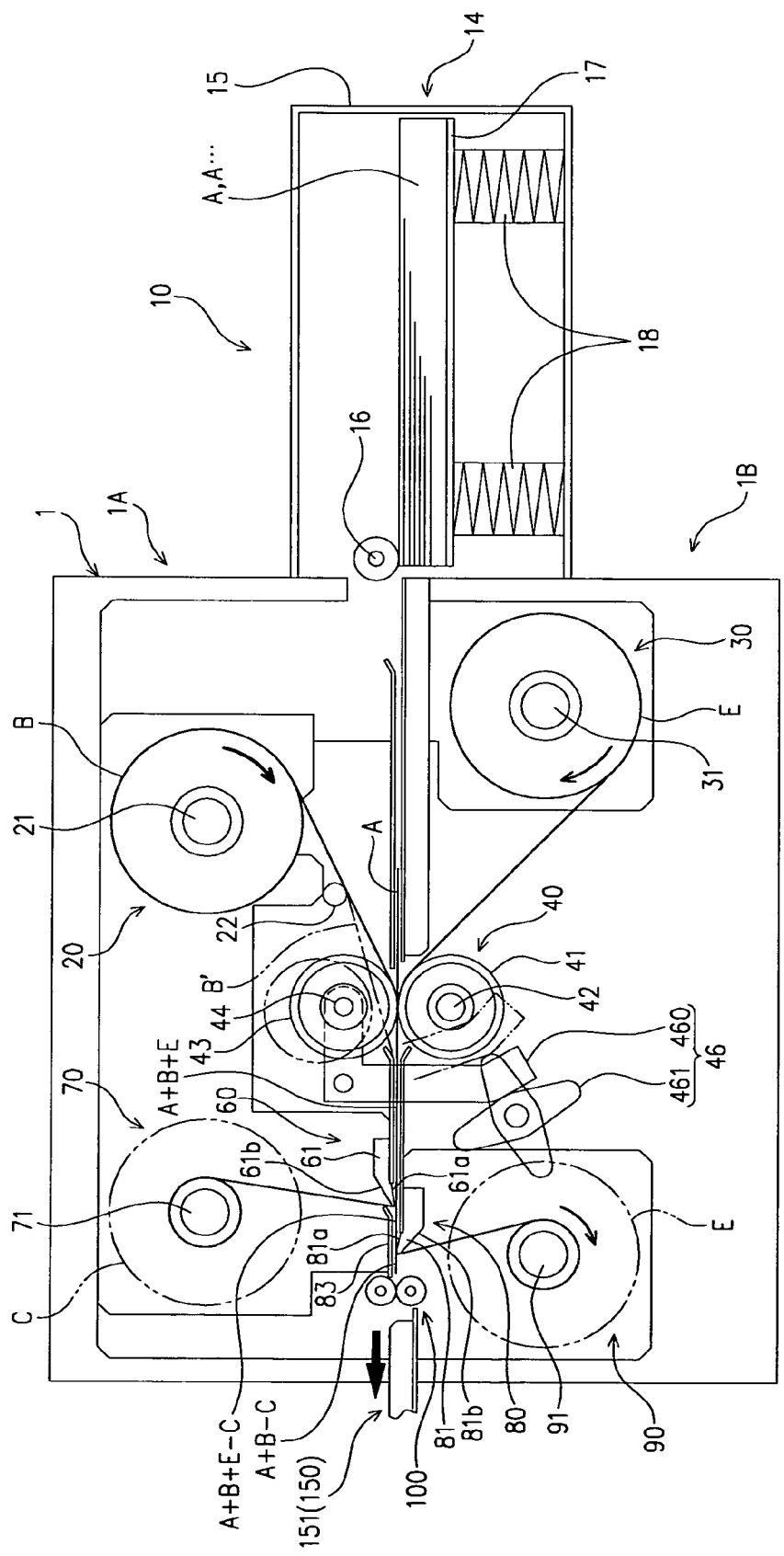
FIG. 32 is a side view of a laminating apparatus corresponding to the second embodiment, in the another embodiment (5).

Specifically, as illustrated in FIGS. 31 to 32, the recording medium supplying unit 10 is equipped with a sorter 14 interconnected to the outer wall of the lower housing part 1B on one side of the housing 1. The sorter 14 is made up of an accommodation part 15 for accommodating a stack of plural recording media A, A . . . , and a feeding roller 16 for feeding an uppermost recording medium A of the stack of the recording media A, A . . . , accommodated in the accommodation part towards the recording medium supplying port 12 one by one.

The accommodation part 15 is formed into a box-like shape and has a wall part interconnected to the lower housing part 1B and having a slit-like opening corresponding to the recording medium supplying port 12. Inside of the accommodation part 15 is mounted a mounting plate 17 that is vertically moveable for mounting the recording media A, and an urging means 18 (coil springs in this embodiment) interposed between the bottom of the accommodation part 15 and the mounting plate 17 for urging the mounting plate 17 to the upper side within the accommodation part 15.

The feeding roller 16 is disposed so as to press contact an uppermost recording medium A of the recording media A, A . . . , mounted on the mounting plate 17 by an urging force of the urging means 18 to the mounting plate 17, and allows an uppermost recording medium A to be positioned corresponding to the slit of the accommodation part 15 (recording medium supplying port 12). That is, the feeding roller 16 is disposed so as to prevent the uppermost recording medium A from being displaced from the position, at which the slit (recording medium supplying port 12) is formed, by an urging force of the urging means 18. The feeding roller 16 is disposed so as to have a press contacting point located along a substantially end portion of a supplying side (on the side of the housing 1) of an uppermost recording medium A, and is designed to be constantly rotated so as to feed out the recording media A substantially without a distance between a preceding recording medium A and a subsequent recording medium A. Upon this rotation, the sorter 14 is to feed out only the uppermost recording medium A towards the recording medium supplying port 12 by the friction between the recording surface near the edge of the recording medium A and the outer circumference of the feeding roller 16. The recording medium A which has been fed out reaches a later described first press bonding unit 40 before the subsequent recording medium A is fed out, and the first press bonding unit 40 conveys the recording medium A at substantially the same speed as the feeding speed of the sorter 14 to the downstream step. Thus, it is possible to successively supply the recording media A substantially without a distance therebetween. It is preferable to provide a pair of width limiting guides, which are moved towards and away from each other in the width direction, on the mounting plate 17, thereby enabling centering each recording medium A with respect to the width direction, irrespective of the width of each recording medium A.

Accordingly, a stack of recording media A, A . . . , to be processed in one operation are stored in the accommodation part 15 of the sorter 14. In this state, the recording surface of each recording medium A is oriented to face the side on which the laminate material B is supplied (herein, the upper side corresponding the arrangement of the laminate material supplying unit 20).

Under the above state, the recording media A are successively supplied from the recording medium supplying unit 10 (sorter 14). That is, the laminating apparatus is designed to be capable of successively carrying out lamination processes for plural recording media A and therefore successively supply these recording media A from the recording medium supplying unit 10 (sorter 14) substantially without a distance between a preceding recording medium A and a subsequent recording medium A, as described above. Accordingly, the recording media A successively supplied are each held between the laminate material B and the under film E with the recording surface facing the laminate layer D, and the laminate material B, the recording medium A and the under film E are thermally press bonded to each other at the first press bonding unit 40. Thus, the laminate material B is supplied to protrude outwards from the opposite lateral edges of the recording medium A in a direction orthogonal to the conveying direction of the recording medium A (width direction), and therefore when thermally press bonded at the first press bonding unit 40, the laminate layer D is softened and deformed to cover the recording surface of the recording medium and the opposite lateral edges.

Accordingly, as described above, since the laminate material B and the under film E each are sized to be larger than the recording medium A, the recording medium A is held between the laminate material B and the under film E, and the laminate layer D protruding from the recording medium A is transferred onto the under film E, as illustrated in FIG. 33(A), so that there are formed the laminated portion Da having the laminate layer D adhered onto the recording surface of the recording medium A and the non-laminated portion Db having the laminate layer D adhered onto the under film E in such a manner as to allow the non-laminated portion Db formed on the opposite lateral sides of the recording medium A.

Specifically, as illustrated in FIG. 33(B), when the laminate material B, the recording medium A and the under film E are thermally press bonded at the first press bonding unit 40 (when the laminate material B, the recording medium A and the under film E, all three pass through the first press bonding unit 40), a laminate (A+B+E, B+E) with the laminated portion Da having the recording medium A, the laminate material B and the under film E laminated together and the non-laminated portion Db having the laminate material B and the under film E laminated together is produced. The transfer width Db of the laminate layer D transferred onto the under film E is set to be about 3 mm or larger. When the transfer width is smaller than this value, the bonded area between the under film E and the laminate layer D is small and hence an adhesive force is poor. Thus, the under film E may be peeled off from the laminate layer D, which leads to the possibility that a portion (laminated portion) Da having the laminate layer D press bonded to the recording surface is not finely cut away from a portion (non-laminated portion) Db having the laminate layer D press bonded to the under film E.

Figure 34:
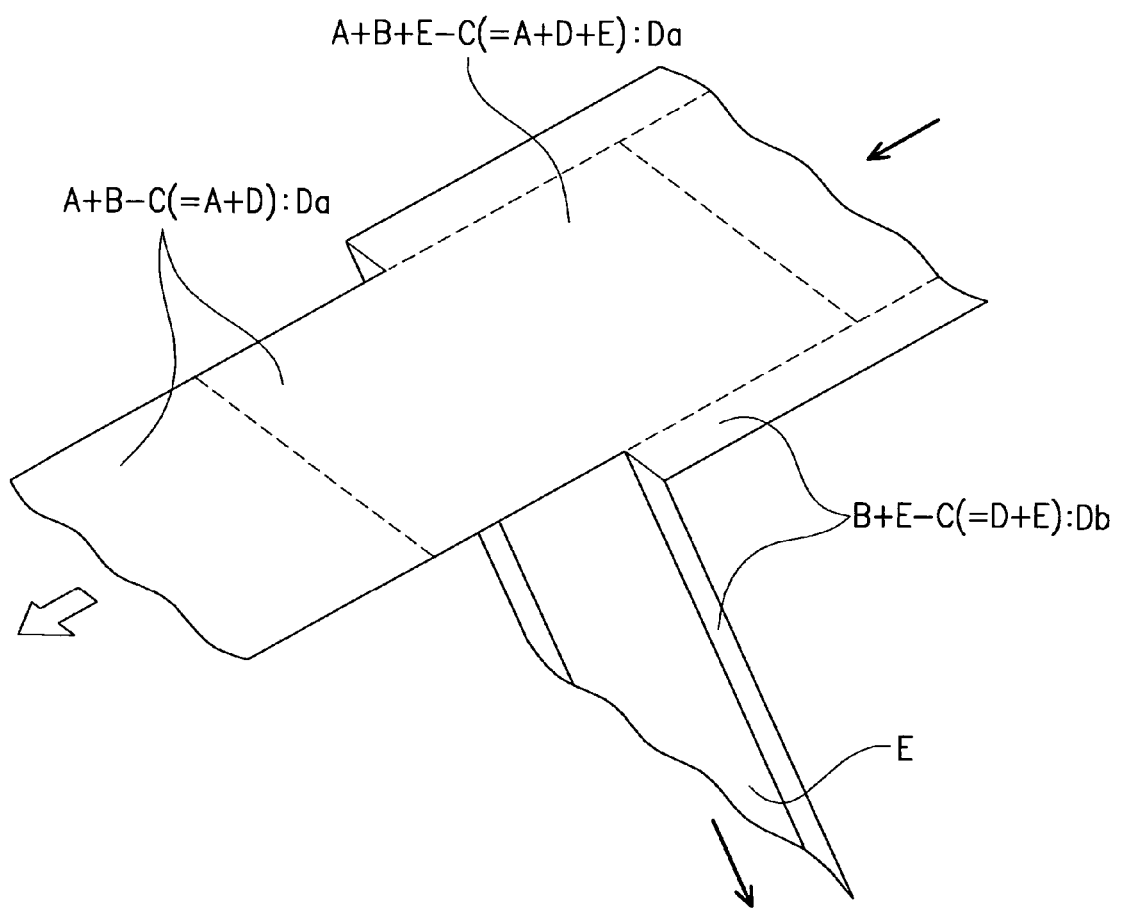
FIG. 34 illustrates an under film which is being separated from a recording medium at a separating unit of the laminating apparatus of the another embodiment (5).

Then, the under film E is rolled up onto the holder 91 of the under film collecting unit 90 at the separating unit 80. At this time, as illustrated in FIG. 34, the recording medium A and the under film E are moved relative to each other so as to have the base surface of the recording medium A separated away from the under film E. That is, while the recording medium A is moving between the guide plates 83, 84 (conveying passage) towards the downstream side, the under film E is pulled in a direction different from the moving direction of the recording medium A (in a direction away from the base surface of the recording medium A). Because of this, the laminate layer D of the non-laminated portion Db with the substrate C peeled off therefrom is moving in the same direction as that of the under film E so that a pulling force acts intensively to a boundary between a portion having a recording medium A and a portion having no recording medium A (i.e., boundary between the non-laminated portion Db and the laminated portion Da). Accordingly, only the non-laminated portion Db is cut away and the edges of the laminated portion Da in the width direction are finely finished along the edges of the recording medium A in the width direction.

Meanwhile, after the separating step at the separating unit 80, the precedent and subsequent laminates, which are kept connected to each other via the laminate layer, are separated from each other by being conveyed with a press contact force applied by the conveying roller members 100. The reason for it will be explained. The conveying roller members 100 are conveying laminates at a speed higher than the conveying speed of the upstream side thereof, there is caused a pulling force between a precedent laminate and a subsequent laminate due to the difference in the conveying speed. This pulling force acts intensively to the laminate layer (along a substantially linear area) of a connection portion between the precedent and subsequent laminates. As a result, the laminate layer of this connection portion is ruptured along the edge of the recording medium A and therefore the precedent and subsequent laminates are separated from each other.

Figure 35:
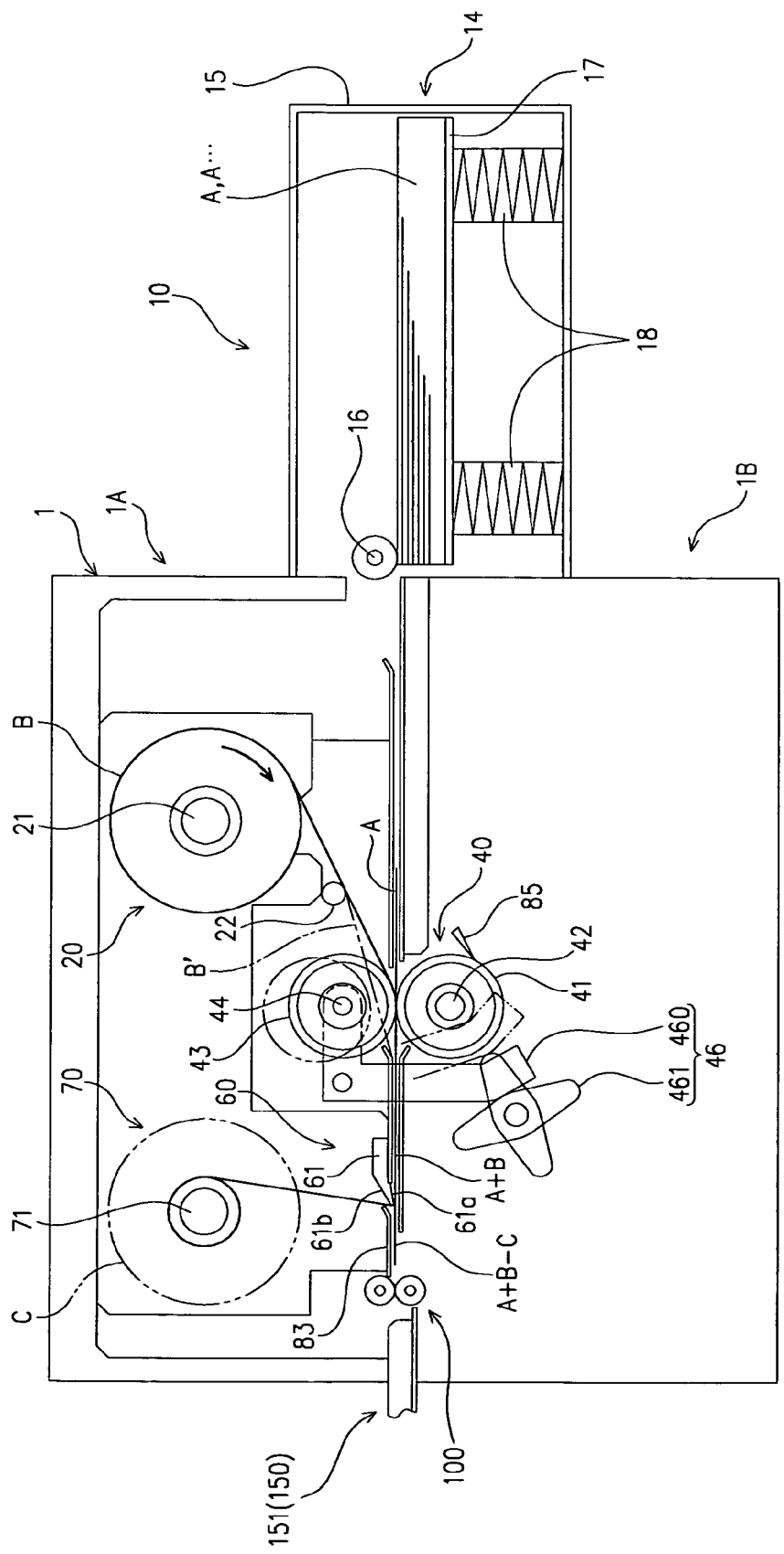
FIG. 35 is a side view of a laminating apparatus corresponding to the fifth embodiment, in the another embodiment (5).
Figure 36:
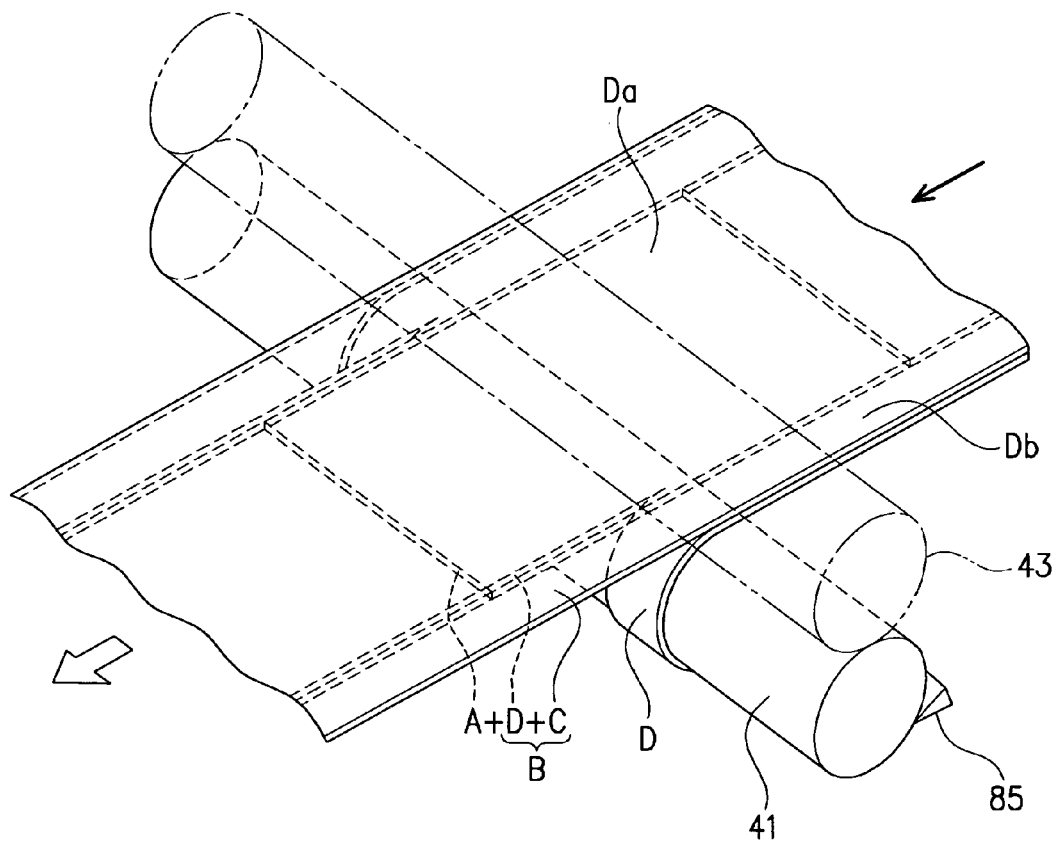
FIG. 36 illustrates a recording medium which is passing through a press bonding unit of the laminating apparatus of the another embodiment (5).

According to the arrangement with the sorter 14 provided to the laminating apparatus of the fifth embodiment as illustrated in FIG. 35, when the outer circumference of the driving roller 41 is separated from the base surface, as illustrated in FIG. 36, a pulling force is caused along the boundary between the laminated portion Da having the laminate layer D adhered onto the recording surface of the recording medium A and the non-laminated portion Db having the laminate layer D which protrudes outwards from the opposite edges of the recording medium A in the width direction and is adhered onto the outer circumference of the driving roller 41, so that the boundary between the laminated portion Da and the non-laminated portion Db is also cut finely along the edge of the recording medium A.

Figure 37:
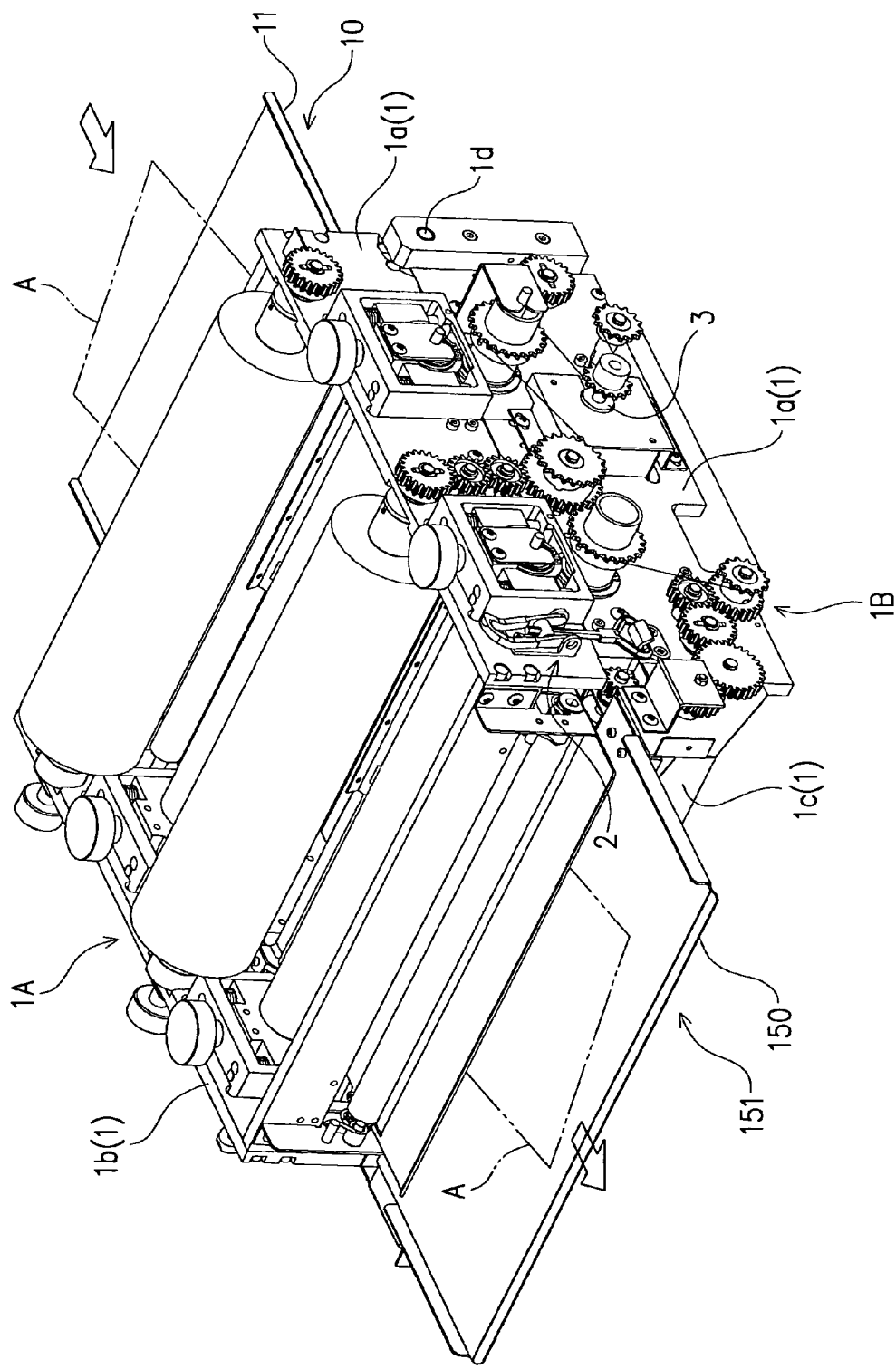
FIG. 37 is a perspective view of a laminating apparatus of another embodiment (6).

(6) In any one of the above embodiments, the recording media A are supplied in a direction parallel to the conveying direction. The recording media A may be supplied while being obliquely oriented. As illustrated in FIG. 37, when the recording media A are supplied, they are set obliquely to the conveying direction. Since the laminate material B is lengthy, and therefore the size in the first direction (moving direction in the conveying passage) is not necessarily taken into account in a case where the laminate material B covers each recording medium A while protruding outwards from the longitudinal and lateral edges of the recording medium A, and the width (the size in a direction orthogonal to the moving direction in the conveying passage) of the laminate material B is set to be larger than the maximum size, in the width direction with respect to the conveying direction, of the recording media A obliquely set on the conveying passage. Therefore, even if a recording medium A is set at the recording medium supplying unit 10 with an angle slightly displaced from a predetermined oblique angle and conveyed while being kept at that angle, the recording medium A is unlikely to protrude from the laminate material B in the width direction, and the recording medium A can be entirely and securely covered by the recording medium A (laminate layer D).

Accordingly, as described above, since the laminate material B and the under film E each are sized to be larger than the recording medium A, the recording medium A is held between the laminate material B and the under film E, and the laminate layer D protruding from the recording medium A is transferred onto the under film E, as illustrated in FIG. 38(A), so that there are formed the laminated portion Da having the laminate layer D adhered onto the recording surface of the recording medium A and the non-laminated portion Db having the laminate layer D adhered onto the under film E in such a manner as to allow the non-laminated portion Db surrounding the recording medium A of the laminated portion Da.

Specifically, as illustrated in FIG. 38(B), when the laminate material B, the recording medium A and the under film E are thermally press bonded at the first press bonding unit 40 (when the laminate material B, the recording medium A and the under film E, all three pass through the first press bonding unit 40), a laminate (A+B+E, B+E) with the laminated portion Da having the recording medium A, the laminate material B and the under film E laminated together and the non-laminated portion Db having the laminate material B and the under film E laminated together is produced. The transfer width Db of the laminate layer D transferred onto the under film E is set to be about 3 mm or larger. When the transfer width is smaller than this value, the bonded area between the under film E and the laminate layer D is small and hence an adhesive force is poor. Thus, the under film E may be peeled off from the laminate layer D, which leads to the possibility that a portion (laminated portion) Da having the laminate layer D press bonded to the recording surface is not finely cut away from a portion (non-laminated portion) Db having the laminate layer D press bonded to the under film E.

Figure 39:
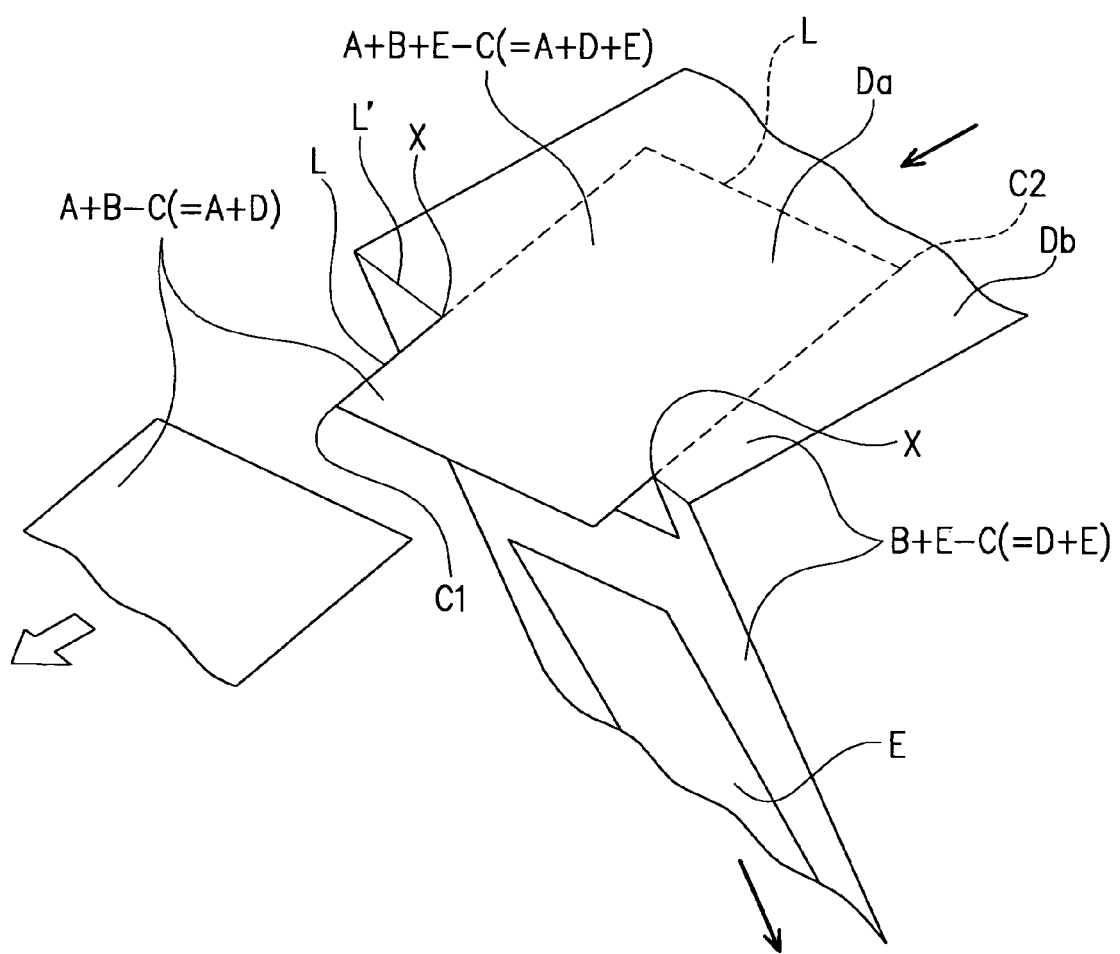
FIG. 39 illustrates an under film which is being separated from a recording medium at a separating unit of the laminating apparatus of the another embodiment (6).

Then, the under film E is rolled up onto the holder 91 of the under film collecting unit 90 at the separating unit 80. At this time, as illustrated in FIG. 39, the recording medium A and the under film E are moved relative to each other so as to have the base surface of the recording medium A separated away from the under film E. That is, while the recording medium A is moving between the guide plates 83, 84 (conveying passage) towards the downstream side, the under film E is pulled in a direction different from the moving direction of the recording medium A (in a direction away from the base surface of the recording medium A). Because of this, the laminate layer D of the non-laminated portion Db with the substrate C peeled off therefrom is moving in the same direction as that of the under film E so that a pulling force acts intensively to a boundary between a portion having a recording medium A and a portion having no recording medium A (i.e., boundary between the non-laminated portion Db and the laminated portion Da). Accordingly, only the non-laminated portion Db is securely cut away and the edges of the laminated portion Da are finely finished along the edges of the recording medium A.

In addition, by moving the under film E away from the recording medium A in an oblique direction thereto, a pulling force acts only to intersection points X between a rectangular boundary L on the laminate layer D defining the laminated portion Da and the non-laminated portion Db, and a separation line L' (boundary along which the under film E is defined by a portion separated and a portion not yet separated), so that the cutting of the laminate layer D is proceeded in a local manner along the rectangular boundary L (i.e., the laminated portion Da and the non-laminated portion Db are gradually cut away from each other from a corner C1 through an opposite corner C2, of the rectangular boundary L). Thus, the edge of the laminated portion Da is securely and finely finished. Specifically, in an operation in which the recording media are supplied while being oriented parallel to the conveying direction, and the under film E is separated in a direction parallel to the recording media A by separating the under film in a direction parallel to the conveying direction as viewed in plan, the separation line L' is parallel to the boundaries of the opposite two sides of the rectangular boundary L (an upstream boundary and a downstream boundary, in the conveying direction), and therefore a pulling force simultaneously acts and, as a result, the pulling force is dispersed. However, as mentioned above, in an operation in which the under film E is separated from the recording medium A in an oblique direction, a pulling force acts along each of the boundaries of the rectangular boundary L point by point so that the laminate layer D is being cut away in a continuous manner minutely point by point. As a result, the edge of the laminated portion Da is finely finished in a more secure manner.

Figure 40:
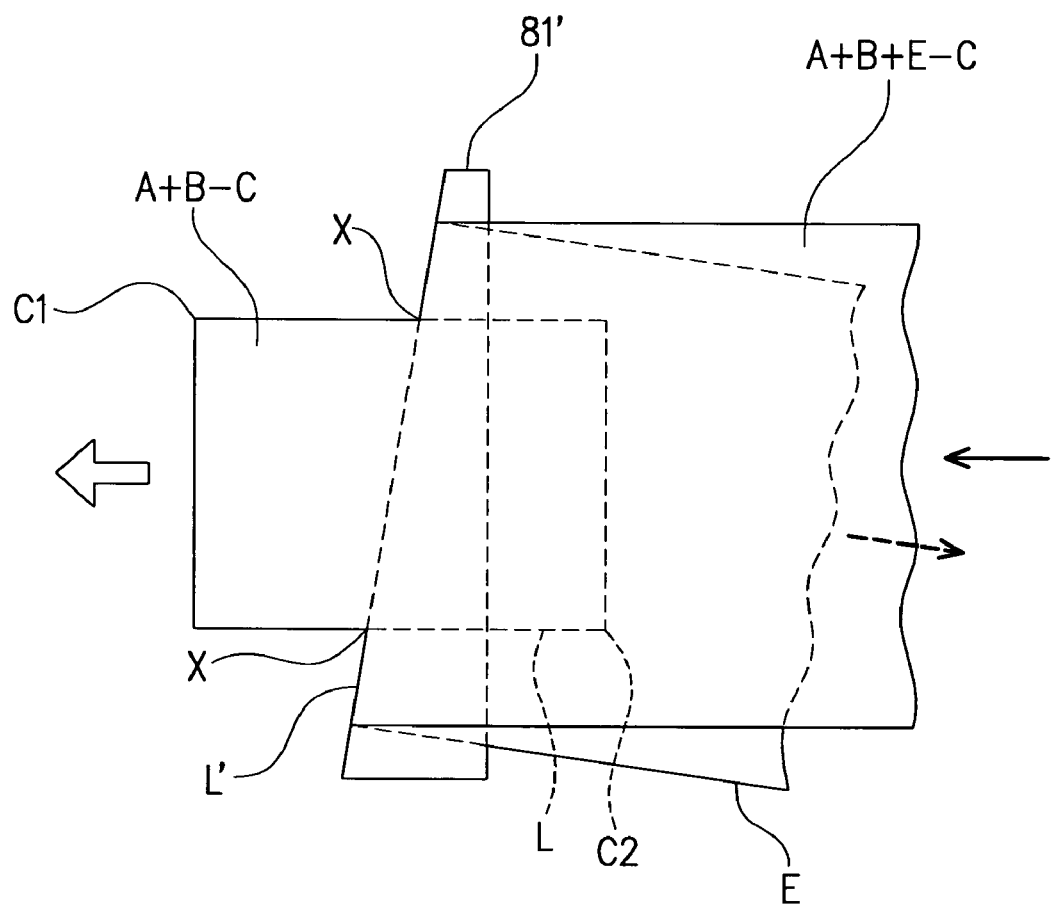
FIG. 40 illustrates an under film which is being separated from a recording medium at a separating unit of the laminating apparatus of the another embodiment (6).

Other than the operation in which the recording media A are supplied while being oriented in a direction obliquely to the conveying direction, and the under film E is separated in a direction parallel to the conveying direction as viewed in plan (in a direction orthogonal to the conveying surface), it is possible to employ an operation in which the recording media A are supplied while being oriented parallel to the conveying direction (that is, the laminate material B and the under film E are aligned parallel to the recording medium A) and the under film E is separated from the recording medium A in a direction obliquely thereto by separating the under film E in a direction obliquely to the conveying direction as viewed in plan. Specifically, in place of the knife edge 81 having a linear edge parallel to the width direction with respect to the conveying direction, as illustrated in FIG. 40, it is possible to employ an arrangement, in which a knife edge (separating guide member) 81' having an edge inclined to the width direction with respect to the conveying direction is provided, and while the under film E is wound around the inclined edge of the knife edge 81', the under film E is pulled, allowing a separated portion thereof to be collected at the under film collecting unit 90. It is to be noted that the axis of the holder 91 of the under film collecting unit 90 must be oriented at an angle corresponding to the separated under film E that is oriented at an angle relative to the conveying direction as viewed in plan. Specifically, the axis of the holder 91 is set to be parallel to the edge of the knife edge 81'.

In place of the knife edge 81 having a linear edge parallel to the width direction with respect to the conveying direction, as illustrated in FIG. 41, it is possible to employ knife edges 81" to 81""', having a non-linear edge. The knife edge 81" of FIG. 41(A) has an edge having continuous formed triangular protrusions. The knife edge 81"' of FIG. 41(B) has a ridge shaped edge deforming towards the downstream side of the conveying direction as it advances towards the center. The knife edge 81"" of FIG. 41(C), on the contrary, has a valley shaped edge deforming towards the upstream side of the conveying direction as it advances towards the center. The knife edge 81""' of FIG. 41(D) has a corrugated edge. Whether any one of the knife edge is to be employed, a pulling force acts only to the intersection points X between the rectangular boundary on the laminate layer D defining the laminated portion Da and the non-laminated portion Db, and the separation line, so that the cutting of the laminate layer D is proceeded in a local manner along the rectangular boundary. Thus, the edge of the laminated portion Da is finely finished in a more secure manner.

These approaches are also applicable to the substrate C. That is, in a case where the recording media A are supplied while being oriented in a direction obliquely to the conveying direction, each substrate C is peeled off in a direction parallel to the conveying direction as viewed in plan, and on the other hand, in a case where the recording media A are supplied while being oriented in a direction parallel to the conveying direction, a transfer material of the substrate C is separated in a direction obliquely to the conveying direction as viewed in plan. Or, a knife edge 61 of the peeling-off unit 60 may be formed into shapes as illustrated in FIG. 41.

Figure 42:
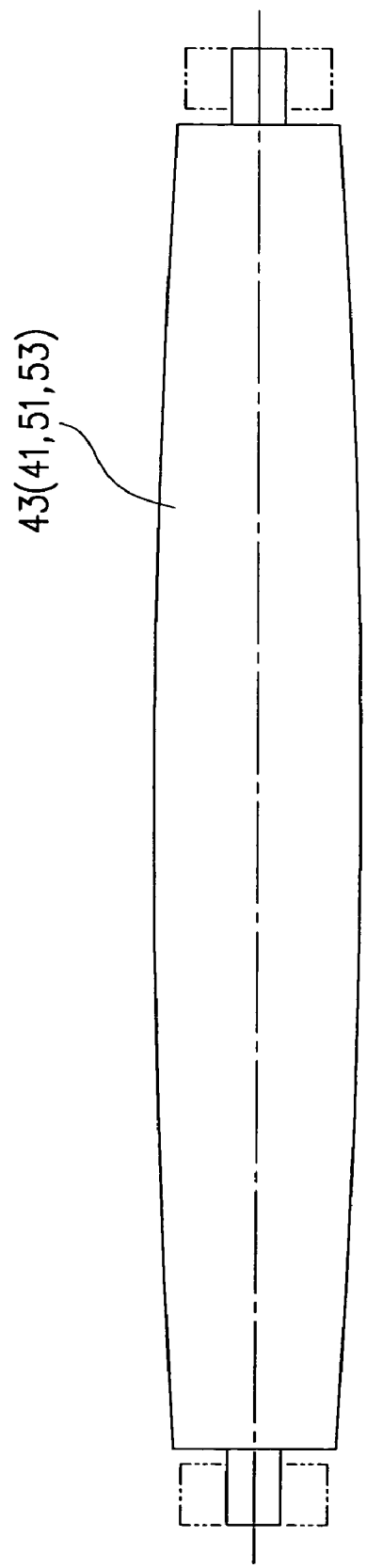
FIG. 42 is a front view of a press contact roller of a laminating apparatus of another embodiment (7).

(7) In any one of the above embodiments, the laminate material B is thermally press bonded to the recording medium A by a roller having a substantially cylindrical column shape, but no limitation is intended thereto. Specifically, FIG. 42 illustrates an employable press contact roller 43 that has the opposite ends supported by the press contact force adjusting mechanism 45 (moving member 452) and is subjected to an urging force in a direction orthogonal to the axis (towards the conveying passage). An outer diameter thereof is reduced in the axial direction as it advances from the center portion to the opposite ends to have a drum-like outer appearance, and an urging force acts so that while the press contact roller 43 is kept press-contacted with the driving roller 41, a shaft of the press contact roller 43 is bent, and the outer circumference of the roller is elastically deformed by employing a rubber roller. Whereby, the press contact roller 43 is securely contacted with the laminate material B via its linear or strip-like area extending in the axial direction on the outer circumference.

Figure 43:
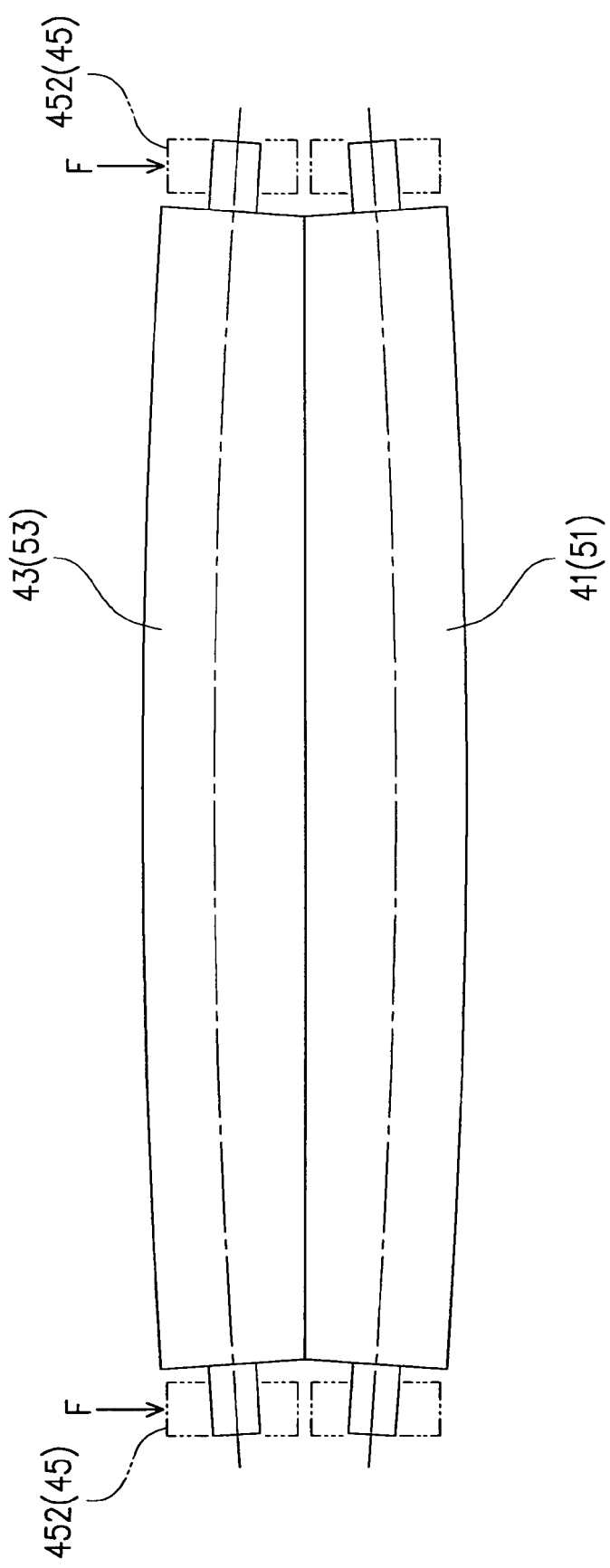
FIG. 43 is a front view of a driving roller and a press contact roller, of the laminating apparatus of the another embodiment (7), which are held in press contact with each other and are held in bent positions.

The driving roller 41 as employed also may have an outer diameter reduced as it advances from the center portion to the opposite ends in the axial direction, and a drum-like outer appearance. The drum-like outer appearance as formed allows the driving roller 41 to be more evenly contacted to the outer circumference of the press contact roller 43 by the elastic deformation of the shaft and outer circumference, of the driving roller 41 when an urging force effected by the press contact force adjusting mechanism 45 acts to the driving roller 41 via the press contact roller 43. That is, as illustrated in FIG. 43, when an urging force F of the press contact force adjusting mechanism 45 acts to the opposite ends of the press contact roller 43, the center portions of the press contact roller 43 and the driving roller 41 each having an outer diameter larger than the opposite ends are brought into contact with each other, thereby causing a reaction force or the like relative to the urging force F which acts so that the shafts of the driving roller 41 and the press contact roller 43 are bent relative to each other, while the outer appearances of the driving roller 41 and the press contact roller 43 are elastically deformed, and thus the outer circumferences thereof are more evenly contacted with each other throughout their entire lengths. Whereby, the laminate material B and the recording medium A interposed between the driving roller 41 and the press contact roller 43 can be more evenly press bonded to each other. Herein, the press contact force between the rollers 41, 43 is set within a range of 50 to 120 kgf, and both the rollers 41, 43 have shaft strengths enabling the shafts to be bent when the press contact force of this range has acted thereto.

The press contact roller 53 of the second press bonding unit 50 may be structured in the same manner as the press contact roller 43 of the first press bonding unit 40. Specifically, it is possible to employ an arrangement in which the press contact roller 53, which has the opposite ends of the shaft are supported by the press contact force adjusting mechanism 45 (moving member 452) and is subjected to an urging force applied in a direction orthogonal to the axis thereof (towards the conveying passage), has an outer diameter reduced as it advances from the center portion to the opposite ends in the axial direction and a drum-like outer appearance, and an urging force acts so that while the press contact roller 43 is kept press-contacted with the driving roller 41, a shaft of the press contact roller 53 is bent, and the outer circumference of the roller is elastically deformed by employing a rubber roller. Whereby, the press contact roller 53 is securely contacted with the laminate material B via its linear or strip-like area extending in the axial direction on the outer circumference.

The driving roller 51 also may have an outer diameter reduced as it advances from the center portion to the opposite ends in the axial direction to have a drum-like outer appearance. The drum-like outer appearance as formed allows the driving roller 51 to be more evenly contacted to the outer circumference of the press contact roller 53 by the elastic deformation of the shaft and outer circumference, of the driving roller 51 when an urging force effected by the press contact force adjusting mechanism 55 acts to the driving roller 51 via the press contact roller 53. That is, in the same manner as the first press bonding unit 40, when an urging force F of the press contact force adjusting mechanism 45 acts to the opposite ends of the press contact roller 53, the center portions of the press contact roller 53 and the driving roller 51 each having an outer diameter larger than the opposite ends are brought into contact with each other, thereby causing a reaction force or the like relative to the urging force F which acts so that the shafts of the driving roller 51 and the press contact roller 53 are bent relative to each other, while the outer appearances of the driving roller 51 and the press contact roller 53 are elastically deformed, and thus the outer circumferences thereof are more evenly contacted with each other throughout their entire lengths. Whereby, the laminate material B and the recording medium A interposed between the driving roller 51 and the press contact roller 53 can be more evenly press bonded to each other. Herein, the press contact force between the rollers 51, 53 is set within a range of 50 to 120 kgf, and both the rollers 51, 53 have shaft strengths enabling the shafts to be bent when the press contact force of this range has acted thereto.

Alternatively to the arrangement in which the driving roller 41 (51) and the press contact roller 43 (53) each are formed into a drum-like shape, and they are elastically deformed relative to each other by the urging force acting to the press contact roller 43 (53), so that the outer circumference of the driving roller 41 (51) is more evenly contacted with the outer circumference of the press contact roller 43 (53), it is possible to employ an arrangement in which the driving roller 41 (51) is formed into, for example, a substantially cylindrical column shape, thereby preventing elastic deformation even when the urging force effected by the press contact force adjusting mechanism 45 (moving member 452) or the press contact and releasing mechanism 46 acts thereto, while only the press contact roller 43 is formed into a drum-like shape and is designed to be elastically deformable by the urging force effected by the press contact force adjusting mechanism 45 (moving member 452) or the press contact and releasing mechanism 46. With this arrangement, the press contact roller 43 (53) is elastically deformed upon the press-contact with the driving roller 41 (51) by the urging force effected by the press contact force adjusting mechanism 45 (moving member 452) or the press contact and releasing mechanism 46, so that the press contact roller 43 (53) can be contacted to the outer circumference of the driving roller 41 (51) via its linear or strip-like area and hence it can more evenly press contact (thermally press bond) the recording medium A and the under film E.

Still alternatively to the arrangement in which the shaft and outer circumference, of the press contact roller 43 (53) are elastically deformed so that the outer circumferences of the driving roller 41 (51) and the press contact roller 43 (53) are more evenly contacted to each other, it is possible to employ an arrangement in which, for example, when an urging force has acted to the press contact roller 43 (53), only the shaft of the press contact roller 43 (53) is bent (elastically deformed), so that the laminate material B is pressed via a linear or strip-like area extending in the axial direction on the outer circumference of the press contact roller 43 (53) by the bending action of the press contact roller 43 (53). It is a matter of course to employ an arrangement in which the stiffness of the shaft of the press contact roller 43 (53) is increased so as to prevent elastic deformation of the shaft of the press contact roller 43 (53) even when an urging force acts thereto, and only the outer circumference of the press contact roller 43 (53) is elastically deformed when the urging force has acted thereto. Even with this arrangement, the laminate material B can be pressed via the linear or strip-like area extending in the axial direction on the outer circumference of the press contact roller 43 (53), so that the laminate material B can be more evenly thermally press bonded to each recording medium A.

Alternatively to the arrangement in which the driving roller 41 (53) is assigned as a roller that receives an urging force to be acted to the press contact roller 43 (53), it is possible to employ an arrangement in which the press contact roller 43 (53) is driven to be rotated, or both the driving roller 41 (51) and the press contact roller 43 (53) in each unit are synchronously driven to be rotated.

(8) In the first embodiment, etc., a thermally press bonding operation is carried out one time before peeling off the substrate, and another thermally press bonding operation is carried out one time after peeling off the substrate C. This thermally press bonding operation may be carried two times in each stage of the operation. Particularly, in a case where the thermally press bonding operation after peeling off of the substrate C is carried out several times, it is preferable to carry out the thermally press bonding operation while stepwisely changing the press contact force and/or the heating temperature, such as gradually reducing the press contact force or heating temperature.

Figure 44:
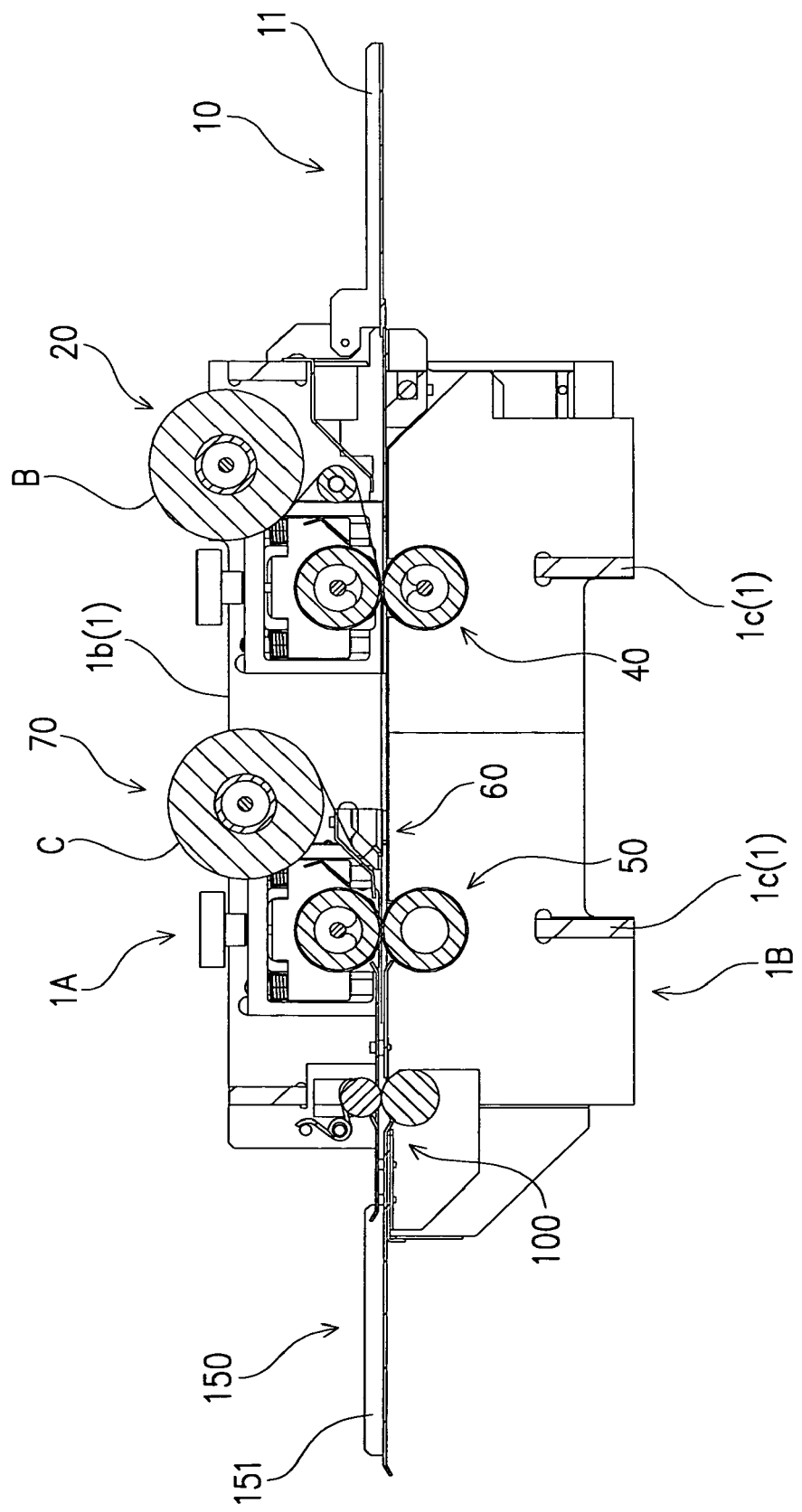
FIG. 44 is a side view of a laminating apparatus corresponding to the first embodiment, in another embodiment (9).

(9) In the first embodiment, etc., the under film E is functioned as a transfer medium means. In this regard, as illustrated in FIG. 44, it is possible to employ an arrangement in which the under film supplying unit 30, the under film collecting unit 90 and the separating unit 80 are omitted, and alternatively to them, the roller (driving roller 41) of the press bonding unit (first press bonding unit 40) is functioned as the transfer medium means, and the press bonding unit 40 is functioned as a separating unit for separating the laminated portion Da from the non-laminated portion Db. Also, in this arrangement, as illustrated in FIG. 19, at the time when the outer circumference of the driving roller 41 is separated from the base surface, a pulling force is caused along the boundary between the laminated portion Da having the laminate layer D adhered onto the recording surface of the recording medium A and the non-laminated portion Db having the laminate layer D which protrudes outwards from the periphery of the recording medium A and is adhered onto the outer circumference of the driving roller 41, so that the boundary between the laminated portion Da and the non-laminated portion Db is cut finely along the edge of the recording medium A. However, when the driving roller 41 is rotated while an excessive laminate layer D (a laminate layer of the non-laminated portion Db) is left on the outer circumference of the driving roller 41, the laminate layer D is adhered and stacked every time it reaches a point at which the laminate material B is press bonded. Therefore, it is preferable to provide a scraper (removing means) 85 that has a leading edge adapted to contact the outer circumference of the driving roller 41 at a given pressure so as to scrape the residual of the laminate layer D attached to the outer circumference, in the upstream side of the point at which the laminate material B is press bonded to each recording medium A.

(10) In the first embodiment, etc., the peeling-off unit 60 is disposed between the downstream side of the first press bonding unit 40 and the upstream side of the second press bonding unit 50 (that is, between the first press bonding unit 40 and the second press bonding unit 50), so that the first press bonding unit 40 carries out the thermally press bonding operation for an intermediate with the substrate laminated on the laminate layer D, and the second press bonding unit 50 carries out the thermally press bonding operation for an intermediate with the substrate peeled off therefrom. This thermally press bonding operation for an intermediate with the substrate C laminated on the laminate material B may be carried out twice by disposing the peeling-off unit 60 on the downstream side of the second press bonding unit 50.

(11) In the first embodiment, etc., the free rollers 22, 32 are disposed in areas capable of being influenced by heat from the driving roller 41 and/or the press contact roller 43 so as to be heated. Instead, the free rollers themselves may be provided with heating sources.

(12) In the first embodiment, etc., for any one of the driving roller 41 and the press contact roller 43, of the first press bonding unit 40, and the driving roller 51 and the press contact roller 53, of the second press bonding unit 50, a silicon-type heat resistant rubber roller is employed. Instead, as long as the capability of allowing air mixed between the recording medium A and the laminate layer D to be escaped is taken into account, it is possible to employ an arrangement in which at least the press contact rollers 43, 53 are silicon-type heat resistant rubber rollers. Accordingly, the driving rollers 41, 51 are possible to be metal rollers.

(13) In the first embodiment, etc., as a roller having a soft layer on the rigid roller surface, a silicon-type heat resistant rubber roller is employed. Instead, acrylic rubber (ACM) or fluorocarbon rubber (FKM) may be used as a material of a soft layer in addition to silicon, as long as an elastic deformation of the surface layer of the roller is realized by the press contact, which surface having an increased press contacting function further increases an adhesive force of the laminate layer to the recording surface of a recording medium, thereby enhancing the effect of steadily forcing out air mixed between the recording medium A and the laminate layer D (air drainage capability), or as long as an effect of finely dispersing the mixed air between, for example, the dots of ink formed on an ink receiving layer is enhanced.

Figure 45:
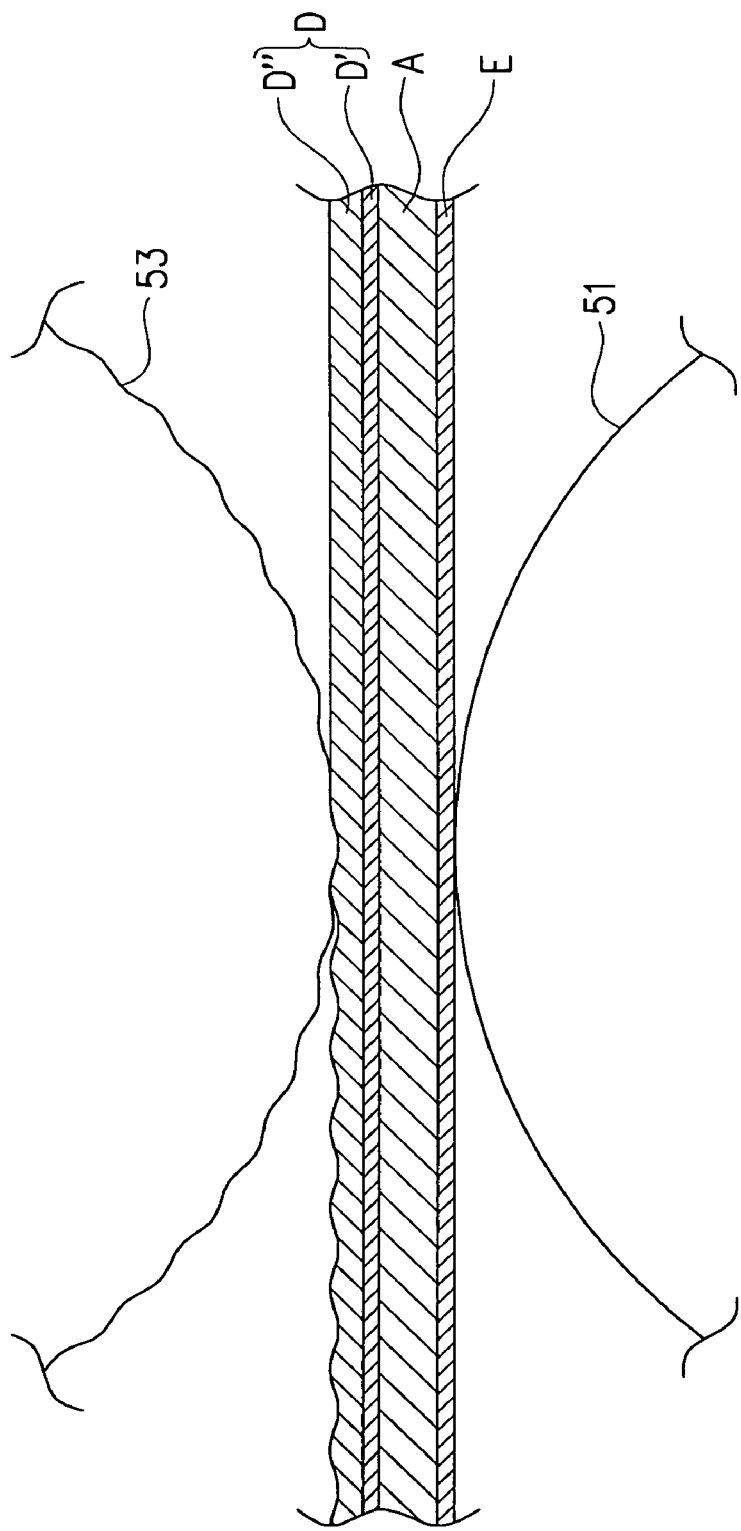
FIG. 45 illustrates a first press bonding unit of a laminating apparatus of another embodiment (14) in a thermally press bonding operation

(14) In the first embodiment, etc., the press contact roller 53 as employed has a smooth surface. Instead, as illustrated in FIG. 45, it may have an irregular surface such as in a mat-like finish or the like. In this case, at the time when the second thermally press bonding operation is carried out, the laminate layer D of the laminate material B (more specifically, the protection layer D" of the laminate layer D) is already softened by heating, and in addition, since the press contact roller (roller on the side of the protection layer D") 53 has an irregular surface such as in a mat-like finish or the like, the surface pattern of the roller 53 is transferred onto the protection layer D", and thus the laminate layer D having a semi-glossy or non-glossy surface is formed. In this case, it is possible to use not only a recording medium A having a glossy recording surface (recording surface having a high degree of smoothness), but also a recording surface having a semi-glossy or non-glossy recording surface (irregular recording surface) such as in a mat-like finish or the like. As a pair of press contacting means for causing press contacting effect, it is possible to use, for example, flat-plate like press members in place of the rollers 51, 53. In this case, each press member adapted to act on the laminate layer D has an inner surface (press contacting surface) having an irregular surface configuration such as in a mat-like pattern or the like pattern.

(15) In the first embodiment, etc., as a locking means, a power lock is used. Other than this, it is a matter of course to employ a known or well known locking means. It is essential that the locking means can prevent the housing from being opened until the temperature inside thereof is lowered than a given temperature so as to prevent the operator from touching heated parts or members with the housing opened. Alternatively, it is possible to employ a locking means having a simplified structure that allows for the releasing the lock by a manual operation, in order to optionally open and close the apparatus irrespective of the inside temperature.

(16) In the first embodiment, etc., the upper housing part 1A is rotatably supported by the lower housing part 1B so as to be pivotally moved relative to the lower housing part 1B, thereby enabling the opening and closing. In addition to this, it is possible to employ, for example, an arrangement in which the upper housing part 1A is linearly moved relative to the lower housing part 1B, thereby enabling the opening and closing.

(17) In the Applied Example 1, a recording medium A subjected to a glossy, semi-glossy or non-glossy surface treatment is used. For example, as long as an ink jet recording system is used, it is possible to employ an arrangement in which an irregular surface configuration is applied onto the recording surface of a recording medium A to have a semi-glossy or non-glossy surface by controlling the amount of ink when an image is recorded.

(18) In the Applied Example 2, a pair of sensors 64, 65, or a pair of sensors 86, 87 are provided to detect the leading edge and tailing edge, of each recording medium A. Accordingly, it is possible to employ an arrangement in which controlling is made so as to reduce the conveying speed until a given time (a time set in consideration that upon elapse of this given time, an edge of each recording medium A passes through the peeling-off point or separating point) has elapsed since an edge of the recording medium A has been detected by a sensor, or a controlling is made to set a time period to reduce the conveying speed by utilizing positional information if the moving position of each recording medium A on the conveying passage can be specified.

(19) In the Applied Example 2, the conveying speed is reduced to the same speed both for the leading edge side and tailing edge side, of each recording medium A. Instead, different speeds may be applied respectively for both the sides. With this, a problem that the laminate layer is peeled away from an edge of the recording medium A in the peeling-off step tends to be more enhanced on the tailing edge side of the recording medium A than on the leading edge side of the same, so that it is preferable to lower the conveying speed on the tailing edge side than on the leading edge side. On the other hand, in the separating step, it is preferable to set the conveying speed lower for the leading edge side than for the tailing edge side, given that, on the leading edge side of the recording medium A, the leading edge of a recording medium A would be less likely damaged (for example, a rear layer containing the face surface, of the recording medium A having the laminate structure would be less likely torn off from the recording medium A around the leading edge side thereof) as a result that it is dragged by the laminate layer D which is pulled along with the separation of the under film E, but still a possibility.

(20) In the first to fifth embodiments, the laminated portion Da is automatically cut away from the non-laminated portion Db by pulling out the under film E from the conveying passage via the separating member 81 or making the roller surface of a roller, which is kept rotated, function as a transfer medium means. Instead, for example, it is possible to employ an arrangement in which the substrate collecting unit 70, the under film collecting unit 90, the separating unit 80 and the like, of the fourth embodiment are omitted, and the recording medium A, the laminate material B and the under film E are press bonded at least at the first press bonding unit 40, and a laminate having the recording medium A held between the laminate material B and the under film E (the recording medium A is held sandwiched therebetween) is discharged as a lengthy laminate. It is also possible to employ an arrangement in which the substrate collecting unit 70, the under film collecting unit 90, the separating unit 80 and the like are omitted, and a cutting device for cutting a laminate of the recording media, the laminate material B and the under film E between the adjacent recording media A is disposed on the downstream side of the first press bonding unit 40 or the second press bonding unit 50, so that laminates each having the recording medium A, the laminate material B and the under film E are discharged as sheets. Accordingly, in the same manner as the sixth embodiment, as illustrated in FIG. 21, the laminated portion Da can be cut away from the non-laminated portion Db by manually peeling off the under film E from the laminate material B (pulling up the under film E) by the operator. According to this manner of operation or the sixth embodiment, it is possible to carry out the thermally press bonding operation twice by again passing the once discharged laminate through the press bonding unit 40, even by the laminating apparatus equipped with only a single press bonding unit 40, which is the same as the second and fifth embodiments.

(21) In the first to fourth embodiments, the separating unit 80 for the under film E is disposed downstream of the peeling-off unit 60 for the substrate C. Instead, in the same manner as the fifth embodiment, it is possible to employ an arrangement in which the separating unit 80 (equivalent to the press bonding unit 40) is disposed upstream of the peeling-off unit 60, thereby cutting the laminated portion Da away from the non-laminated portion Db while having the substrate C still remained attached thereto, and then the substrate C is peeled off from the laminate layer with only the laminated portion Da left thereon.

Figure 46:
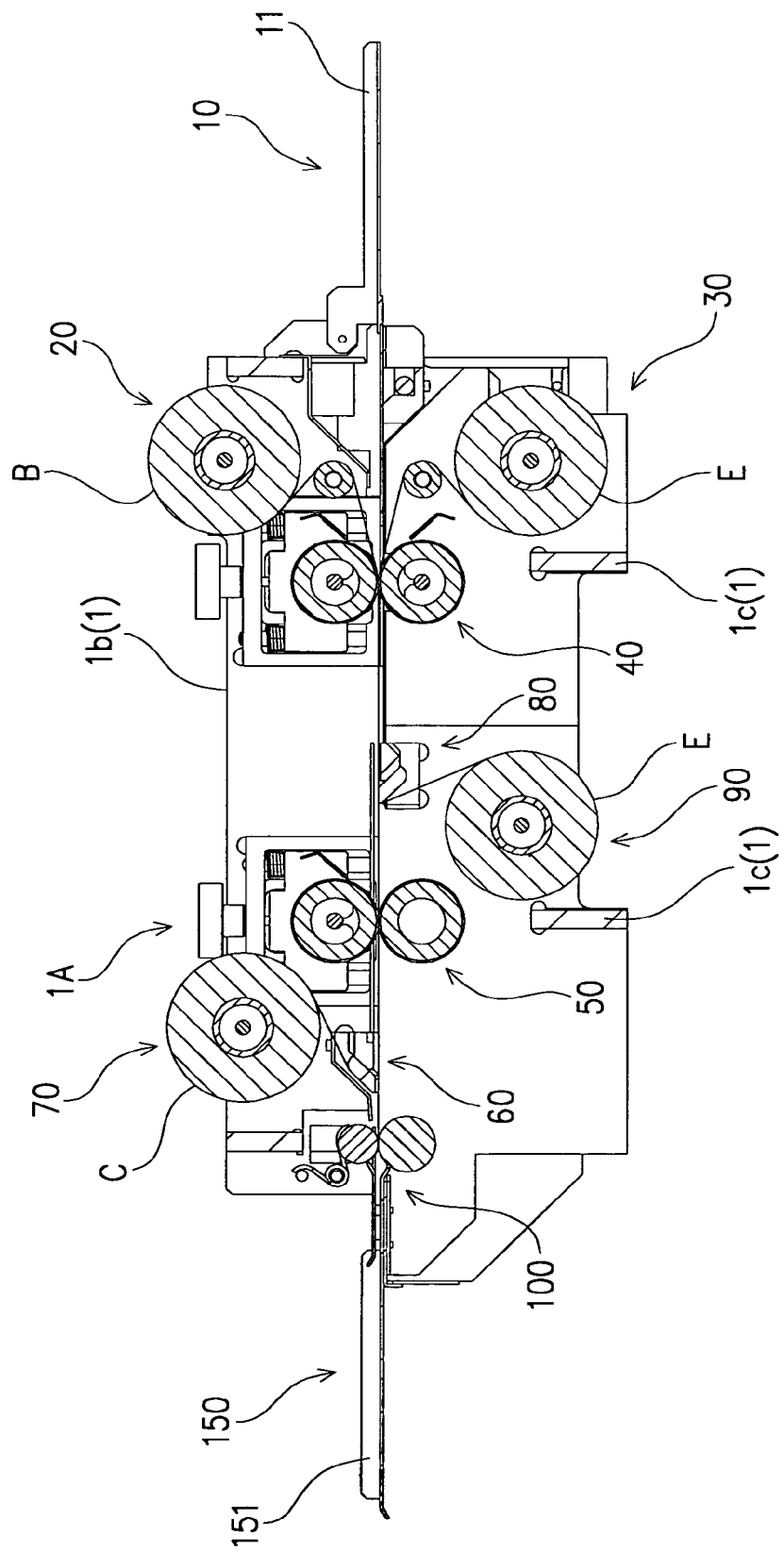
FIG. 46 is a side view of a laminating apparatus corresponding to the first embodiment, in another embodiment (21).
Figure 47:
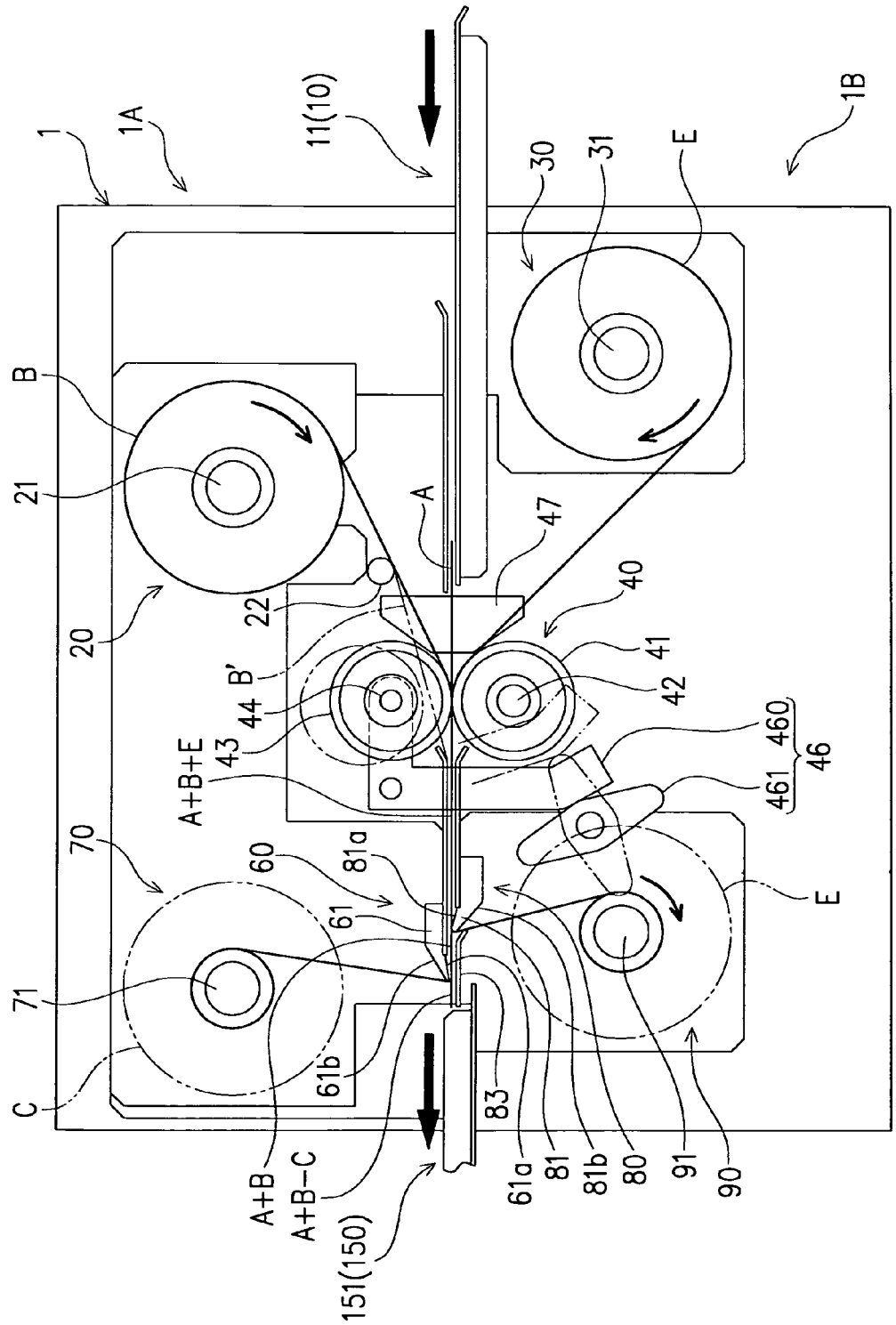
FIG. 47 is a side view of a laminating apparatus corresponding to the second embodiment, in the another embodiment (21).
Figure 48:
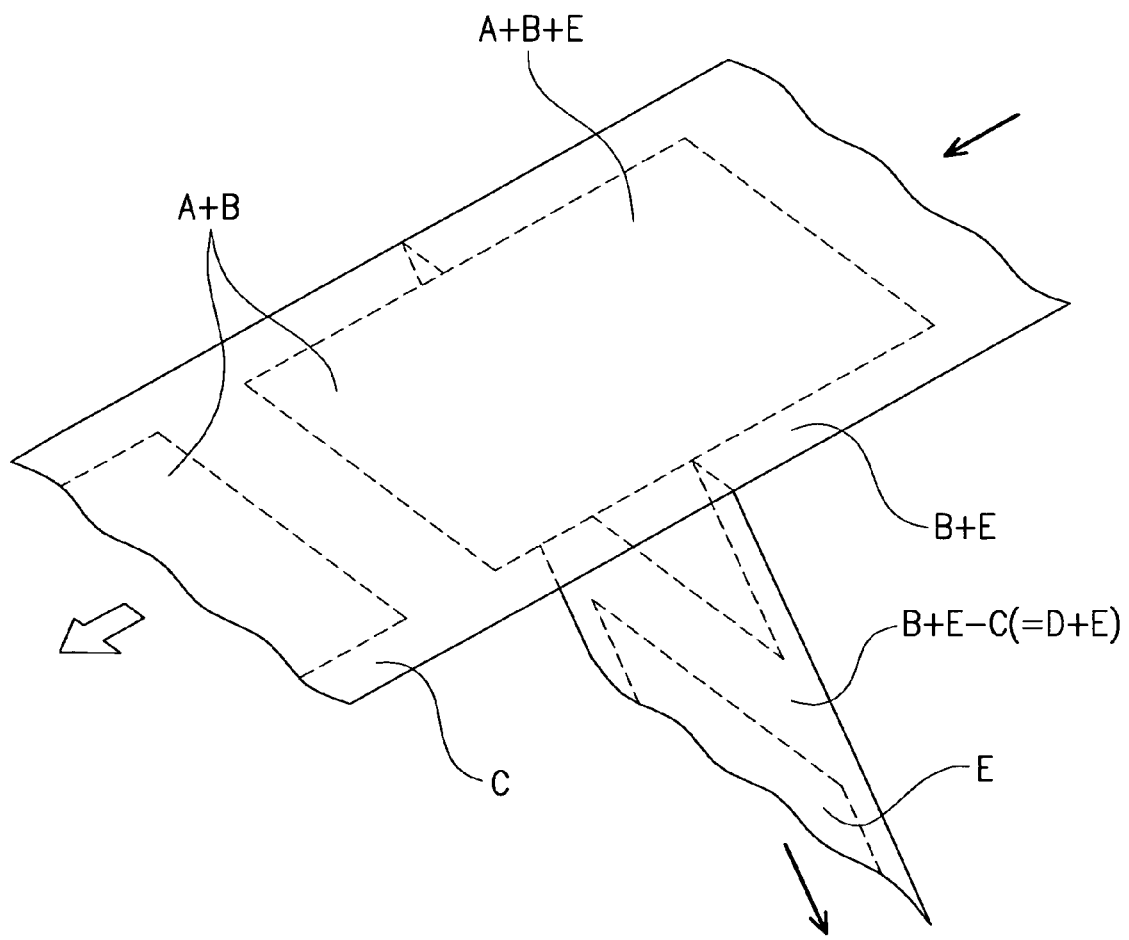
FIG. 48 illustrates an under film which is being separated from a recording medium at a separating unit of the laminating apparatus of the another embodiment (21).

Specifically, as illustrated in FIGS. 46, 47, etc., when the separating unit 80 is disposed upstream of the peeling-off unit 60, a laminate (A+B+E, B+E) produced at the press bonding unit 40 is conveyed to the separating unit 80, and naturally cooled during passing on the conveying passage, and therefore the laminate having an adhesive layer D' which has been substantially hardened or hardened to some extent (brought into a substantially normal equilibrium state) reaches the separating unit 80, at which the under film E is separated. At this point, as illustrated in FIG. 48, the recording medium A and the under film E are moved relative to each other so as to have the base surface of the recording medium A separated away from the under film E. That is, while the recording medium A is moving further towards the downstream side of the conveying passage, the under film E is pulled in a direction different from the moving direction of the recording medium A (in a direction away from the base surface of the recording medium A), thereby allowing the laminate layer D of the non-laminated portion Db to be separated from the substrate C and pulled (drawn in) in the same direction as the under film E. Accordingly, the action of the laminate layer D of the non-laminated portion Db, which is moving in the same direction as the under film E, allows a pulling force to act intensively along the boundary between a portion having a recording medium A and a portion having no recording medium A (that is, the boundary between the non-laminated portion Db and the laminated portion Da). As a result, only the laminate layer D and the under film E, of the non-laminated portion Db can be finely cut away along the edge of each recording medium A in a secure manner.

Figure 49:
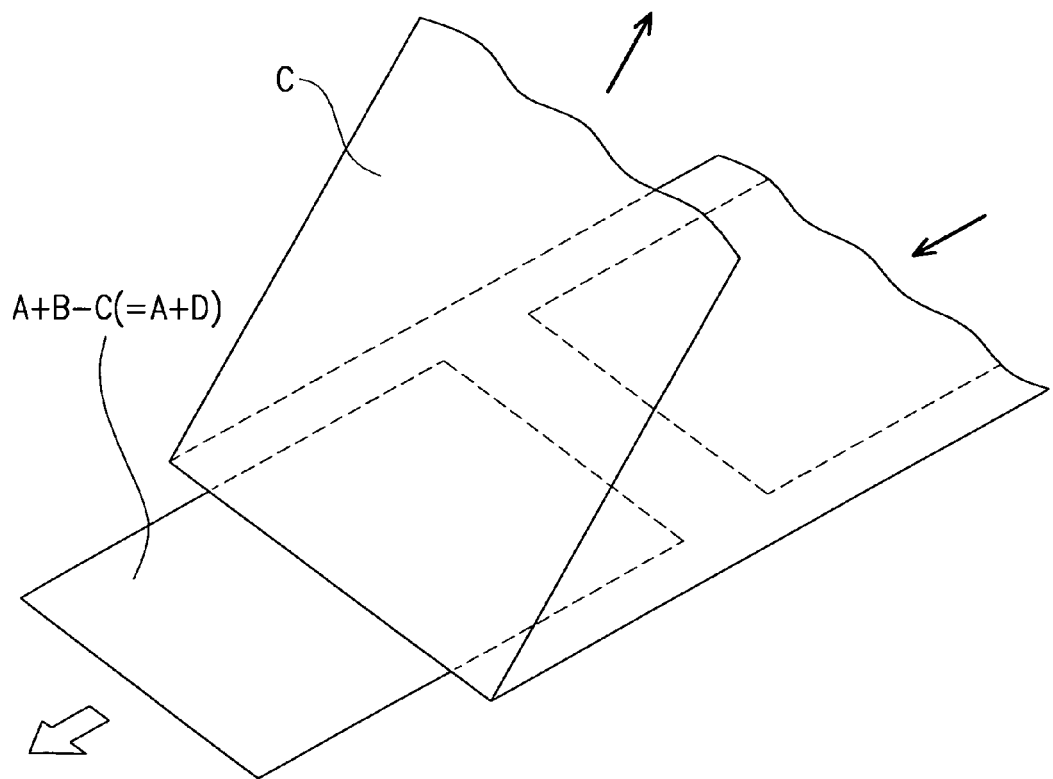
FIG. 49 illustrates a substrate which is being peeled off from a recording medium at a peeling-off unit of the laminating apparatus of the another embodiment (21).

After the separation of the under film E, the precedent and subsequent laminates (A+B) are left as being interconnected to each other via the substrate and are conveyed to the peeling-off unit 60. In the laminating apparatus of FIG. 46, the laminate (A+B) has the laminate layer D of the laminate material B again activated by the thermally press bonding at the second press bonding unit 50. However, as a result of both the natural heat radiation upon elapse of a time (given time) after the thermally press bonding at the second press bonding unit 50 and the forced cooling by the radiation effect of the guide plate, the adhesive layer D' is brought into a substantially hardened state or hardened to some extent (a substantially normal equilibrium state), and the laminate (A+B) reached the peeling-off unit 60 has an adhesive force between the substrate C and the laminate layer D being smaller than the adhesive force between the laminate layer D and the recording surface of the recording medium A (the adhesive force of the laminate layer D relative to the recording surface of the recording medium A becomes greater than the adhesive force between the substrate C and the laminate layer D). Because of this, even if the substrate C is pulled upwards on the upstream side of the conveying direction via the knife edge 61, only the substrate C is securely peeled off, as illustrated in FIG. 49, and it is unlikely that the laminate layer D is partly or entirely taken away along with the substrate C, unlike the conventional laminating apparatus. This is also applicable to the laminating apparatus of FIG. 47.

Thus, to the finished product discharging unit 150 is disposed a recording medium A that has an edge finely finished along the edge of recording medium A and is laminated with the laminate layer D adhered onto the recording surface without air or the like interposed between the laminate layer D and the recording medium A.

Since the peeling off of the substrate C is a final step (the separating step for the under film E is previously carried out), until this step, a design surface (a surface on the side of the recording surface) of each recording medium A is protected by the substrate C. Therefore, the design surface is unlikely to be scratched or damaged, thereby enabling the improvement of the quality. Since inexpensive guide members for conveying operation of the recording media A can be used, it is expected to produce an effect of reducing manufacturing costs.

(22) It is possible to employ an arrangement in which the peeling-off unit 60 and the separating unit 80 are disposed at the same position and the peeling off of the substrate C and the separation of the under film E are carried out simultaneously or substantially simultaneously.

Figure 50:
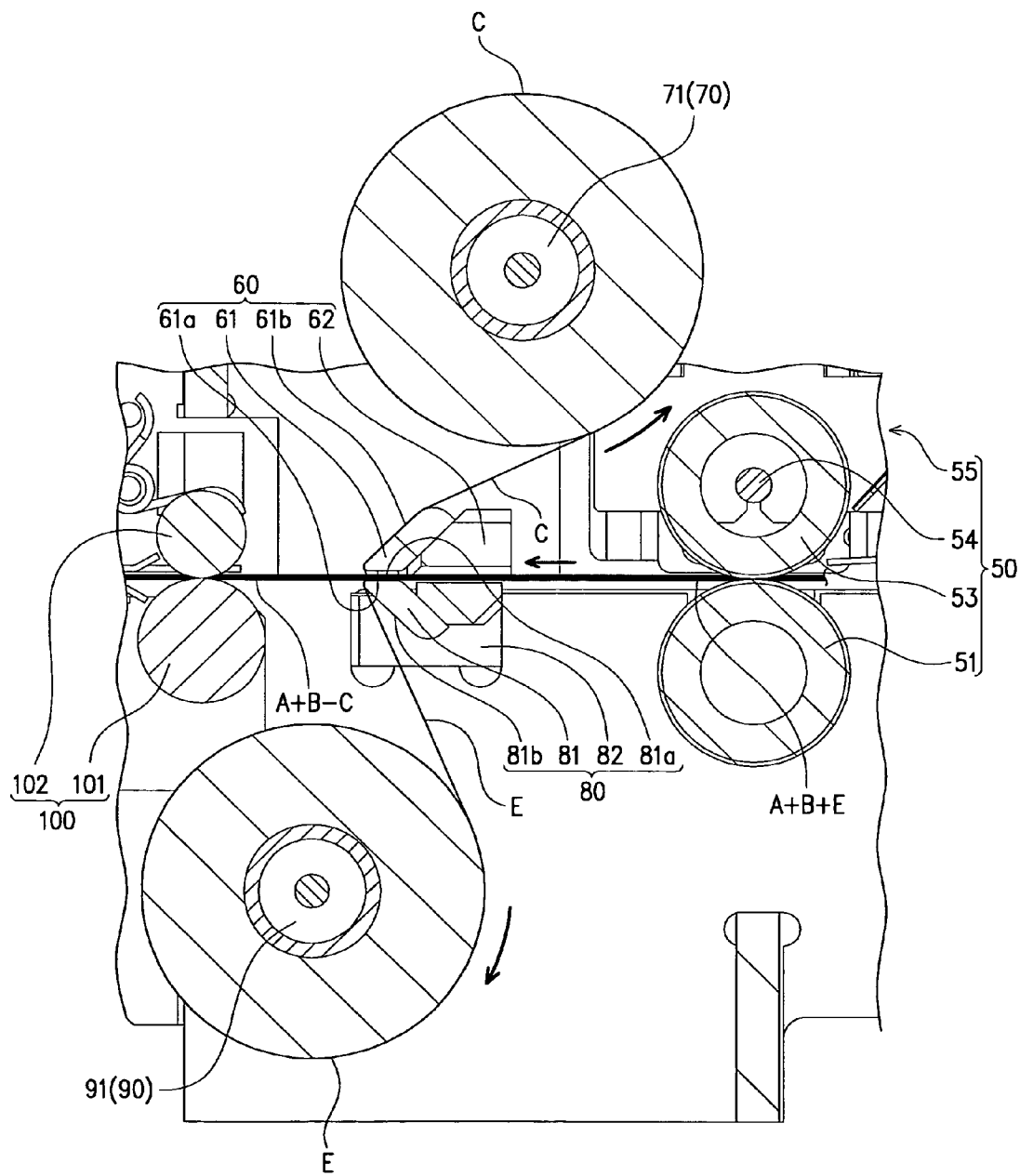
FIG. 50 is an enlarged side view of an essential portion of a second press bonding unit, a peeling-off unit, a separating unit and their proximities, of the laminating apparatus corresponding to the first embodiment, in another embodiment (22).

Specifically, as illustrated in FIG. 50, the peeling-off unit 60 and the separating unit 80 are disposed at substantially the same position on the conveying passage (to have the leading end of the knife edge 61 located at substantially the same position as the leading end of the knife edge 81), so as to carry out substantially simultaneously the peeling-off step and the separating step to each laminate (A+B+E) to be conveyed. Since the substrate collecting unit 70 and the under film collecting unit 90 are also disposed respectively near the peeling-off unit 60 and the separating unit 80, the respective functional elements relating to the peeling-off step and the separating step are consolidated. This consolidated arrangement realizes reducing the entire size of the laminating apparatus.

The second thermally press bonding is carried out at the second press bonding unit 50, and each laminate (A+B+E) conveyed to the peeling-off unit 60 and the separating unit 80 has the laminate layer D of the laminate material B again activated by the thermally press bonding at the second press bonding unit 50. However, as a result of the natural heat radiation upon elapse of a time (given time) after the thermally press bonding at the second press bonding unit 50, the laminate is conveyed towards the peeling-off unit 60 and the separating unit 80 as the adhesive layer D' of the laminate layer D is being hardened (brought back into a substantially normal equilibrium state from the activated state). As a result, the laminate (A+B+E), which has been brought into a substantially hardened or hardened to some extent (a substantially normal equilibrium state), reaches the peeling-off unit 60 and the separating unit 80, at which the substrate C and the under film E are respectively separated.

First, the description for the peeling off step by the peeling-off unit 60 will be made. Each laminate (A+B+E) reached the peeling-off unit 60 is held in a state in which it is being brought back into a substantially normal equilibrium state from the activated state, and therefore the adhesive force between the substrate C and the laminate layer D becomes smaller than the adhesive force between the recording surface of the recording medium A of the laminate layer D, or the adhesive force between the laminate layer D and the under film E (that is, the adhesive force between the laminate layer D and the recording surface of the recording medium A, or the adhesive force between the laminate layer D and the under film E becomes greater than the adhesive force between the substrate C and the laminate layer D). Because of this, even if the substrate C is pulled upwards towards the upstream side of the conveying direction via the knife edge 61, only the substrate C is securely peeled off, and it is unlikely that the laminate layer D is partly or entirely taken away along with the substrate C, unlike the conventional laminating apparatus.

In addition, since the peeling-off unit 60 is held in slide contact to each laminate (A+B+E) with a leading end of the knife edge 61, it is possible to prevent lifting up of the laminate (A+B+E) along with the peeling off of the substrate C and stabilize the peeling-off angle of the substrate C.

On the other hand, the separating unit 80 also carries out the separating step at substantially the same timing as the peeling off step. Specifically, each laminate (A+B+E) which has the laminate layer D' brought into a substantially normal equilibrium state, is moved to the downstream side in slide contact with the upper surface of the knife edge 81 of the separating unit 80, so that the under film E is rolled up onto the holder 91 of the under film collecting unit 90 when the laminate passes the ridge line of the knife edge 81 while the under film E is being would around the leading end of the knife edge 81. At this time, the recording medium A and the under film E are moved relative to each other so as to have the base surface of the recording medium A separated away from the under film E. That is, the recording medium A is moving towards the downstream side of the conveying passage, while the under film E is pulled in a direction different from the moving direction of the recording medium A (in a direction away from the base surface of the recording medium A), thereby allowing the laminate layer D of the non-laminated portion Db to be also pulled (drawn in) in the same direction as the under film E. Accordingly, the action of the laminate layer D of the non-laminated portion Db, which is moving in the same direction as the under film E, allows a pulling force to act intensively along the boundary between a portion having a recording medium A and a portion having no recording medium A (that is, the boundary between the non-laminated portion Db and the laminated portion Da). As a result, only the non-laminated portion Db can be securely cut away and the edge of the laminated portion Da is finely finished along the edge of each recording medium A.

FIG. 51 illustrates a state in which the substrate C is peeled off from a laminate (A+B+E) in the above peeling off step and separating step, and the under film E is separated.

It is assumed that carrying out the peeling off step and the separating step at substantially the same time produces an advantage of reducing the drawing-in of a laminate. That is, in the peeling off step, a drawing-in force, a force drawing a recording medium A into the substrate collecting unit 70, is caused by pulling the substrate C upwards towards the upstream side of the conveying direction (towards the substrate collecting unit 70) via the knife edge 61. On the other hand, in the separating step, a drawing-in force, a force drawing a recording medium A into the under film collecting unit 90, is caused by pulling the under film E towards the under film collecting unit 90. These drawing-in forces in both the steps are partially offset by carrying out the peeling-off step and the separating step at substantially the same time, and hence weakened. As a result, it is possible to prevent a laminate (A+B+E; A+B−C) from flapping in the normal direction thereof particularly in an arrangement provided with no guides or the like for defining the conveying passage, and securely convey the recording medium A to the finished product discharging unit 150 on the downstream side.

Figure 52:
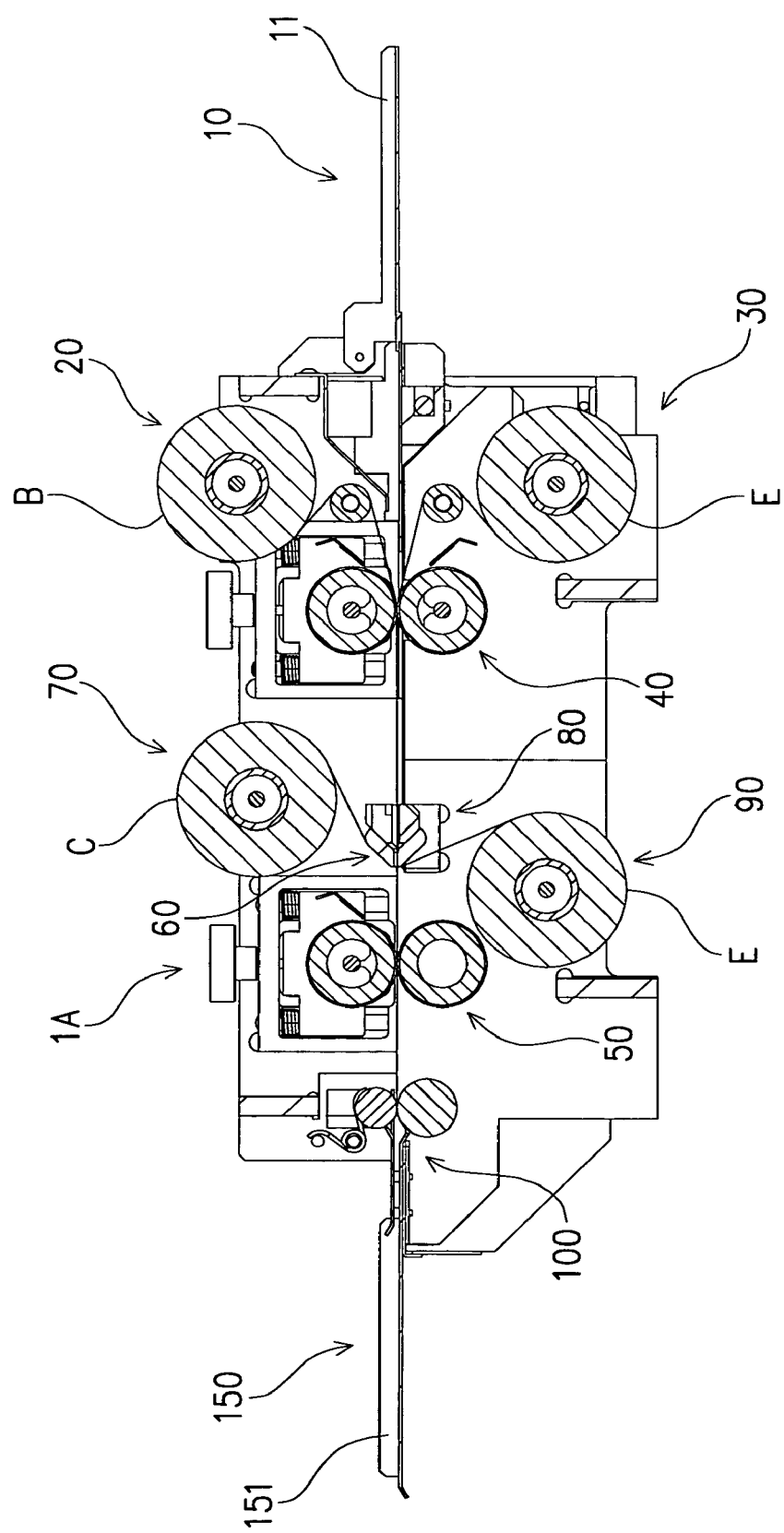
FIG. 52 is a side view of a laminating apparatus corresponding to the first embodiment, in the another embodiment (22).

FIG. 52 illustrates a different laminating apparatus. The difference from the aforesaid laminating apparatus of FIG. 50 lies in that the peeling-off unit 60 and the substrate collecting unit 70, as well as the separating unit 80 and the under film collecting unit 90 are disposed upstream of the second press bonding unit 50. Accordingly, this laminating apparatus has a longer distance between the first press bonding unit 40 and the second press bonding unit 50, as compared with the aforesaid laminating apparatus. This is because the laminate layer D which was activated (had its adhesive activated) by the thermally press bonding at the first press bonding unit 40 is to be subjected to the peeling off step and the separating step after being brought into a normal equilibrium state (a state in which the adhesive force has become strong). Therefore, the interval (given distance) from the first press bonding unit 40 to the peeling-off unit 60 and the separating unit 80 is set so that the time until the laminate layer D, after having passed through the first press bonding unit 40, reaches the peeling-off unit 60 and the separating unit 80, is substantially equal or longer than the time (a given time) required for the laminate layer D to be brought back to a substantially normal equilibrium state from the activated state.

A laminate (A+B−C), which has the substrate peeled off by the peeling-off unit 60 and the under film E separated by the separating unit 80, is conveyed to the second press bonding unit 50, at which the second thermally press bonding is carried out (the press contact force at the second press bonding unit 50 is set to be smaller than the press contact force at the first press bonding unit 40 by such a magnitude to be applied to the absent substrate C). Whereby, it is possible to increase the adhesive force of the laminate layer D relative to the recording surface of a recording medium A, and produce a finely finished surface with removing air bubbles even if the air bubbles are mixed between the recording medium A and the laminate layer D when in the laminating operation at the first press bonding unit 40.

A laminate (A+B−C, (finished product)) subjected to the second thermally press bonding at the second press bonding unit 50 is conveyed to the conveying roller members 100, through which it is conveyed to the finished product discharging unit 150.

Thus, in the laminating apparatus of FIG. 52, the distance from the second press bonding unit 50 to the conveying roller members 100 is short as compared with the laminating apparatus of FIG. 50. This is because the peeling off step and the separating step are not carried out therebetween and there is no necessity to provide a space for the arrangement of the relevant functional elements, and furthermore, there is no necessity to provide an interval (given distance) for the time (given time) required for the laminate layer D to be brought back into a substantially normal equilibrium state from the activated state, since the peeling off step and the separating step are not carried out.

Accordingly, compared with the laminating apparatus of FIG. 50, the distance between the first press bonding unit 40 and the second press bonding unit 50 becomes longer, but the distance between the second press bonding unit 50 and the conveying roller members 100 can be shortened. As a result, it is possible to realize the downsizing of the apparatus.

(23) In the fifth embodiment, the non-laminated portion Db is transferred onto the surface of the roller 41. Instead, it is possible to transfer the non-laminated portion Db onto, for example, the roller surface of a rotational endless belt.

(24) In the fifth embodiment, the non-laminated portion Db transferred onto the roller surface is removed by the scraper 85. Instead, it is possible to periodically detach the roller 41 and clean the same, or replace the same with a new one.

Figure 53:
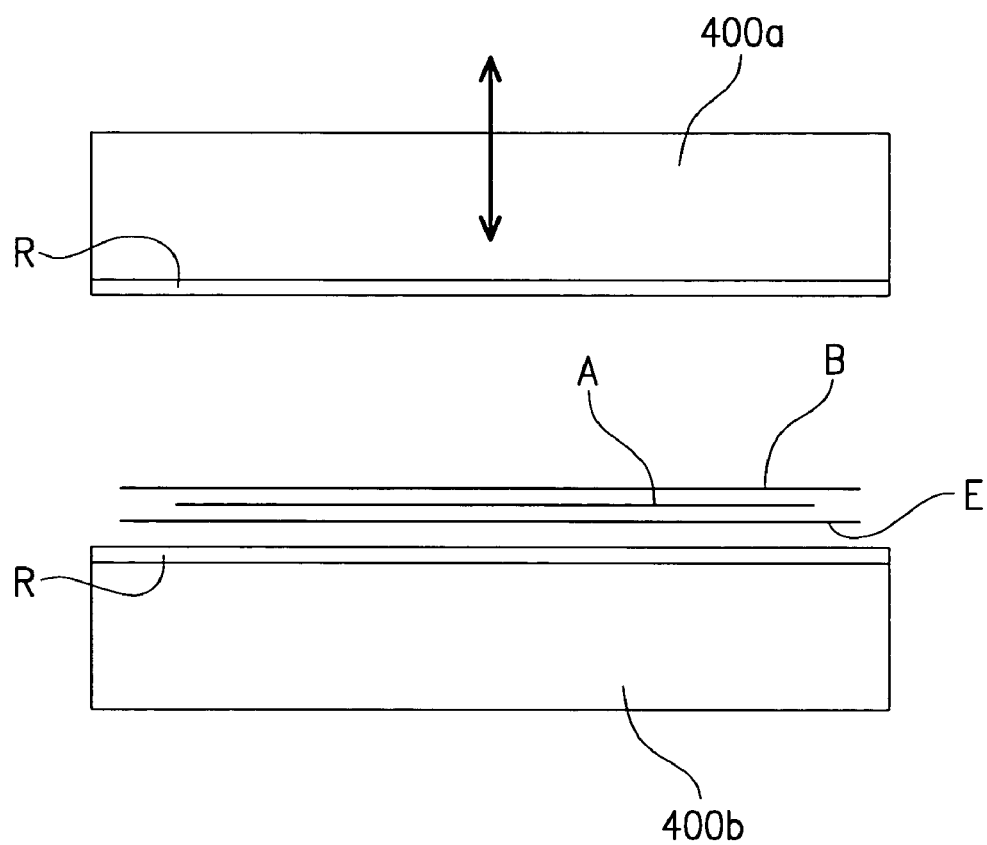
FIG. 53 is a schematic structural view of a laminating apparatus according to another embodiment (25).
Figure 54:
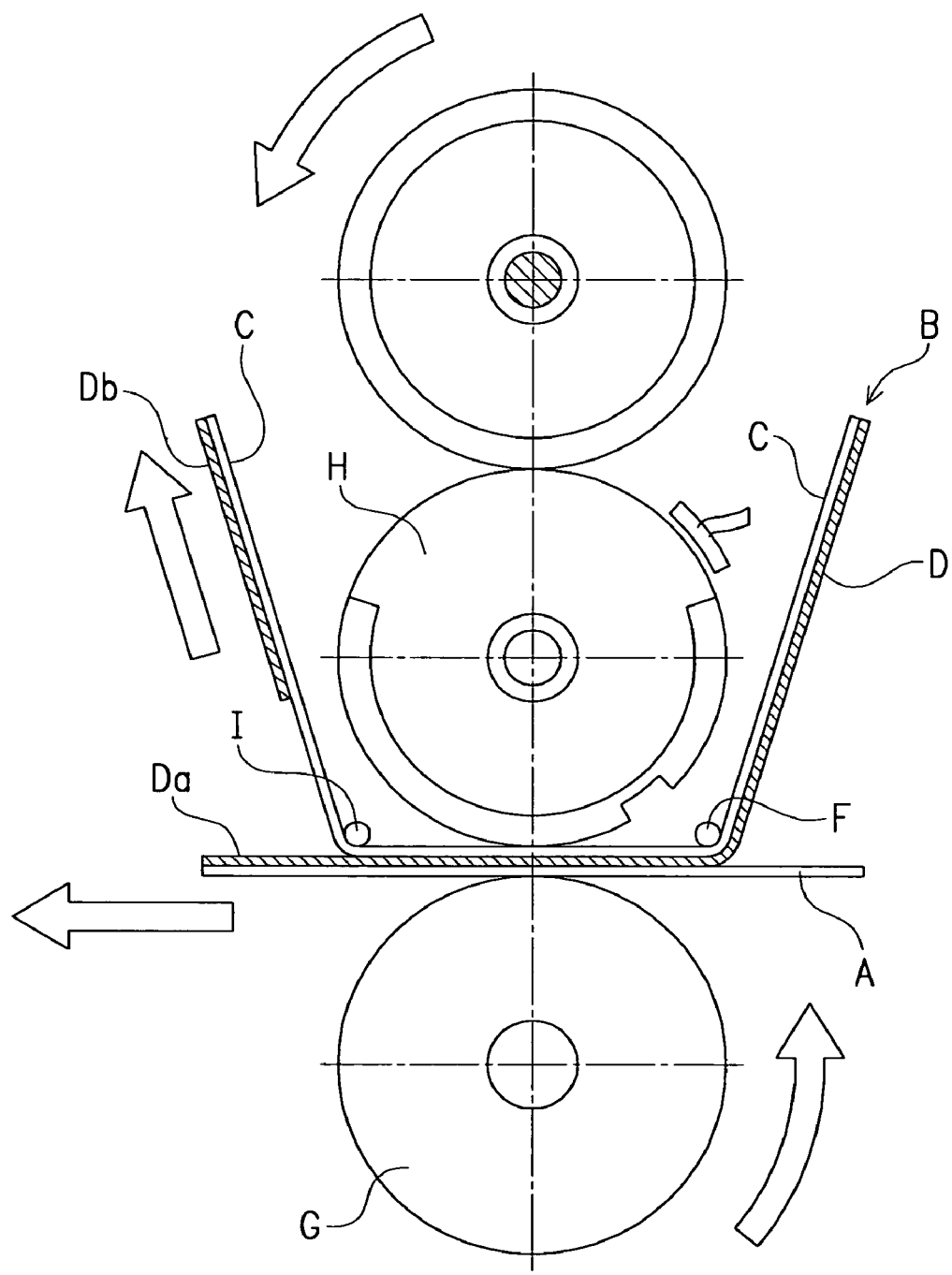
FIG. 54 is a schematic side view of a conventional laminating apparatus.
Figure 55:
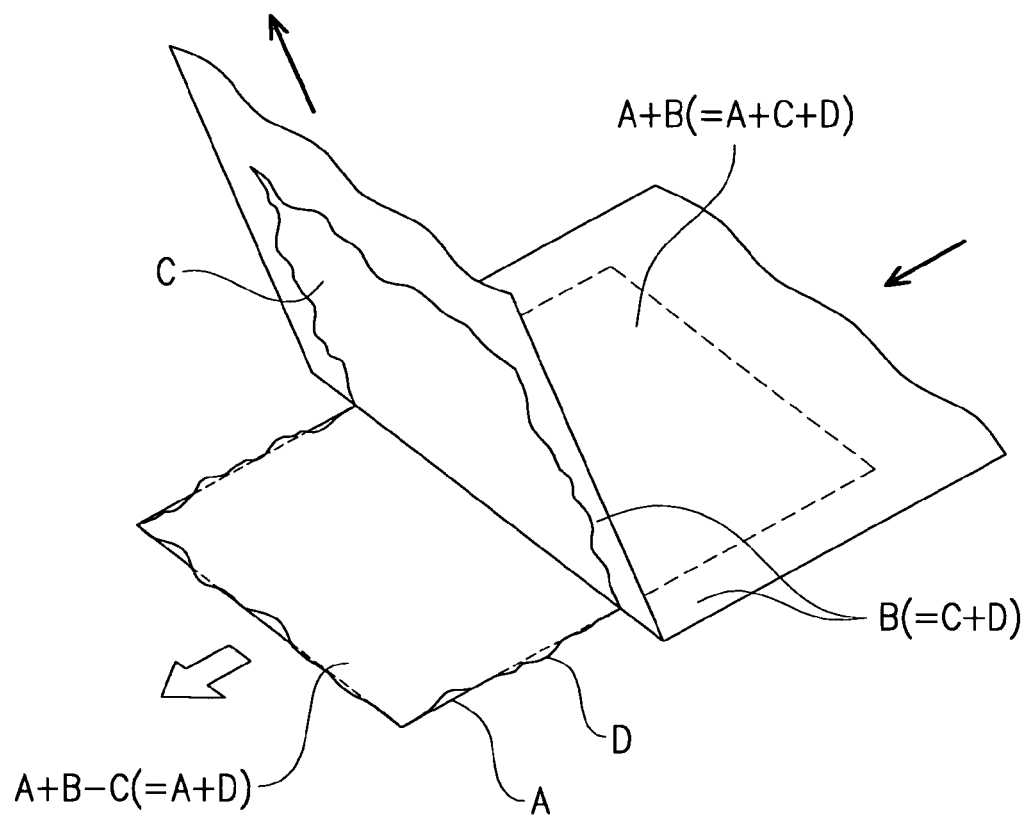
FIG. 55 is an explanatory view on a final step of the lamination process in the conventional laminating apparatus.

(25) In the sixth embodiment, the laminate material B and the under film E cut into sheets, and each recording medium A is interposed therebetween, thereby previously overlapping them each other, and then they are supplied towards the inside of the laminating apparatus (press bonding unit), and conveyed to the downstream side while being thermally press bonded by the driving roller 41 (51) and the press contact roller 43 (53). No limitation is intended thereto. For example, as illustrated in FIG. 53, in place of the driving roller 41 (51) and the press contact roller 43 (53), it is possible to employ an arrangement in which a pair of press members 400a, 400b moveable towards and away from each other, at least one of which is mounted with a heater therein, thermally press bond the laminate material B, the recording medium A and the under film E, which are all previously overlapped each other. In this case, it is preferable to make a pressing portion R for pressing the laminate material B and the under film E by an elastic material such as rubber so as to allow the laminate layer D of the laminate material B to securely thermally press bond the recording surface of each recording medium A and the under film E, and prevent the laminate material B from being damaged as much as possible.

The invention claimed is:

1. A laminating method of forming a laminate layer on a recording surface of a recording medium, comprising:
   laying a laminate material having a size larger than the recording medium over the same and thermally press bonding them together; and
   transferring the laminate layer protruding outwards from the recording medium onto a transfer medium means that is disposed on the side of the surface of the recording medium opposite to the recording surface;
   wherein the transfer medium means is moved towards the side of the recording medium opposite to the recording surface and separated so as to cut a laminated portion having the laminate layer adhered onto the recording surface away from a non-laminated portion having the laminate layer adhered onto the transfer medium means.

2. The laminating method according to claim 1, wherein the laminate material having a sheet-like substrate peelably laminated to the laminate layer is used and the substrate is peeled off from the laminate layer of the thermally press bonded laminate material.

3. The laminating method according to claim 1, wherein the transferred width of the laminate layer transferred onto the transfer medium means is about 3 mm or larger.

4. The laminating method according to claim 1, wherein thermally press bonding is again carried out after the thermally press bonding.

5. The laminating method according to claim 2, wherein thermally press bonding is again carried out after the substrate has been peeled off from the laminate layer of the thermally press bonded laminate material.

6. The laminating method according to claim 1, wherein plural recording media are successively supplied so as to have a precedent recording medium spaced with a given distance from a subsequent recording medium, and are thermally press bonded.

7. The laminating method according to claim 1, wherein the laminate material having a length in a first direction longer than the length of each recording medium in a first direction and having a length in a second direction orthogonal to the first direction longer than the length of each recording medium in a second direction orthogonal to the first direction is used, and the recording media and the laminate material are supplied in the first direction while having a precedent recording medium kept substantially close to a subsequent recording medium and are thermally press bonded.

8. The laminating method according to claim 1, wherein the laminate material having a length in a first direction longer than the length of the recording medium in a first direction and having a length in a second direction orthogonal to the first direction substantially equal to the length of the recording medium in a second direction orthogonal to the first direction is used, and the recording media and the laminate material are supplied so as to have the opposite ends of the laminate material in the second direction matched to the opposite ends of the recording medium in the second direction and are thermally press bonded.

9. The laminating method according to claim 1, wherein an under film is used as the transfer medium means, and at least one of the laminate material and the under film is preheated prior to the thermally press bonding.

10. The laminating method according to claim 1, wherein the transfer medium means is separated upon elapse of a given time after the thermally press bonding.

11. The laminating method according to claim 2, wherein the separating step of the transfer medium means is carried out after the peeling-off step of the substrate.

12. The laminating method according to claim 2, wherein the peeling-off step of the substrate is carried out after the separating step of the transfer medium means.

13. The laminating method according to claim 2, wherein the separating step of the transfer medium means and the peeling-off step of the substrate are substantially simultaneously carried out.

14. The laminating method according to claim 1, wherein the speed at which the transfer medium means is separated is lowered for at least a leading edge side of the leading edge side and a tailing edge side of the recording medium in a separating direction of the transfer medium means.

15. The laminating method according to claim 2, wherein the speed at which the substrate is peeled off is lowered for at least a leading edge side of the leading edge side and a tailing edge side of the recording medium in a peeling-off direction of the substrate.

16. The laminating method according to claim 1, wherein a sheet-like transfer medium material is used as the transfer medium means and the transfer medium material is moved away from the recording medium in a direction obliquely thereto.

\* \* \* \* \*